(12) United States Patent
Varanasi et al.

(10) Patent No.: US 10,897,893 B2
(45) Date of Patent: Jan. 26, 2021

(54) SYSTEMS AND METHODS FOR SURFACE RETENTION OF FLUIDS

(71) Applicant: Massachusetts Institute of Technology, Cambridge, MA (US)

(72) Inventors: Kripa K. Varanasi, Lexington, MA (US); Maher Damak, Cambridge, MA (US); Seyed Reza Mahmoudi, Waltham, MA (US); Nasim Hyder, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 539 days.

(21) Appl. No.: 15/299,278

(22) Filed: Oct. 20, 2016

(65) Prior Publication Data

US 2017/0135340 A1 May 18, 2017

Related U.S. Application Data

(60) Provisional application No. 62/243,736, filed on Oct. 20, 2015.

(51) Int. Cl.
*B05D 1/02* (2006.01)
*A01N 25/32* (2006.01)

(52) U.S. Cl.
CPC .............. *A01N 25/32* (2013.01); *B05D 1/02* (2013.01)

(58) Field of Classification Search
CPC ........ A01N 25/32; A01N 29/06; A01N 29/12; A01N 31/10; B05D 1/02
(Continued)

(56) References Cited

U.S. PATENT DOCUMENTS 4,610,311 A  9/1986 Bronner et al.
5,504,054 A  4/1996 Murphy
(Continued)

FOREIGN PATENT DOCUMENTS

CA   2340045 A1   2/2000
EP   0660999 A1   7/1995
(Continued)

OTHER PUBLICATIONS

RSC Advances (2014) <https://www.sciencedirect.com/topics/agricultural-and-biological-sciences/zein>(2016). (Year: 2016).*
(Continued)

*Primary Examiner* — Alexander M Weddle
(74) *Attorney, Agent, or Firm* — Wolf, Greenfield & Sacks, P.C.

(57) ABSTRACT

Systems and methods related to the formation of a reaction product on a surface are generally provided. The systems and methods described herein may allow for collection of the retention of a fluid by a surface in a relatively high amount. Such systems and methods may be useful in various applications including, for example, agriculture. In some embodiments, the systems and methods enhance water retention on hydrophobic surfaces of plants. Advantageously, the methods described herein may, in some cases, result in the formation of reaction products on a surface that serve to prevent fluids from being removed from the surface. Advantageously, the systems and methods described herein may suppress the adverse effects of natural conditions such as high surface energies and wind.

15 Claims, 24 Drawing Sheets

(58) Field of Classification Search
USPC .......................................................... 427/426
See application file for complete search history.

(56) References Cited

U.S. PATENT DOCUMENTS

| | | | |
|---|---|---|---|
| 5,700,559 A * | 12/1997 | Sheu | A61L 27/34 428/319.7 |
| 5,874,096 A | 2/1999 | Hazen | |
| 6,214,771 B1 | 4/2001 | Dexter | |
| 6,221,811 B1 | 4/2001 | Policello et al. | |
| 6,534,563 B1 | 3/2003 | Bergeron et al. | |
| 7,045,087 B2 | 5/2006 | Kotov et al. | |
| 8,689,726 B2 | 4/2014 | Krogman et al. | |
| 2005/0191430 A1 | 9/2005 | Rubner et al. | |
| 2006/0029808 A1 | 2/2006 | Zhai et al. | |
| 2007/0077276 A1 * | 4/2007 | Haynie | C07K 14/005 424/423 |
| 2007/0104849 A1 | 5/2007 | McClements et al. | |
| 2007/0243237 A1 | 10/2007 | Khaled et al. | |
| 2008/0020402 A1 | 1/2008 | Haynie | |
| 2008/0241228 A1 * | 10/2008 | Haynie | A61K 9/5052 424/443 |
| 2009/0226529 A1 | 9/2009 | Quellet et al. | |
| 2010/0016392 A1 | 1/2010 | Kabanov et al. | |
| 2011/0177951 A1 | 7/2011 | Toledano et al. | |
| 2012/0269973 A1 | 10/2012 | Krogman et al. | |
| 2013/0129907 A1 | 5/2013 | Popa et al. | |
| 2013/0165525 A1 | 6/2013 | Scheuing et al. | |
| 2013/0165572 A1 | 6/2013 | Scheuing et al. | |
| 2013/0192835 A1 * | 8/2013 | Vorderbruggen | E21B 43/04 166/305.1 |
| 2014/0193644 A1 | 7/2014 | Dressick et al. | |
| 2014/0256545 A1 | 9/2014 | Velev et al. | |
| 2015/0038442 A1 | 2/2015 | Van der Krieken et al. | |
| 2016/0296985 A1 | 10/2016 | Dhiman et al. | |
| 2019/0344274 A1 | 11/2019 | Varanasi et al. | |

FOREIGN PATENT DOCUMENTS

| | | |
|---|---|---|
| EP | 2557570 A1 | 2/2013 |
| JP | 2000-516130 A | 12/2000 |
| WO | WO 1998/003267 A1 | 1/1998 |
| WO | WO 2005/041661 A1 | 5/2005 |
| WO | WO 2009/077908 A1 | 6/2009 |
| WO | WO 2011/022524 A1 | 2/2011 |
| WO | WO 2014/040119 A1 | 3/2014 |
| WO | WO 2017/070375 A1 | 4/2017 |

OTHER PUBLICATIONS

"Water Structure and Science". <http://www1.lsbu.ac.uk/water/starch.html> (2014). (Year: 2014).*

Abhilash et al., Pesticide use and application: An Indian scenario. J Hazard Mater. 2009; 165:1-12. Epub Nov. 1, 2008.

Anand et al., Enhanced condensation on lubricant-impregnated nanotextured surfaces. ACS Nano. 2012;6(11):10122-9. Epub Oct. 2, 2012.

Andelman et al., Polyelectrolyte adsorption. Comptes Rendus Académie Sci.—Ser. IV—Phys. Nov. 2000;1(9):1153-62.

Antunes et al., Layer-by-layer self-assembly of chitosan and poly (γ-glutamic acid) into polyelectrolyte complexes. Biomacromolecules. Oct. 2011;12:4183-95.

Aytouna et al., Impact dynamics of surfactant laden drops: dynamic surface tension effects. Exp. Fluids. 2010;48:49-57. Epub Jul. 7, 2009.

Bartolo et al., Dynamics of non-Newtonian droplets. Phys. Rev. Lett. Oct. 2007;99(17):174502(1-4).

Bartolo et al., Retraction dynamics of aqueous drops upon impact on non-wetting surfaces. J. Fluid Mech. 2005;545:329-38.

Bassil et al., Cancer health effects of pesticides. Can. Fam. Physician. Oct. 2007;53:1704-11.

Bergeron, Designing intelligent fluids for controlling spray applications. Comptes Rendus Phys. 2003;4:211-219.

Bergeron et al., Controlling droplet deposition with polymer additives. Nature. Jun. 15, 2000;405:772-5.

Biance et al., On the elasticity of an inertial liquid shock. J. Fluid Mech. 2006;554:47-66.

Bird et al., Reducing the contact time of a bouncing drop. Nature. Nov. 21, 2013;503:385-8. including Suppl Info. 14 pages.

Blossey, Self-cleaning surfaces—virtual realities. Nat. Mater. May 2003;2(5):301-6.

Bocquet et al., A smooth future? Nat. Mater. May 2011;10:334-7.

Cassie et al., Wettability of porous surfaces. Trans Faraday Soc. Jan. 1944;40:546-51.

Clanet et al., Maximal deformation of an impacting drop. J. Fluid Mech. 2004;517:199-208.

Croll et al., A blank slate? Layer-by-layer deposition of hyaluronic acid and chitosan onto various surfaces. Biomacromolecules. 2006;7(5):1610-22.

De Gennes, Wetting: statics and dynamics. Rev. Mod. Phys. Jul. 1985;57(3):827-63.

De Ruiter et al., Dynamics of collapse of air films in drop impact. Phys. Rev. Lett. Feb. 2012;108:074505(1-4).

De Rutter et al., Influence of surfactants and plant species on leaf retention of spray solutions. Weed Sci. Nov. 1990;38(6):567-72.

Decher et al., Fuzzy nanoassemblies: Toward layered polymeric multicomposites. Science. Aug. 1997;277(5330):1232-7.

Deng et al., Nonwetting of impinging droplets on textured surfaces. Appl. Phys. Lett. 2009;94:133109(1-3). Epub Apr. 2, 2009.

Deng et al., Liquid drops impacting superamphiphobic coatings. Langmuir. 2013; 29(25):7847-56.

Dimitrova et al., Sustained delivery of siRNAs targeting viral infection by cell-degradable multilayered polyelectrolyte films. Proc. Natl. Acad. Sci. Oct. 2008;105(42):16320-5.

Duez et al., Making a splash with water repellency. Nat Phys. Mar. 2007;3:180-3. Epub Feb. 25, 2007.

Ellis et al., How surface tension of surfactant solutions influences the characteristics of sprays produced by hydraulic nozzles used for pesticide application. Colloids Surf A Physicochem. Eng. Asp. 2001;180:267-76.

Fang et al., Hydrophobicity mechanism of non-smooth pattern on surface of butterfly wing. Chin. Sci. Bull. Mar. 2007;52(5):711-6.

Forster et al., Improved method for leaf surface roughness characterisation. in Proceedings of the 6th International Symposium on Adjuvants for Agrochemicals. ISAA 2001 Foundation. Aug. 2001;113-118.

Fu et al., Construction of anti-adhesive and antibacterial multilayer films via layer-by-layer assembly of heparin and chitosan. Biomaterials. 2005;26:6684-92. Epub Jun. 6, 2005.

Furstner et al., Wetting and self-cleaning properties of artificial superhydrophobic surfaces. Langmuir. 2005;21:956-61. Epub Jan. 6, 2005.

Gaskin et al., Characterising plant surfaces for spray adhesion and retention. N. Z. Plant Prot., Proceedings of a Conference, Wellington, New Zealand, Aug. 9-11, 2005;58:179-83.

Gilliom et al., Pesticides in the nation's streams and ground water, 1992-2001. Circular 1291. (Geological Survey (US), 2006, Revised Feb. 15, 2007). 184 pages.

Govt of India, Ministry of Agriculture, State of Indian Agriculture Dec. 2011. 2012. At http://www.agricoop.nic.in/sia111213312.pdf. 294 pages.

Graham et al., Dynamics of droplet coalescence in response to increasing hydrophobicity. Phys. Fluids. 2012;24:112105(1-20). Epub Nov. 27, 2012.

Hao et al., Superhydrophobic-like tunable droplet bouncing on slippery liquid interfaces. Nat. Commun. Aug. 7, 2015; 6(7986):1-7.

Huang et al., Integrating interfacial self-assembly and electrostatic complexation at an aqueous interface for capsule synthesis and enzyme immobilization. J Mater Chem A. 2014;2:1672-6. Epub Dec. 2, 2013.

Jaffna, English: water droplets in a lotus leaf. at <http://commons.wikimedia.org/wiki/File:Water_droplets_in_a_lotus_leaf.JPG>, Mar. 3, 2014.

(56) References Cited

OTHER PUBLICATIONS

Jayaratne et al., The coalescence and bouncing of water drops at an air/water interface. Proceedings of the Royal Society of London A: Mathematical, Physical and Engineering Sciences. 1964;280:545-65.
Jeyaratnam, Acute pesticide poisoning: a major global health problem. World Health Stat. Q. Rapp. Trimest. Stat. Sanit. Mond. 1990;43:139-44.
Jiang et al., A lotus-leaf-like superhydrophobic surface: a porous microsphere/nanofiber composite film prepared by electrohydrodynamics. Angew. Chem. 2004;116:4438-41.
Joanny et al., A model for contact angle hysteresis. J. Chem. Phys. Jul. 1, 1984;81(1):552-62.
Kumar et al., A review: polyelectrolyte polysaccharides nanoparticles on diabetic mellitus. Indo Am. J. Pharm. Res. 2013;3(1):1446-57.
Kwon et al., Rapid deceleration-driven wetting transition during pendant drop deposition on superhydrophobic surfaces. Phys. Rev. Lett. Jan. 2011;106:036102(1-4).
Lafuma et al., Superhydrophobic states. Nat. Mater. 2003 ;2(7):457-60. Epub Jun. 22, 2003.
Leslie et al., A bioinspired omniphobic surface coating on medical devices prevents thrombosis and biofouling. Nat. Biotechnol. Nov. 2014;32(11):1134-40, Suppl information, 3 pgs. Epub Oct. 12, 2014.
Liu et al., Artificial lotus leaf structures from assembling carbon nanotubes and their applications in hydrophobic textiles. J. Mater. Chem. 2007;17:1071-8. Epub Dec. 18, 2006.
Liu et al., Pancake bouncing on superhydrophobic surfaces. Nat. Phys. Jul. 2014;10:515-9. Epub Jun. 8, 2014.
Logan City Council,The Greenbank Mozzie. at <https://safegreenbanknow.wordpress.com/tag/logan-city-council/>2014. 5 pages.
Mannetje et al., Trapping of drops by wetting defects. Nat Commun. 2014. 5(3559):1-7.
Martens et al., Fertilizer applications for correcting micronutrient deficiencies. Micronutrients in Agriculture ($2^{nd}$ Ed). SSSA Book Series, No. 4, Ch. 15, 1991, pp. 549-553.
Massinon et al., Comparison of spray retention on synthetic superhydrophobic surface with retention on outdoor grown wheat leaves. Int. Adv. Pestic. Appl. Asp. Appl. Biol. Jan. 2012; 114:261-8.
Mc Kinley et al., Wolfgang von Ohnesorge. Phys Fluids. 2011;23:127101(1-6). Epub Dec. 7, 2011.
Mc Kinley, Dimensionless groups for understanding free surface flows of complex fluids. Hatsopoulos Microfluids Lab., Dept of Mech Eng., MIT. HML rpt No. 05-P-05. For publication in SOR Rheol Bull. Jul. 2005; 9 pages.
Michaels et al., Polycation-polyanion complexes: Preparation and properties of poly-(vinylbenzyltrimethylammonium) poly-(styrenesulfonate). J. Phys. Chem. Oct. 1961;65(10):1765-73.
Miljkovic et al., Condensation heat transfer on superhydrophobic surfaces. MRS Bull. May 2013;38:397-406.
Mock et al., Drop impact on chemically structured arrays. J. Phys. Condens. Matter. Feb. 2005;17:S595-605.
Netz et al., Polyelectrolytes in solution and at surfaces. Encyclopedia of Electrochem. Wiley-VCH, vol. 1, Chpt. 2.7, 282-321 (2002).
Orme, Experiments on droplet collisions, bounce, coalescence and disruption. Prog. Energy Combust. Sci. 1997;23:65-79.
Patankar et al., Mimicking the lotus effect: influence of double roughness structures and slender pillars. Langmuir. 2004;20:8209-13. Epub Aug. 6, 2004.
Paxson et al., Self-similarity of contact line depinning from textured surfaces. Nat. Commun. Feb. 2013;4:1492(1-8).
Pimentel et al., Pesticides: amounts applied and amounts reaching pests. BioScience. Feb. 1, 1986;36(2):86-91 (1986).
Pimentel et al., Environmental and economic costs of pesticide use. BioScience. Nov. 1992;42(10):750-60.
Pionke et al., Nature and extent of groundwater contamination by pesticides in an agricultural watershed. Water Res. 1989;23(2):1031-7.
Porcel et al., Ultrathin coatings and (poly(glutamic acid)/polyallylamine) films deposited by continuous and simultaneous spraying. Langmuir. 2005;21(2):800-2. Epub Dec. 17, 2004.
Quere et al., Non-sticking drops. Rep. Prog. Phys. Sep. 2005;68:2495-532.
Quere et al., Wetting and roughness. Annu Rev Mater Res. 2008;38:71-99.
Rein, Phenomena of liquid drop impact on solid and liquid surfaces. Fluid Dyn. Res. Aug. 1993;12(2):61-93.
Richard et al., Bouncing water drops. Europhys. Lett. Jun. 15, 2000;50(6):769-75.
Richard et al., Surface phenomena: Contact time of a bouncing drop. Nature. Jun. 2002;417(6891):811-2.
Rioboo et al., Time evolution of liquid drop impact onto solid, dry surfaces. Exp. Fluids. 2002;33:112-24.
Rozhkov et al., Impact of drops of polymer solutions on small targets. Phys. Fluids. Jul. 2003;15(7):2006-2019.
Sanborn et al., Non-cancer health effects of pesticides. Can. Fam. Physician. Oct. 2007;53:1712-20.
Shelton et al., Neurodevelopmental disorders and prenatal residential proximity to agricultural pesticides: the CHARGE study. Env. Health Perspect. Oct. 2014;122(10):1103-9.
Silva et al., Films based on chitosan polyelectrolyte complexes for skin drug delivery: Development and characterization. J. Membr. Sci. 2008;320:268-79. Epub Apr. 12, 2008.
Smith et al., Droplet size and leaf morphology effects on pesticide spray deposition. Trans. ASAE-Am. Soc. Agric. Eng. 2000;43(2):255-9.
Smith et al., Droplet mobility on lubricant-impregnated surfaces. Soft Matter. Feb. 14, 2013;9(6):1772-80. Epub Dec. 17, 2012.
Smith et al., The anti-rebound effect of flexible polymers on impacting drops. In Proceedings of 23rd Annual Conference on Liquid Atomization Spray Systems Europe (ILASS-Europe 2010). Sep. 2010;124:1-8.
Sun et al., Artificial lotus leaf by nanocasting. Langmuir. 2005;21(19):8978-81.
Varanasi et al., Frost formation and ice adhesion on superhydrophobic surfaces. Appl. Phys. Lett. 2010. 97:234102(1-3). Epub Dec. 7, 2010.
Varanasi et al., Spatial control in the heterogeneous nucleation of water. Appl. Phys. Lett. 2009. 95:094101(1-3). Epub Aug. 31, 2009.
Wenzel et al., Resistance of solid surfaces to wetting by water. Ind. Eng. Chem. Aug. 1936;28(8):988-94.
Wisniewska et al., Comparison of adsorption affinity of polyacrylic acid for surfaces of mixed silica-alumina. Colloid Polym. Sci. 2014;292:699-705. Epub Nov. 23, 2013.
Wood et al., Tunable drug release from hydrolytically degradable layer-by-layer thin films. Langmuir. 2005;21(4):1603-9.
Wood et al., Controlling interlayer diffusion to achieve sustained, multiagent delivery from layer-by-layer thin films. Proc. Natl. Acad. Sci. Jul. 5, 2006;103(27):10207-12.
Wu et al., Scaling law in liquid drop coalescence driven by surface tension. Phys. Fluids. Jul. 2004;16(7):L51-L54. Epub May 18, 2004.
Yarin, Drop impact dynamics: Splashing, spreading, receding, bouncing . . . Annu. Rev. Fluid Mech. 2006;38:159-92.
Ye et al., Deposition temperature effect on release rate of indomethacin microcrystals from microcapsules of layer-by-layer assembled chitosan and alginate multilayer films. J. Controlled Release. 2005;106:319-28. Epub Jun. 20, 2005.
Yu et al., Evaporation and deposition coverage area of droplets containing insecticides and spray additives on hydrophilic, hydrophobic, and crabapple leaf surfaces. Trans. ASABE. 2009;52(1):39-49.
Zhang et al., Dynamic surface tension effects in impact of a drop with a solid surface. J. Colloid Interface Sci. 1997;187:166-78.
International Search Report and Written Opinion for PCT/US2016/057956 dated Jan. 12, 2017.
International Preliminary Report on Patentability dated May 3, 2018 for Application No. PCT/US2016/057956.
Bakeev et al., Kinetics and mechanism of interpolyelectrolyte exchange and addition reactions. Macromolecules. Mar. 1992;25(17):4249-54.

(56) References Cited

OTHER PUBLICATIONS

Clark et al., Ionic effects of sodium chloride on the templated deposition of polyelectrolytes using layer-by-layer ionic assembly. Macromolecules. Aug. 1997;30(23):7237-44.

Damak, Droplet Deposition on hydrophobic surfaces for agricultural sprays. 2015 MIT Master's Thesis. Department of Mechanical Engineering, Massachusetts Institute of Technology, 55 pages. Submitted Jun. 2015. Available to the public Mar. 25, 2016.

De Vasconcelos et al., Effect of molecular weight and ionic strength on the formation of polyelectrolyte complexes based on poly(methacrylic acid) and chitosan. Biomacromolecules. Apr. 2006;7(4):1245-52.

Fuoss et al., Mutual Interaction of Polyelectrolytes. Science. Nov. 25, 1949;110(2865):552-4.

Furmidge et al., Studies at phase interfaces. I. The sliding of liquid drops on solid surfaces and a theory for spray retention. J. Colloid Sci. 1962;17:309-24.

Izquierdo et al., Dipping versus spraying: exploring the deposition conditions for speeding up layer-by-layer assembly. Langmuir. Mar. 2005;21:7558-67.

Krogman et al., Spraying asymmetry into functional membranes layer-by-layer. Nat Mater. Jun. 2009;8(6):512-8. doi: 10.1038/nmat2430. Epub Apr. 19, 2009.

Liao et al., Controlled release from fibers of polyelectrolyte complexes. J Control Release. May 18, 2005;104(2):347-58. Epub Apr. 7, 2005.

Liu et al., Layer-by-layer electrostatic self-assembly of nanoscale Fe3O4 particles and polyimide precursor on silicon and silica surfaces. Appl Phys Lett. Oct. 1997;71(16)2265-67.

Mjahed et al., Turbidity diagrams of polyanion/polycation complexes in solution as a potential tool to predict the occurrence of polyelectrolyte multilayer deposition. J Colloid Interface Sci. Jun. 1, 2010;346(1):163-71. doi: 10.1016/j.jcis.2010.02.042. Epub Feb. 21, 2010.

Pamin et al., Electrostatic self-assembly of polyoxometalates on chitosan as catalysts of oxidation of cyclic hydrocarbons. Catal Lett. 2009;127:167-74. Epub Oct. 3, 2008.

Peaker et al., Light-scattering methods for the chemical characterization of polymers. Review. Analyst. 1960;85:235-44.

Philipp et al., Polyelectrolyte complexes—recent developments and open problems. Prog Polym Sci. 1989;14:91-172.

Schlenoff et al., Sprayed polyelectrolyte multilayers. Langmuir. Oct. 2000;16(26):9968-69.

Snyder et al., Frost Protection: fundamentals, practice and economics. FAO Environment and Natural Resources Service Series (FAO-Rome 2005). Feb. 2005;1:1-240.

Spruijt et al., Linear viscoelasticity of polyelectrolyte complex coacervates.Macromolecules. Feb. 2013;46:1633-41.

Sukhishvili et al., Where polyelectrolyte multilayers and polyelectrolyte complexes meet. Macromolecules. Dec. 26, 2006;39(26):8873-81.

Thünemann et al., Polyelectrolyte complexes. Adv Polym Sci. 2004;166:113-71. doi: 10.1007/b11350.

Turgeon et al., Protein-polysaccharide interactions: phase-ordering kinetics, thermodynamic and structural aspects. Curr Opin Colloid Interface Sci. 2003;8:401-14.

Invitation to Pay Additional Fees for Application No. PCT/US2019/021938 dated Jul. 9, 2019.

International Search Report and Written Opinion for Application No. PCT/US2019/021938 dated Sep. 11, 2019.

Damak et al., Enhancing droplet deposition through in-situ precipitation. Nat Comm. Nov. 1, 2016;7(1):1-9.

Japanese Office Action dated Aug. 28, 2020 for Application No. JP2018-519945.

* cited by examiner

Opposite Polyelectrolytes (Drop-on-drop)

Water (Drop-on-drop)

0ms    5.7ms    7.2ms    8.5ms    16.7ms

US 10,897,893 B2

SYSTEMS AND METHODS FOR SURFACE RETENTION OF FLUIDS

RELATED APPLICATIONS

This application claims priority under 35 U.S.C. § 119(e) to U.S. Provisional Patent Application Ser. No. 62/243,736, filed Oct. 20, 2015 and entitled "Spray Retention Using Pre-Mixed Polyelectrolyte Solutions," which is incorporated herein by reference in its entirety for all purposes.

FIELD

The present invention relates generally to systems and methods for the formation of reaction products on surfaces, such as the reaction products of two or more polyelectrolytes.

BACKGROUND

Pesticides are an important input in agriculture. They eliminate weeds, insects, microbes and other harmful elements and dramatically increase crop productivity. Thus, pesticides are extensively used both in the developed and developing world. However, they also have many adverse effects on the environment and on the health of the people exposed to them. For example, it has been found that 98% of insecticides and 95% of herbicides end up in the soil, water, air or other species than those that were targeted. This contributes to soil pollution, water pollution and air pollution. It also endangers many plant and animal species. For example, significant honeybee losses have been attributed to pesticides. Two mechanisms may contribute to pesticide pollution. First, poor retention of pesticides by plants leads to a significant portion entering the soil, where it may both pollute the soil and contaminate the groundwater. Second, wind drift may remove pesticides from fields, leading to air pollution as well as soil and water pollution in other locations. Pesticides also have adverse health effects. People who are exposed to them may suffer from severe nervous diseases, reproductive problems and cancer.

All of these effects may be aggravated in the developing world, where fewer precautions are taken when handling and spraying pesticides. In particular, most farmers use handheld sprayers, and do not wear personal protective equipment while spraying. This is due to both a lack of resources and a lack of awareness of the dangers of pesticides. Moreover, some very toxic formulations, which are forbidden in many countries, may still be in use. For example, toxic chlorinated pesticides, such as p,p'-dichlorodiphenyltrichloroethane (DDT), hexachlorocyclohexane (HCH) and pentachlorophenol (PCP) are manufactured in and exported from India. A study found that up to 25 million persons in the developing world suffer pesticide poisoning every year, from which 3 million experience severe poisoning.

Accordingly, improved compositions and methods are needed.

SUMMARY

Methods and articles for the formation of reaction products as well as related compositions and methods associated therewith are provided. The subject matter of the present invention involves, in some cases, interrelated products, alternative solutions to a particular problem, and/or a plurality of different uses of one or more systems and/or articles. In one aspect, methods are provided. In some embodiments, the method comprises simultaneously spraying a first composition comprising a first polyelectrolyte and a second composition comprising a second polyelectrolyte on a substrate such that a layer comprising the first polyelectrolyte and the second polyelectrolyte is deposited on a surface of the substrate.

In some embodiments, the method comprises spraying a first composition comprising a first polyelectrolyte with a first zeta potential onto at least a first portion of the surface and spraying a second composition comprising a second polyelectrolyte with a second zeta potential onto at least a second portion of the surface, wherein the first zeta potential and the second zeta potential have opposite signs, wherein the first composition and the second composition interact at the surface to form a reaction product comprising the first polyelectrolyte and the second polyelectrolyte on the surface.

In some embodiments, the method comprises essentially simultaneously exposing a surface to a first composition comprising a first species with a first charge and a second composition comprising a second species with a second charge, wherein the second charge is opposite in sign to the first charge, wherein exposing the surface to the first composition and the second composition causes a reaction product to be formed comprising both the first species and the second species, and wherein the reaction product is formed on at least a portion of the surface.

In some embodiments, the method comprises essentially simultaneously exposing a surface to a first composition comprising a first species and a second composition comprising a second species, wherein a ratio of a surface coverage when the surface is exposed to both the first composition and the second composition essentially simultaneously to a surface coverage when the surface is exposed to an equivalent amount of either the first composition or the second composition is greater than 1.

In some embodiments, the method comprises essentially simultaneously applying two polyelectrolytes of opposite charge to a surface and allowing the two polyelectrolytes to react proximate the surface to form a reaction product on the surface.

In another aspect, articles are provided. In some embodiments, the article comprises a surface, wherein at least a portion of the surface is coated with a reaction product comprising oppositely charged polyelectrolytes, and wherein the reaction product is capable of pinning a liquid droplet.

In some embodiments, the article comprises a superhydrophobic surface comprising a reaction product of two or more polyelectrolytes, the superhydrophobic surface in contact with an aqueous fluid such that the aqueous fluid coats greater than or equal to 5% of the surface.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
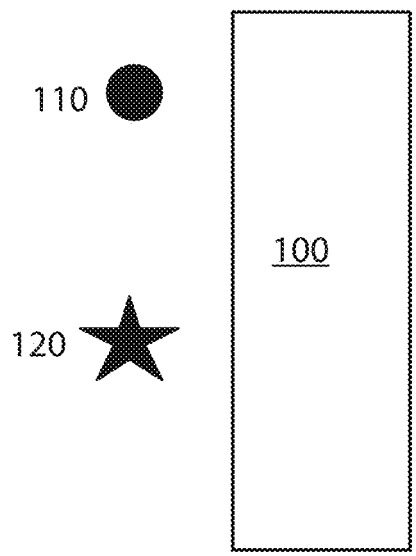
FIG. 1A shows, in accordance with some embodiments, a schematic illustration of a first species, a second species, and a surface.

Systems and methods related to the deposition of reaction products on a surface are generally described. The systems and methods described herein may allow for the deposition of reaction products (e.g., polyelectrolyte precipitates) that increase the ability of the surface to retain a fluid (e.g., water). For example, in some cases, two or more compositions (e.g., two or more types of polyelectrolytes) may be deposited on a hydrophobic surface (e.g., a superhydrophobic surface) such that a reaction product of the two or more compositions form on the surface. In some cases, the reaction product modifies the hydrophobicity of the surface such that, upon deposition of the two or more compositions and/or formation of the reaction product, the surface becomes hydrophilic. In some embodiments, a fluid (e.g., a carrier fluid) may be retained on the surface after deposition and/or formation of the reaction product that otherwise would not have been retained on the surface prior to deposition and/or formation of the reaction product.

Such systems and methods may be useful in various applications including, for example, pesticide retention (e.g., on plant leaves), frost protection for plants, treatment and/or prevention of forest fires, and anti-icing sprays. In some embodiments, the systems and methods may enhance the amount of pesticide that remains on plant leaves. The effectiveness of traditional pesticide formulations and traditional methods for applying pesticides may be limited by the high hydrophobicity of plant leaves, which may cause pesticide formulations to bounce and roll off the leaves instead of being retained on the leaf surfaces. Advantageously, the methods described herein may, in some cases, suppress the bouncing and rolling of droplets from surfaces such as superhydrophobic surfaces by forming precipitates that arrest droplet retraction. For example, a surface may be essentially simultaneously exposed to a first composition comprising a first species with a first charge and to a second composition comprising a second species with a charge of opposite sign to the first charge such that a reaction product (e.g., a precipitate) is formed on the surface. Without wishing to be bound by theory, the reaction product may be capable of interacting with droplets in a manner such that a sufficient portion of the droplet kinetic energy is dissipated during retraction to prevent droplet removal from the surface (e.g., a hydrophilic reaction product may be capable of applying an attractive force to a hydrophilic droplet that results in energy dissipation when the droplet recedes). In some embodiments, one or more reaction products are generated by essentially simultaneously applying two polyelectrolytes of opposite charge in a carrier to the surface and allowing the two polyelectrolytes to react proximate the surface. In certain embodiments, one or more of the polyelectrolytes may be applied to the surface by spraying.

In an exemplary embodiment, a carrier fluid (e.g., comprising an active agent such as a pesticide), a first composition (e.g., comprising a first polyelectrolyte having a net positive charge), and a second composition (e.g., comprising a second polyelectrolyte having a net negative charge) are deposited on a hydrophobic surface such that the first composition and second composition form a reaction product and such that the carrier fluid (and/or the active agent) are retained on the hydrophobic surface.

In some embodiments, forming one or more reaction products on a surface may modify the wetting properties of the surface. For example, in some embodiments the presence of one or more reaction products on a superhydrophobic surface may allow the superhydrophobic surface to be at least partially coated by an aqueous fluid. In certain embodiments, the presence of one or more reaction products on a surface may result in a surface where different regions have different surface energies. For example, a surface of low surface energy may be at least partially coated by a reaction product of high surface energy. In some cases, a surface may have regions of high surface energy and regions of low surface energy. The length scale for such regions may be relatively small (e.g., on the order of tens or hundreds of nanometers.

Figure 1B:
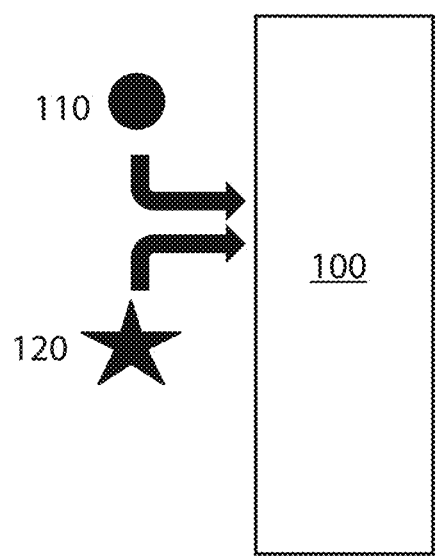
FIG. 1B shows, according to certain embodiments, a schematic illustration of a formation of a reaction product on a surface.

As illustrated in FIG. 1A, in some embodiments, a first species (e.g., a first polyelectrolyte) 110 and a second species (e.g., a second polyelectrolyte) 120, different than first species 110, may be deposited on a surface 100. In some embodiments, as shown illustratively in FIG. 1B, first species 110 and second species 120 may be deposited on surface 100 substantially simultaneously. In certain embodiments, the first species and the second species may be deposited at different times (e.g., the first species is deposited on the surface followed by the second species being deposited on the surface). For example, in some cases, the first species and second species may be deposited alternatingly on the surface.

In certain embodiments, the first species and/or the second species may contact the surface (e.g., at least a portion of the surface) such that the first species and/or the second species form a bond with the surface. In some cases, the first species and the second species may form a bond with one another. For example, the bond (e.g., the bond with the surface, the bond between the first species and the second species) may include a bond such as an ionic bond, a covalent bond (e.g., carbon-carbon, carbon-oxygen, oxygen-silicon, sulfur-sulfur, phosphorus-nitrogen, carbon-nitrogen, metal-oxygen, or other covalent bonds), a hydrogen bond (e.g., between hydroxyl, amine, carboxyl, thiol, and/or similar functional groups), a dative bond (e.g., complexation or chelation between metal ions and monodentate or multidentate ligands), a van der Waals interaction, a halogen bond, a biospecific interaction (e.g., a sugar-lectin interaction), a cation-dipole interaction, and the like.

Figure 1C:
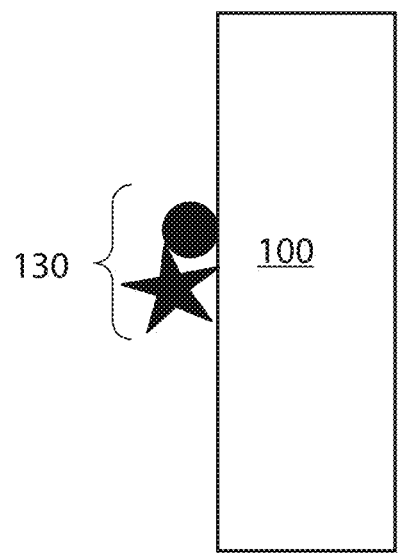
FIG. 1C shows an exemplary schematic illustration of a reaction product on a surface.

In certain embodiments, as shown FIG. 1C, first species 110 and second species 120 may react proximate (e.g., adjacent, directly adjacent) the surface such that a reaction product 130 is formed. In some embodiments, reaction product 130 comprises first species 110 and second species 120 (e.g., first species 110 bound to second species 120). In certain embodiments, the reaction product is formed from a reaction of the first species and the second species.

Application of the first species and/or the second species on the surface may comprise any suitable method. In some embodiments, at least one of the species may be applied to the surface by spraying a composition comprising the species onto the surface. In certain embodiments, at least one of the species may be applied to the surface by dipping the surface in a composition comprising the species. For example, in some embodiments, a first composition comprising the first species and/or a second composition comprising the second species may be applied to the surface. In some embodiments, both a first species and a second species may be applied by spraying a first composition comprising the first species and a second composition comprising the second species. In certain embodiments, a first species may be applied by dipping a surface in a first composition comprising the first species and a second species may be applied by spraying a second composition comprising the second species onto the surface. In certain embodiments, a second species may be applied by dipping a surface in a second composition comprising the second species and a first species may be applied by spraying a first composition comprising the first species onto the surface. In some embodiments, a first composition may be applied by dipping the surface in a first composition comprising the first species and a second composition may be applied by dipping the surface in a second composition comprising the second species. As used herein, exposure of a surface to composition or species should be understood to be equivalent to applying the composition or species to the surface.

According to certain embodiments, the entirety of the surface is exposed to (e.g., in direct contact with) both the first composition and the second composition. In some embodiments, a first portion of the surface is exposed to the first composition. In some embodiments, a second portion of the surface is exposed to the second composition (e.g., after exposure of the surface to the first composition). In certain embodiments, the first portion and the second portion may at least partially overlap. In certain embodiments, the first portion and the second portion may entirely overlap.

In some embodiments, the surface may be exposed to both a first composition and a second composition essentially simultaneously. In some embodiments, simultaneous exposure of a surface to a first composition and a second composition encompasses exposure of the surface to the second composition prior to removal of the first composition from the surface (or exposure to a first composition prior to removal of the second composition). Removal may occur by any means, such as sliding or bouncing off the surface, being blown off the surface, and/or evaporating from the surface. In certain embodiments, simultaneous exposure of a surface to a first composition and a second composition encompasses exposure of the surface to the second composition prior to deposition of the first composition onto the first surface (or exposure to the first composition prior to deposition of any component of the second composition). Deposition may occur by any means such as evaporation of a carrier fluid, chemical reaction between a species and the surface, or the like.

In certain embodiments, at least a portion of the surface may be exposed to a third composition. In some embodiments, the third composition may comprise neither the first species nor the second species. For example, the third composition may comprise a third species (e.g., an active agent such as a pesticide), different than the first species and the second species. In some embodiments, the third composition and/or the third species would not be retained on the surface prior to the deposition of the first species and the second species on the surface (and/or formation of the reaction product on the surface). In certain embodiments, the third composition and/or the third species is retained on the surface after deposition of the first species and the second species on the surface (and/or formation of the reaction product on the surface). In some cases, the third species may be retained on the surface in a greater amount after deposition of the first species and the second species on the surface (and/or formation of the reaction product on the surface) as compared to prior to the deposition of the first species and the second species on the surface (and/or formation of the reaction product on the surface).

In some embodiments, the surface may be exposed to the third composition over a period of time that at least partially overlaps with its exposure to one or more of the first species and the second species. For example, the first composition, the second composition, and the third composition may be deposited on the surface substantially simultaneously. In some embodiments, the surface may be exposed to the third composition over a period of time that does not overlap with its exposure to the first species and the second species. For example, the third composition may be deposited on the surface after the deposition of the first species and the second species on the surface.

The first species and the second species may comprise any suitable element, molecule, or compound. In some embodiments, the first species and the second species may have opposite charge. In some embodiments, at least one of first species and the second species may comprise a polyelectrolyte. In some embodiments, both the first species and the second species comprise polyelectrolytes. In certain embodiments, one or more of the species may comprise a natural polyelectrolyte, such as a nucleic acid, poly(L-lysine), poly(L-glutamic acid), carrageenan, heparin, alginate, alginic acid, and hyaluronic acid. In certain embodiments, one or more of the species may comprise a chemically modified biopolymer, such as pectin, chitosan, a cellulose-based polyelectrolyte, a starch-based polyelectrolyte, and a dextran-based polyelectrolyte. In some embodiments, one or more of the species may comprise a synthetic polyelectrolyte, such as poly(ethyleneimine), poly(vinylbenzyltrialkyl ammonium), poly(4-vinyl-N-alkylpyridinium), poly(acryloyloxyalkyltrialkyl ammonium), poly(acrylamidoalkyltrialkyl ammonium), poly(diallyldimethyl ammonium), poly(styrene sulfonic acid), poly(vinyl sulfonic acid), poly(acrylic acid), poly(methacrylic acid), poly(itaconic acid), and a malic acid diallylamine copolymer. In some embodiments one or more of the first or second species may comprise a biodegradable polyelectrolyte, a non-toxic polyelectrolyte, and/or a polysaccharide.

In some embodiments, the first composition and the second composition comprise only non-toxic materials. For example, in certain embodiments, one or more of the composition, the species (e.g., the polyelectrolyte), and/or the active agent include substantially no materials other than those included on the FDA's "Generally Recognized as Safe" Substances database and/or listed in 21 C.F.R. § 182.

The term "toxic" refers to a substance showing detrimental, deleterious, harmful, or otherwise negative effects on a subject, tissue, or cell when or after administering the substance to the subject or contacting the tissue or cell with the substance, compared to the subject, tissue, or cell prior to administering the substance to the subject or contacting the tissue or cell with the substance. In certain embodiments, the effect is death or destruction of the subject, tissue, or cell. In certain embodiments, the effect is a detrimental effect on the metabolism of the subject, tissue, or cell. In certain embodiments, a toxic substance is a substance that has a median lethal dose (LD50) of not more than 500 milligrams per kilogram of body weight when administered orally to an albino rat weighing between 200 and 300 grams, inclusive. In certain embodiments, a toxic substance is a substance that has an LD50 of not more than 1,000 milligrams per kilogram of body weight when administered by continuous contact for 24 hours (or less if death occurs within 24 hours) with the bare skin of an albino rabbit weighing between two and three kilograms, inclusive. In certain embodiments, a toxic substance is a substance that has an LC50 in air of not more than 2,000 parts per million by volume of gas or vapor, or not more than 20 milligrams per liter of mist, fume, or dust, when administered by continuous inhalation for one hour (or less if death occurs within one hour) to an albino rat weighing between 200 and 300 grams, inclusive.

The term "non-toxic" refers to a substance that is not toxic. Toxic compounds include, e.g., oxidative stressors, nitrosative stressors, proteasome inhibitors, inhibitors of mitochondrial function, ionophores, inhibitors of vacuolar ATPases, inducers of endoplasmic reticulum (ER) stress, and inhibitors of endoplasmic reticulum associated degradation (ERAD). In some embodiments a toxic agent selectively causes damage to nervous system tissue. Toxic compounds include compounds that are directly toxic and agents that are metabolized to or give rise to substances that are directly toxic. It will be understood that the term "toxic compounds" typically refers to compounds that are not ordinarily present in a cell's normal environment at sufficient levels to exert detectable damaging effects. However, in some cases, the toxic compounds may be present in a cell's normal environment but at concentrations significantly less than present in the auxiliary materials described herein. Typically toxic compounds exert damaging effects when present at a relatively low concentration, e.g., at or below 1 mM e.g., at or below 500 microM, e.g., at or below 100 microM. It will be understood that a toxic compound typically has a threshold concentration below which it does not exert detectable damaging effects. The particular threshold concentration will vary depending on the agent and, potentially, other factors such as cell type, other agents present in the environment, etc.

As described above, certain embodiments relate to the formation of a reaction product adjacent the surface (e.g., directly adjacent the surface). As used herein, when a component (e.g., a reaction product) is referred to as being "adjacent" another component (e.g., a surface), it can be directly adjacent to the component, or an intervening component (e.g., a fluid) also may be present. A component that is "directly adjacent" another component means that no intervening component is present (e.g., the component and another component are in contact with one another). In certain embodiments, at least a portion of the reaction product is bonded to the surface (by, e.g., van der Waals forces, covalent bonding, ionic bonding, and the like).

The reaction product may be formed by any suitable means. In some embodiments, the reaction product may form due an interaction between the first composition and the second composition, or between the first species and the second species. According to some embodiments, the reaction product may form due to a precipitation reaction of the first and second species from one or more carrier fluids. In certain embodiments, the reaction product may form due to an electrostatic interaction between the first species and the second species. According to some embodiments, the reaction product may form due to an acid-base reaction. In certain embodiments, the reaction product may form due to a coacervation reaction. Other reactions may also be used to generate a reaction product. In some embodiments, forming the reaction product may comprise forming a polyelectrolyte complex.

In some embodiments, the reaction product may comprise both the first species and the second species.

Figure 2:
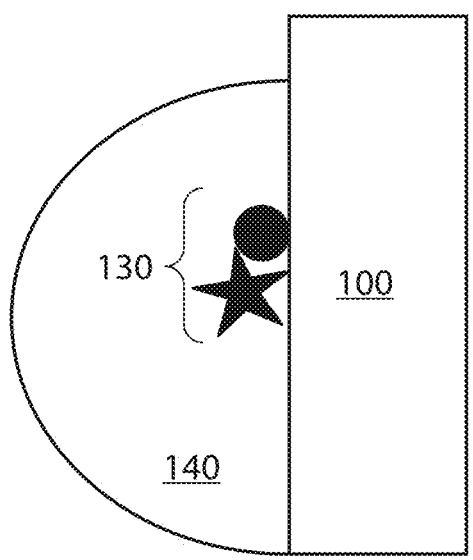
FIG. 2 shows, according to certain embodiments, a schematic illustration of a fluid in contact with a reaction product on a surface.

Referring now to FIG. 2, in certain embodiments, reaction product 130 may be capable of altering the behavior of a fluid 140 that is in deposited on surface 100. For example, absent reaction product 130, fluid 140 may not be retained on surface 100. In some embodiments, reaction product 130 is adjacent (e.g., directly adjacent) surface 100 and fluid 140 is retained by (e.g., maintains contact with) surface 100. In some embodiments, in the absence of the reaction product, fluid 140 would retract from the surface (e.g., the fluid would be repelled by the surface) but would not retract from the surface in the presence of a reaction product.

In certain embodiments, a surface comprising a reaction product may be capable of pinning a droplet (e.g., a water droplet). As used herein, pinning a droplet refers to the interaction of a surface with a droplet such that the droplet does not bounce and/or roll off of a surface. Pinning a droplet may comprise retaining at least a portion (or substantially all) of a liquid present in the droplet on the surface (e.g., in some embodiments the droplet as a whole may be retained by the surface; in some embodiments, a portion of the droplet may bounce or roll of the surface and a portion of the droplet may be retained by the surface). In some cases, prior to the formation of the reaction product on the surface, the droplet may roll off of the surface and, after formation of the reaction product on the surface, the droplet may be pinned to the surface. In some embodiments, the droplet is partially pinned to the surface such that a streak comprising fluid from the droplet is formed on the surface after the droplet interacts with the surface. In certain embodiments, the droplet is fully pinned to the surface such that the entirety of the droplet is retained on the surface. As used herein, not pinning a droplet refers to interacting with a droplet such that no droplet residue is present on the surface after the droplet interacts with the surface.

In some embodiments, the ability of a surface to pin a droplet may be quantified by the pinning number. That is to say, in some embodiments, the surface comprising a reaction product (e.g., formed by the reaction of two or more polyelectrolytes) may have a particular pinning number with respect to droplets. As used herein, the pinning number is defined by the following formula:

$$Pi = \frac{e_0^2 \rho V^2}{\sigma l^2 \varphi C \dfrac{N_{avogadro}}{N_{reactive\ groups/defect}}},$$

where Pi is the pinning number, $$e_0 = \left(\frac{m_b v_b^2}{m_i v_i^2}\right)^{0.5},$$

$m_b$ is the mass or the droplet after impact with another droplet, $m_i$ is the mass of the droplet before impact with another droplet, $v_b$ is the velocity of the droplet after impact with another droplet, $v_i$ is the velocity of the droplet before impact with another droplet, $\rho$ is the density of the droplet, V is its impact velocity of the droplet, $\sigma$ is the surface tension of the droplet, l is the reaction product size, $\varphi$ is the fraction of polyelectrolytes that precipitate during the impact, C is the volumetric molar concentration of reactive groups (e.g., for polymeric species, the volumetric molar concentration of monomers), $N_{avogadro}$ is Avogadro's number, and $N_{reactive\ groups/defect}$ is the number of reaction groups present in each defect on average. In certain embodiments, the pinning number of a droplet on a surface after formation of the reaction product on the surface may be greater than or equal to 0.01, greater than or equal to 0.02, greater than or equal to 0.05, greater than or equal to 0.1, greater than or equal to 0.2, greater than or equal to 0.5, greater than or equal to 1, greater than or equal to 2, greater than or equal to 5, greater than or equal to 10, greater than or equal to 20, or greater than or equal to 50. In certain embodiments, the pinning number of a droplet on a surface may be less than or equal to 100, less than or equal to 50, less than or equal to 20, less than or equal to 10, less than or equal to 5, less than or equal to 2, less than or equal to 1, less than or equal to 0.5, less than or equal to 0.2, less than or equal to 0.1, less than or equal to 0.05, or less than or equal to 0.02. Combinations of the above-referenced ranges are also possible (e.g., greater than or equal to 0.01 and less than or equal to 100, or greater than or equal to 0.01 and less than or equal to 10). Other ranges are also possible.

In some embodiments, the contact angle of a fluid on the surface may be altered by the presence of a reaction product. For instance, in certain embodiments the contact angle of a fluid (e.g., water) on the surface may be relatively high in the absence of a reaction product. In some embodiments, the contact angle of a fluid (e.g., water) on the surface adjacent a reaction product may be relatively low. In some cases, a reaction product adjacent the surface may lower the contact angle of a fluid (e.g., water) on the surface. For instance, in some embodiments the contact angle of a fluid (e.g., water) on the surface is greater than 90° prior to the formation of a reaction product adjacent the surface but less than 90° after the formation of a reaction product adjacent the surface.

In certain embodiments, the roll-off angle of a fluid on the surface may be altered by the presence of a reaction product. As used herein, the roll-off angle refers to the angle of surface tilt at which the droplet rolls off the surface under the influence of gravity. In certain embodiments the roll-off angle of a fluid (e.g., water) on the surface may be relatively low in the absence of a reaction product. In some embodiments, the roll-off angle of a fluid (e.g., water) on the surface adjacent a reaction product may be relatively high. In some cases, a reaction product adjacent the surface may increase the roll-off angle of a fluid (e.g., water) on the surface.

According to some embodiments, the presence of a reaction product on the surface may be capable of increasing the volume retained of a fluid (e.g., any one of the first, second, and third compositions) on the surface. In certain embodiments, the presence of reaction products on a surface would allow the surface to retain a larger amount of fluid (e.g., any one of the first, second, and third compositions) than the surface would retain in the absence of the reaction products. In certain embodiments, the fluid may be a composition that does not comprise a species which undergoes a reaction to form a reaction product (e.g., a third composition). In some embodiments, a surface at least partially coated by a reaction product may be capable of retaining a volume of the third composition that is greater than 100% of the volume that an otherwise identical surface not coated by a reaction product would retain, greater than or equal to 150% of the volume that an otherwise identical surface not coated by a reaction product would retain, greater than or equal to 200% of the volume that an otherwise identical surface not coated by a reaction product would retain, greater than or equal to 500% of the volume that an otherwise identical surface not coated by a reaction product would retain, greater than or equal to 1000% of the volume that an otherwise identical surface not coated by a reaction product would retain, greater than or equal to 1500% of the volume that an otherwise identical surface not coated by a reaction product would retain, greater than or equal to 2000% of the volume that an otherwise identical surface not coated by a reaction product would retain, greater than or equal to 2500% of the volume that an otherwise identical surface not coated by a reaction product would retain, or greater than or equal to 5000% of the volume that an otherwise identical surface not coated by a reaction product would retain. In some embodiments, a surface at least partially coated by a reaction product may be capable of retaining a volume of the third composition that is less than or equal to 10000% of the volume that an otherwise identical surface not coated by a reaction product would retain, less than or equal to 5000% of the volume that an otherwise identical surface not coated by a reaction product would retain, less than or equal to 2500% of the volume that an otherwise identical surface not coated by a reaction product would retain, less than or equal to 2000% of the volume that an otherwise identical surface not coated by a reaction product would retain, less than or equal to 1500% of the volume that an otherwise identical surface not coated by a reaction product would retain, less than or equal to 1000% of the volume that an otherwise identical surface not coated by a reaction product would retain, less than or equal to 500% of the volume that an otherwise identical surface not coated by a reaction product would retain, less than or equal to 200% of the volume that an otherwise identical surface not coated by a reaction product would retain, or less than or equal to 150% of the volume that an otherwise identical surface not coated by a reaction product would retain. Combinations of the above-referenced ranges are also possible (e.g., greater than 100% and less than or equal to 10000%). Other ranges are also possible. In certain embodiments, minimal or no volume of the third composition would be retained in the absence of the reaction product whereas some volume or a substantial volume of the third composition is retained on a surface comprising a reaction product. In some cases, even larger percent increases in the volume retained may be possible. The volume of fluid retained by a surface can be determined by weighing the surface before and after exposure occurs and dividing the additional weight accrued during the exposure process by the density of the fluid.

In some embodiments, a surface at least partially coated by a reaction product may be capable of retaining a weight of the third composition that is greater than 100% of the weight that an otherwise identical surface not coated by a reaction product would retain, greater than or equal to 150% of the weight that an otherwise identical surface not coated by a reaction product would retain, greater than or equal to 200% of the weight that an otherwise identical surface not coated by a reaction product would retain, greater than or equal to 500% of the weight that an otherwise identical surface not coated by a reaction product would retain, greater than or equal to 1000% of the weight that an otherwise identical surface not coated by a reaction product would retain, greater than or equal to 1500% of the weight that an otherwise identical surface not coated by a reaction product would retain, greater than or equal to 2000% of the weight that an otherwise identical surface not coated by a reaction product would retain, greater than or equal to 2500% of the weight that an otherwise identical surface not coated by a reaction product would retain, or greater than or equal to 5000% of the weight that an otherwise identical surface not coated by a reaction product would retain. In some embodiments, a surface at least partially coated by a reaction product may be capable of retaining a weight of the third composition that is less than or equal to 10000% of the weight that an otherwise identical surface not coated by a reaction product would retain, less than or equal to 5000% of the weight that an otherwise identical surface not coated by a reaction product would retain, less than or equal to 2500% of the weight that an otherwise identical surface not coated by a reaction product would retain, less than or equal to 2000% of the weight that an otherwise identical surface not coated by a reaction product would retain, less than or equal to 1500% of the weight that an otherwise identical surface not coated by a reaction product would retain, less than or equal to 1000% of the weight that an otherwise identical surface not coated by a reaction product would retain, less than or equal to 500% of the weight that an otherwise identical surface not coated by a reaction product would retain, less than or equal to 200% of the weight that an otherwise identical surface not coated by a reaction product would retain, or less than or equal to 150% of the weight that an otherwise identical surface not coated by a reaction product would retain. Combinations of the above-referenced ranges are also possible (e.g., greater than 100% and less than or equal to 10000%). Other ranges are also possible In certain embodiments, minimal or no weight of the third composition would be retained in the absence of the reaction product but some weight or a substantial weight of the third composition is retained on a surface comprising a reaction product. In this case, even larger percent increases in the weight retained may be possible. The weight of fluid retained by a surface can be determined by weighing the surface before and after exposure occurs.

In some embodiments, the ratio of the surface coverage by a third composition of a surface at least partially covered by a reaction product to the surface coverage by a third composition of an otherwise identical surface not coated by the reaction product may be greater than 1, greater than or equal to 1.5, greater than or equal to 2, greater than or equal to 5, greater than or equal to 10, greater than or equal to 15, greater than or equal to 20, greater than or equal to 25, or greater than or equal to 50. In some embodiments, the ratio of the surface coverage by a third composition of a surface at least partially covered by a reaction product to the surface coverage by a third composition of an otherwise identical surface not coated by the reaction product may be less than or equal to 100, less than or equal to 50, less than or equal to 25, less than or equal to 20, less than or equal to 15, less than or equal to 10, less than or equal to 5, less than or equal to 2, or less than or equal to 1.5. Combinations of the above-referenced ranges are also possible (e.g., greater than 1 and less than or equal to 100). Other ranges are also possible. In certain embodiments, minimal or no surface coverage by the third composition would occur in the absence of the reaction product but some surface coverage or a substantial surface coverage by the third composition occurs on a surface comprising a reaction product. In this case, even larger percent increases in the surface coverage may be possible. The surface coverage can be determined by optical microscopy.

In some embodiments, one or more of the first composition and the second composition may be a fluid. In certain such embodiments, formation of the reaction product during the exposure of the surface to the first and second compositions may result in an increased retention of the fluid (comprising either one or both of the first composition and the second composition) by the surface. In some embodiments, exposure of the surface to both the first composition and the second composition essentially simultaneously may result in a higher level of fluid retention by the surface than exposure of the surface to either composition alone, exposure to the first composition and the second composition sequentially, or by exposure of the surface to neither composition. According to certain embodiments, the ratio of the volume of fluid retained by the surface when the surface is exposed to both the first composition and the second composition essentially simultaneously to the volume of the fluid retained by the surface when the surface is exposed to an equivalent amount either the first composition or the second composition is greater than 1, greater than or equal to 1.5, greater than or equal to 2, greater than or equal to 5, greater than or equal to 10, greater than or equal to 15, greater than or equal to 20, greater than or equal to 25, or greater than or equal to 50. In some embodiments, the ratio of the volume of fluid retained by the surface when the surface is exposed to both the first composition and the second composition essentially simultaneously to the volume of the fluid retained by the surface when the surface is exposed to an equivalent amount either the first composition or the second composition is less than or equal to 100, less than or equal to 50, less than or equal to 25, less than or equal to 20, less than or equal to 15, less than or equal to 10, less than or equal to 5, less than or equal to 2, or less than or equal to 1.5. Combinations of the above-referenced ranges are also possible (e.g., greater than 1 and less than or equal to 100). Other ranges are also possible. In certain embodiments, minimal or no volume of fluid would be retained when the surface is exposed to either the first composition or the second composition alone, but some volume or a substantial volume of fluid is retained on the surface when it is exposed to the first composition and the second composition essentially simultaneously. In this case, even larger percent increases in the volume may be possible.

According to certain embodiments, the ratio of the weight of the fluid retained by the surface when the surface is exposed to both the first composition and the second composition essentially simultaneously to the weight of the fluid retained by the surface when the surface is exposed to an equivalent amount either the first composition or the second composition is greater than 1, greater than or equal to 1.5, greater than or equal to 2, greater than or equal to 5, greater than or equal to 10, greater than or equal to 15, greater than or equal to 20, greater than or equal to 25, or greater than or equal to 50. In some embodiments, the ratio of the weight of the fluid retained by the surface when the surface is exposed to both the first composition and the second composition essentially simultaneously to the weight of the fluid retained by the surface when the surface is exposed to an equivalent amount either the first composition or the second composition is less than or equal to 100, less than or equal to 50, less than or equal to 25, less than or equal to 20, less than or equal to 15, less than or equal to 10, less than or equal to 5, less than or equal to 2, or less than or equal to 1.5. Combinations of the above-referenced ranges are also possible (e.g., greater than 1 and less than or equal to 100). Other ranges are also possible. In certain embodiments, minimal or no weight of the fluid would be retained when the surface is exposed to either the first composition or the second composition alone, but some weight or a substantial weight of the fluid is retained on the surface when it is exposed to the first composition and the second composition essentially simultaneously. In this case, even larger percent increases in the weight retained may be possible.

In certain embodiments, essentially simultaneously exposing the surface to both the first composition and the second composition may result in a larger surface coverage (i.e., the percent of the area of the surface that is covered by a fluid comprising either one or both of the first composition and the second composition) than exposing the surface to either composition alone or exposing the surface to the compositions non-simultaneously. In some embodiments, the ratio of the surface coverage when the surface is exposed to both the first composition and the second composition essentially simultaneously to the surface coverage when the surface is exposed to an equivalent amount either the first composition or the second composition alone is greater than 1, greater than or equal to 1.5, greater than or equal to 2, greater than or equal to 5, greater than or equal to 10, greater than or equal to 15, greater than or equal to 20, greater than or equal to 25, or greater than or equal to 50. In some embodiments, the ratio of the surface coverage when the surface is exposed to both the first composition and the second composition essentially simultaneously to the surface coverage when the surface is exposed to an equivalent amount either the first composition or the second composition is less than or equal to 100, less than or equal to 50, less than or equal to 25, less than or equal to 20, less than or equal to 15, less than or equal to 10, less than or equal to 5, less than or equal to 2, or less than or equal to 1.5. Combinations of the above-referenced ranges are also possible (e.g., greater than 1 and less than or equal to 100). Other ranges are also possible. In certain embodiments, minimal or no surface coverage is achieved when the surface is exposed to either the first composition or the second composition alone, but some surface coverage or substantial surface coverage is achieved on the surface when it is exposed to the first composition and the second composition essentially simultaneously. In this case, even larger percent increases in the surface coverage may be possible.

The reaction product may have any suitable morphology. In certain embodiments, at least two species from which the reaction product is formed may be proximate the surface or may coat the surface. In some embodiments, the reaction product may comprise two polyelectrolytes of opposite charge, and both polyelectrolytes may be proximate the surface or may coat the surface.

In certain embodiments, the reaction product may have a substantially unvarying composition in a direction perpendicular to the surface. For instance, the composition of a portion of the reaction product that is adjacent the surface may have a substantially similar composition to a portion of the reaction product that is within the interior of the reaction product. In certain embodiments, the composition of the reaction product may be substantially unvarying throughout its interior. In some embodiments, a wetting layer may be present on one or more of the external surfaces of the reaction product. Such wetting layers may comprise molecules or portions of molecules which have lower surface energies or which have favorable surface interactions with the surface of the substrate. In some embodiments, a wetting layer, if present, may be relatively thin; for instance, the thickness of a wetting layer may be on the order of Angstroms (e.g., less than or equal to 1 nm).

In certain embodiments, the reaction product may cover a relatively small percentage of the surface. For instance, in some embodiments, the reaction product may cover less than or equal to 100% of the surface, less than or equal to 75% of the surface, less than or equal to 50% of the surface, less than or equal to 25% of the surface, less than or equal to 20% of the surface, less than or equal to 15% of the surface, less than or equal to 10% of the surface, less than or equal to 5% of the surface, less than or equal to 2.5% of the surface, less than or equal to 1% of the surface, or less than or equal to 0.5% of the surface. In some embodiments, the reaction product may cover greater than 0% of the surface, greater than or equal to 1% of the surface, greater than or equal to 2.5% of the surface, greater than or equal to 5% of the surface, greater than or equal to 10% of the surface, greater than or equal to 15% of the surface, greater than or equal to 20% of the surface, greater than or equal to 25% of the surface, greater than or equal to 50% of the surface, or greater than or equal to 75% of the surface. Combinations of the above-referenced ranges are also possible (e.g., greater than 0% of the surface and less than or equal to 100% of the surface). Other ranges are also possible.

In some embodiments, the reaction product may comprise one or more particles that are proximate the surface or coat the surface. The particles may have any suitable morphology (e.g., spherical, cylindrical, fractal, etc.) and may be any suitable size. In certain embodiments, the particles may be characterized by an average diameter. The average diameter, as used herein, is twice the average distance from the centroid of each particle to the surface of the particle averaged over the total number of particles. In some embodiments, the reaction product comprises particles with an average diameter of greater than or equal to 50 nm, greater than or equal to 100 nm, greater than or equal to 200 nm, greater than or equal to 500 nm, greater than or equal to 1 micron, greater than or equal to 2 microns, greater than or equal to 5 microns. In some embodiments, the reaction product comprises particles with an average diameter of less than or equal to 10 microns, less than or equal to 5 microns, less than or equal to 2 microns, less than or equal to 1 micron, less than or equal to 500 nm, less than or equal to 200 nm, or less than or equal to 100 nm. Combinations of the above-referenced ranges are also possible (e.g., greater than or equal to 50 nm and less than or equal to 10 microns). Other ranges are also possible.

According to some embodiments, the reaction product may be in the form of a layer on the surface. The layer may be continuous (e.g., each portion of the layer is topologically connected) or it may be discontinuous (e.g., some portions of the layer are not topologically connected to others). The layer, if present, may have any suitable thickness. In some embodiments, the reaction product may be in the form of a layer with a thickness of greater than or equal to 1 nm, greater than or equal to 5 nm, greater than or equal to 10 nm, greater than or equal to 25 nm, greater than or equal to 50 nm, greater than or equal to 100 nm, greater than or equal to 200 nm, greater than or equal to 500 nm, greater than or equal to 1 micron, greater than or equal to 2 microns, greater than or equal to 5 microns. In some embodiments, the reaction product may be in the form of a layer with a thickness of less than or equal to 10 microns, less than or equal to 5 microns, less than or equal to 2 microns, less than or equal to 1 micron, less than or equal to 500 nm, less than or equal to 200 nm, less than or equal to 100 nm, less than or equal to 50 nm, less than or equal to 25 nm, less than or equal to 10 nm, or less than or equal to 5 mm Combinations of the above-referenced ranges are also possible (e.g., greater than or equal to 5 nm and less than or equal to 10 microns). Other ranges are also possible.

In some embodiments, the reaction product may have a relatively high surface energy. In certain embodiments, the reaction product may have a higher surface energy than the surface. In some embodiments, the reaction product may have a surface energy of greater than or equal to 20 $mJ/m^2$, greater than or equal to 25 $mJ/m^2$, greater than or equal to 30 $mJ/m^2$, greater than or equal to 35 $mJ/m^2$, greater than or equal to 40 $mJ/m^2$, greater than or equal to 45 $mJ/m^2$, greater than or equal to 50 $mJ/m^2$, greater than or equal to 55 $mJ/m^2$, greater than or equal to 60 $mJ/m^2$, greater than or equal to 65 $mJ/m^2$, greater than or equal to 70 $mJ/m^2$, greater than or equal to 75 $mJ/m^2$, greater than or equal to 80 $mJ/m^2$, greater than or equal to 100 $mJ/m^2$, greater than or equal to 105 $mJ/m^2$, greater than or equal to 110 $mJ/m^2$, greater than or equal to 115 $mJ/m^2$, greater than or equal to 120 $mJ/m^2$, greater than or equal to 125 $mJ/m^2$, greater than or equal to 130 $mJ/m^2$, greater than or equal to 135 $mJ/m^2$, greater than or equal to 140 $mJ/m^2$, or greater than or equal to 145 $rd/m^2$. In certain embodiments, the reaction product may have a surface energy of less than or equal to 150 $mJ/m^2$, less than or equal to 140 $mJ/m^2$, less than or equal to 135 $mJ/m^2$, less than or equal to 130 $mJ/m^2$, less than or equal to 125 $mJ/m^2$, less than or equal to 120 $mJ/m^2$, less than or equal to 115 $mJ/m^2$, less than or equal to 110 $mJ/m^2$, less than or equal to 105 $mJ/m^2$, less than or equal to 100 $mJ/m^2$, less than or equal to 95 $mJ/m^2$, less than or equal to 90 $mJ/m^2$, less than or equal to 85 $mJ/m^2$, less than or equal to 80 $mJ/m^2$, less than or equal to 75 $mJ/m^2$, less than or equal to 70 $mJ/m^2$, less than or equal to 65 $mJ/m^2$, less than or equal to 60 $mJ/m^2$, less than or equal to 55 $mJ/m^2$, less than or equal to 50 $mJ/m^2$, less than or equal to 45 $mJ/m^2$, less than or equal to 40 mJ/m², less than or equal to 35 mJ/m², less than or equal to 30 mJ/m², or less than or equal to 25 mJ/m². Combinations of the above-referenced ranges are also possible (e.g., greater than or equal to 20 mJ/m² and less than or equal to 150 mJ/m²). Other ranges are also possible.

The reaction product may comprise any suitable components. In some embodiments, the reaction product may comprise two species which have opposite charge. In certain embodiments, the reaction product may comprise two species which are bound together through ionic interactions. In some embodiments, the reaction product may a comprise salt. In some embodiments, the reaction product may comprise a coacervate. In certain embodiments, the reaction product may comprise water.

As described above, certain embodiments relate to surfaces and surfaces which are at least partially covered by reaction products. References to surfaces herein should be understood to encompass surfaces that are uncoated by reaction products, surfaces that are at least partially coated by a reaction product (where surface is understood to comprise the base surface but not the reaction product), and surfaces that comprise a reaction product coating at least a portion of their area (where the surface is understood to comprise the base surface and the reaction product). References to substrates herein should be understood to correspond to materials that comprise a surface which is exposed to the first species and the second species. References to the base surface herein should be understood to correspond to portions of the surface that are either coated or uncoated by reaction products (i.e., portions of the surface that are not reaction products).

In some embodiments, a surface may be a hydrophobic surface. In certain embodiments a surface may be a superhydrophobic surface. In some embodiments, a surface may be a superhydrophobic surface prior to exposure of the surface to either the first composition or the second composition. Such surfaces are typically, but not always, surfaces that do not comprise reaction products. As used herein, hydrophobic surfaces are surfaces where the contact angle of water on the surface is greater than 90°, superhydrophobic surfaces are surfaces where the contact angle of the water on the surface is greater than or equal to 150°, and hydrophilic surfaces are surfaces where the contact angle of water on the surface is less than or equal to 90°, as measured using goniometry. In some embodiments, a surface may comprise both regions that are hydrophobic (i.e., regions where, if the entirety of the surface had the same hydrophilicity as the hydrophobic region, would have a contact angle of water of greater than or equal to 90°) and regions that are hydrophilic (i.e., regions where, if the entirety of the surface had the same hydrophilicity as the hydrophilic region, would have a contact angle of water of less than or equal to 90°). Such surfaces are typically, but not always, surfaces that comprise reaction products. The uncoated regions of the surface may be hydrophobic and the reaction product may be hydrophilic. The hydrophilicity or hydrophobicity of the surface as a whole or of regions of the surface onto which a water drop can be placed may be measured by the macroscopic contact angle of water on the surface. The hydrophilicity or hydrophobicity of regions of the surface too small for the placement of a water droplet may be determined by determining the surface chemistry and measuring the contact angle of a water droplet on a macroscopic surface with identical surface chemistry.

In certain embodiments, the surface may be superhydrophobic and/or have a relatively low surface energy while also being capable of contacting an aqueous fluid after a reaction product has formed. In some embodiments, such surfaces may be macroscopically hydrophobic (i.e., have a water contact angle of greater than or equal to 150°) but may have hydrophilic regions or other regions that are capable of attracting water. In certain embodiments, an aqueous fluid may coat greater than or equal to 1% of a superhydrophobic surface, greater than or equal to 5% of a superhydrophobic surface, greater than or equal to 10% of a superhydrophobic surface, greater than or equal to 25% of a superhydrophobic surface, greater than or equal to 50% of a superhydrophobic surface, greater than or equal to 75% of a superhydrophobic surface, or greater than or equal to 95% of a superhydrophobic surface. In certain embodiments, an aqueous fluid may coat less than or equal to 100% of a superhydrophobic surface, less than or equal to 95% of a superhydrophobic surface, less than or equal to 75% of a superhydrophobic surface, less than or equal to 50% of a superhydrophobic surface, less than or equal to 25% of a superhydrophobic surface, less than or equal to 10% of a superhydrophobic surface, or less than or equal to 5% of a superhydrophobic surface. Combinations of the above-referenced ranges are also possible (e.g., greater than or equal to 1% of a superhydrophobic surface and less than or equal to 99% of a superhydrophobic surface). Other ranges are also possible.

According to some embodiments, a surface may comprise hydrophilic regions and the hydrophilic regions of may have a relatively small characteristic length scale. As used herein, the characteristic length scale for the hydrophilic regions of the surface is twice the average distance from the center of each hydrophilic region to the perimeter of that region averaged over the number of hydrophilic regions. In certain embodiments, the characteristic length scale for the hydrophilic regions may be greater than or equal to 1 nm, greater than or equal to 5 nm, greater than or equal to 10 nm, greater than or equal to 25 nm, greater than or equal to 50 nm, greater than or equal to 100 nm, greater than or equal to 200 nm, greater than or equal to 500 nm, greater than or equal to 1 micron, greater than or equal to 2 microns, greater than or equal to 5 microns. In some embodiments, the characteristic length scale for the hydrophilic regions of the surface may be less than or equal to 10 microns, less than or equal to 5 microns, less than or equal to 2 microns, less than or equal to 1 micron, less than or equal to 500 nm, less than or equal to 200 nm, less than or equal to 100 nm, less than or equal to 50 nm, less than or equal to 25 nm, less than or equal to 10 inn, or less than or equal to 5 nm. Combinations of the above-referenced ranges are also possible (e.g., greater than or equal to 1 nm and less than or equal to 10 microns). Other ranges are also possible.

In some embodiments, the surface (e.g., the surface prior to exposure to either the first composition or the second composition) may be hydrophobic (e.g., superhydrophobic). In some embodiments, the surface (e.g., the surface prior to exposure to either the first composition or the second composition) may be hydrophilic and may be subject to droplet roll-off under certain conditions. In certain embodiments, the contact angle of water on the surface (e.g., prior to exposure to either the first composition or the second composition) is greater than or equal to 10°, greater than or equal to 20°, greater than or equal to 30°, greater than or equal to 40°, greater than or equal to 50°, greater than or equal to 60°, greater than or equal to 70°, greater than or equal to 80°, greater than or equal to 90°, greater than or equal to 100°, greater than or equal to 110°, greater than or equal to 120°, greater than or equal to 130°, greater than or equal to 140°, greater than or equal to 150°, greater than or equal to 160°, greater than or equal to 170°, greater than or equal to 175°, or greater than or equal to 179°. In some embodiments, the contact angle of water on the is less than or equal to 180°, less than or equal to 179°, less than or equal to 175°, less than or equal to 170°, less than or equal to 160°, less than or equal to 150°, less than or equal to 140°, less than or equal to 130°, less than or equal to 120°, less than or equal to 110°, less than or equal to 100°, less than or equal to 90°, less than or equal to 80°, less than or equal to 70°, less than or equal to 60°, less than or equal to 50°, less than or equal to 40°, less than or equal to 30°, or less than or equal to 20°. Combinations of the above-referenced ranges are also possible (e.g., greater than or equal to 90° and less than or equal to 180°, or greater than or equal to 10° and less than or equal to) 180°. Other ranges are also possible. In certain embodiments, the surface may have a contact angle during and/or after exposure to the first composition and the second composition in one or more ranges described above. For example, in some embodiments, the surface may be hydrophobic after exposure to the first composition and the second composition. In some such embodiments, the contact angle of the surface prior to exposure to either the first composition and/or the second composition may be greater than the contact angle of the surface after exposure to the first composition and the second composition.

In some embodiments, the surface may be hydrophilic (e.g., prior to exposure to either the composition or the second composition, during exposure to the first composition and the second composition, and/or after exposure to both the first composition and the second composition).

In certain embodiments, the surface may have a relatively low roll-off angle of a fluid (e.g., water) prior to exposure to the first composition and the second composition. In some embodiments, the surface may have a roll-off angle of less than or equal to 90°, less than or equal to 80°, less than or equal to 70°, less than or equal to 60°, less than or equal to 50°, less than or equal to 40°, less than or equal to 30°, less than or equal to 20°, less than or equal to 10°, less than or equal to 5°, less than or equal to 2°, or less than or equal to 1° prior to exposure to the first composition and the second composition. In some embodiments, the surface may have a roll-off angle of a fluid (e.g., water) of greater than or equal to 0°, greater than or equal to 1°, greater than or equal to 2°, greater than or equal to 5°, greater than or equal to 10°, greater than or equal to 20°, greater than or equal to 30°, greater than or equal to 40°, greater than or equal to 50°, greater than or equal to 60°, greater than or equal to 70°, or greater than or equal to 80° prior to exposure to the first composition and the second composition. Combinations of the above-referenced ranges are also possible (e.g., greater than or equal to 0° and less than or equal to 90°, or greater than or equal to 0° and less than or equal to 20°). Other ranges are also possible.

In certain embodiments, the surface may have a relatively high roll-off angle of a fluid (e.g., water) after exposure to the first composition and the second composition. In some embodiments, the surface may have a roll-off angle of greater than or equal to 0°, greater than or equal to 1°, greater than or equal to 2°, greater than or equal to 5°, greater than or equal to 10°, greater than or equal to 20°, greater than or equal to 30°, greater than or equal to 40°, greater than or equal to 50°, greater than or equal to 60°, greater than or equal to 70°, greater than or equal to 80°, or greater than or equal to 90° after exposure to the first composition and the second composition. In some embodiments, the surface may have a roll-off angle of a fluid (e.g., water) of less than or equal to 180°, less than or equal to 90°, less than or equal to 80°, less than or equal to 70°, less than or equal to 60°, less than or equal to 50°, less than or equal to 40°, less than or equal to 30°, less than or equal to 20°, less than or equal to 10°, less than or equal to 5°, less than or equal to 2°, or less than or equal to 1° after exposure to the first composition and the second composition. Combinations of the above-referenced ranges are also possible (e.g., greater than or equal to 20° and less than or equal to 180°, or greater than or equal to 90° and less than or equal to 180°). Other ranges are also possible.

In some embodiments, the ratio of the roll-off angle of a fluid (e.g., water) after exposing the surface to the first composition and the second composition to the roll-off angle of the same fluid prior to exposing the surface to the first composition and the second composition is greater than 1, greater than or equal to 1.5, greater than or equal to 2, greater than or equal to 5, greater than or equal to 10, greater than or equal to 20, greater than or equal to 50, greater than or equal to 100, greater than or equal to 200, greater than or equal to 500, greater than or equal to 1000, greater than or equal to 2000, or greater than or equal to 5000. In some embodiments, the ratio of the roll-off angle of a fluid (e.g., water) after exposing the surface to the first composition and the second composition to the roll-off angle of the same fluid prior to exposing the surface to the first composition and the second composition is less than or equal to 10000, less than or equal to 5000, less than or equal to 2000, less than or equal to 1000, less than or equal to 500, less than or equal to 200, less than or equal to 100, less than or equal to 50, less than or equal to 20, less than or equal to 10, less than or equal to 2, or less than or equal to 1.5. Combinations of the above-referenced ranges are also possible (e.g., greater than 1 and less than or equal to 10000). Other ranges are also possible. It should also be understood that the roll-off angle of superhydrophobic surfaces may also be increased by the presence of reaction products. Such surfaces typically have roll-off angles of fluids such as water of close to 0° or identically 0°. In this case, even small increases in the roll-off angle result in large values for the above ratios. Accordingly, such ratios should be understood to refer to certain embodiments, and should not be understood to be limiting.

In certain embodiments, the surface (or the base of the surface) may have a relatively low surface energy. In some embodiments, the surface may have a surface energy of less than or equal to 150 mJ/m$^2$, less than or equal to 140 mJ/m$^2$, less than or equal to 130 mJ/m$^2$, less than or equal to 120 mJ/m$^2$, less than or equal to 110 mJ/m$^2$, less than or equal to 100 mJ/m$^2$, less than or equal to 90 mJ/m$^2$, less than or equal to 80 mJ/m$^2$, less than or equal to 70 mJ/m$^2$, less than or equal to 60 mJ/m$^2$, less than or equal to 50 mJ/m$^2$, less than or equal to 40 mJ/m$^2$, less than or equal to 30 mJ/m$^2$, less than or equal to 20 mJ/m$^2$, or less than or equal to 10 mJ/m$^2$. In some embodiments, the surface may have a surface energy of greater than or equal to 0 mJ/m$^2$, greater than or equal to 10 mJ/m$^2$, greater than or equal to 20 mJ/m$^2$, greater than or equal to 30 mJ/m$^2$, greater than or equal to 40 mJ/m$^2$, greater than or equal to 50 mJ/m$^2$, greater than or equal to 60 mJ/m$^2$, greater than or equal to 70 mJ/m$^2$, greater than or equal to 80 mJ/m$^2$, greater than or equal to 90 mJ/m$^2$, greater than or equal to 100 mJ/m$^2$, greater than or equal to 110 mJ/m$^2$, greater than or equal to 120 mJ/m$^2$, greater than or equal to 130 mJ/m$^2$, or greater than or equal to 140 mJ/m$^2$. Combinations of the above-referenced ranges are also possible (e.g., greater than or equal to 0 mJ/m$^2$ and less than or equal to 50 mJ/m$^2$, or greater than or equal to 0 mJ/m$^2$ and less than or equal to 150 mJ/m$^2$). Other ranges are also possible. Values above should be understood to refer to surface energies of the surface at any point in time (e.g., prior to exposure to either the composition or the second composition, during exposure to the first composition and the second composition, and/or after exposure to both the first composition and the second composition).

In some embodiments, the surface may be substantially uncharged (e.g., the surface may have a zeta potential of zero, or a zeta potential with an absolute value of less than or equal to 10 mV). In certain embodiments, the surface may have either a positive charge or a negative charge.

The surface may comprise any suitable material. In some embodiments, the surface is net neutrally charged. Advantageously, the compositions and methods described herein may be capable of depositing and/or forming reaction products on a net neutrally charged surface (e.g., without needing to charge the surface prior to deposition) as compared to other methods such as layer-by-layer deposition, which generally occurs on charged surfaces.

In some embodiments, the surface may comprise a glass. In certain embodiments, the surface may comprise silica. In some embodiments, the surface may comprise a wetting layer (i.e., a thin layer that coats the surface). The wetting layer may have any suitable chemistry suitable for wetting at least a portion of the surface. In some embodiments, the wetting layer may comprise a silane, such as octadecyltrichlorosilane.

In certain embodiments, the surface may be a surface of a plant, such as a surface of a leaf, a surface of a root, a surface of a fruit, a surface of a vegetable, or a surface of a flower. In some embodiments, the surface may comprise a surface of a produce item or a surface of a form of vegetation. In certain embodiments, the surface may comprise an edible non-toxic item such as a food item.

As described above, certain embodiments relate to exposing a surface to the first species and the second species. In some embodiments, the first species may be present in a first composition and the second species may be present in a second composition. The compositions may comprise a suitable carrier fluid, such as water. In some embodiments, the carrier fluid may be acidic water or basic water. In certain embodiments, the carrier fluid may be an aqueous solution that comprises a salt.

In some embodiments, the first species and the second species may have zeta potentials of opposite sign. As used herein, the zeta potential of a species in a fluid is the electric potential at the outermost surface of the interfacial double layer that surrounds the species in the fluid. The zeta potential of the first species may be either positive or negative, and may have any absolute value. In some embodiments, the absolute value of the zeta potential of the first species is greater than or equal to 0 mV, greater than or equal to 5 mV, greater than or equal to 10 mV, greater than or equal to 15 mV, greater than or equal to 20 mV, greater than or equal to 30 mV, greater than or equal to 40 mV, greater than or equal to 50 mV, greater than or equal to 60 mV, greater than or equal to 70 mV, greater than or equal to 80 mV, or greater than or equal to 90 mV. In some embodiments, the absolute value of the zeta potential of the first species is less than or equal to 100 mV, less than or equal to 90 mV, less than or equal to 80 mV, less than or equal to 70 mV, less than or equal to 60 mV, less than or equal to 50 mV, less than or equal to 40 mV, less than or equal to 30 mV, less than or equal to 20 mV, less than or equal to 10 mV, or less than or equal to 5 mV. Combinations of the above-referenced ranges are also possible (e.g., greater than or equal to 0 mV and less than or equal to 100 mV). Other ranges are also possible.

The zeta potential of a species may be measured by using a commercially available zeta sizer.

In some embodiments, the absolute value of the zeta potential of the second species is greater than or equal to 0 mV, greater than or equal to 5 mV, greater than or equal to 10 mV, greater than or equal to 15 mV, greater than or equal to 20 mV, greater than or equal to 30 mV, greater than or equal to 40 mV, greater than or equal to 50 mV, greater than or equal to 60 mV, greater than or equal to 70 mV, greater than or equal to 80 mV, or greater than or equal to 90 mV. In some embodiments, the absolute value of the zeta potential of the second species is less than or equal to 100 mV, less than or equal to 90 mV, less than or equal to 80 mV, less than or equal to 70 mV, less than or equal to 60 mV, less than or equal to 50 mV, less than or equal to 40 mV, less than or equal to 30 mV, less than or equal to 20 mV, less than or equal to 10 mV, or less than or equal to 5 mV. Combinations of the above-referenced ranges are also possible (e.g., greater than or equal to 0 mV and less than or equal to 100 mV). Other ranges are also possible.

In some embodiments, one or more of the first composition and the second composition may have a net charge (i.e., the composition as a whole is has a non-zero charge). In certain embodiments, the net charge of the first composition may be different from the net charge of the second composition. In some embodiments, the net charge of the first composition may be opposite in sign to the net charge of the second composition.

The first species may be present in the first composition in any suitable amount. In certain embodiments, the first species may comprise more than one reactive group that can participate in a reaction to form the reaction product as described above (e.g., the first species may comprise a polyelectrolyte and the polyelectrolyte may comprise more than one anomer that is capable of participating in a chemical reaction to form the reaction product). In some embodiments, the reactive groups of the first species may be present in the first composition at a concentration of greater than or equal to 0.001 mM, greater than or equal to 0.002 mM, greater than or equal to 0.005 mM, greater than or equal to 0.01 mM, greater than or equal to 0.02 mM, greater than or equal to 0.05 mM, greater than or equal to 0.1 mM, 0.5 mM, greater than or equal to 1 mM, greater than or equal to 2 mM, greater than or equal to 5 mM, greater than or equal to 10 mM, greater than or equal to 20 mM, greater than or equal to 50 mM, greater than or equal to 100 mM, greater than or equal to 200 mM, greater than or equal to 500 mM, greater than or equal to 1 M, greater than or equal to 2 M, greater than or equal to 5 M, or greater than or equal to 10M. In some embodiments, the reactive groups of the first species may be present in the first composition at a concentration of less than or equal to 20 M, less than or equal to 10 M, less than or equal to 5 M, less than or equal to 2 M, less than or equal to 1 M, less than or equal to 500 mM, less than or equal to 200 mM, less than or equal to 100 mM, less than or equal to 50 mM, less than or equal to 20 mM, less than or equal to 10 mM, less than or equal to 5 mM, less than or equal to 2 mM, less than or equal to 1 mM, less than or equal to 0.5 mM, less than or equal to 0.2 mM, less than or equal to 0.1 mM, less than or equal to 0.05 mM, less than or equal to 0.02 mM, less than or equal to 0.01 mM, less than or equal to 0.005 mM, or less than or equal to 0.002 mM. Combinations of the above-referenced ranges are also possible (e.g., greater than or equal to 0.001 mM and less than or equal to 20 M, greater than or equal to 0.5 mM and less than or equal to 500 mM, or greater than or equal to 2 mM and less than or equal to 50 mM). Other ranges are also possible.

The concentration ranges described herein are not intended to be limiting and one of ordinary skill in the art, based upon the teachings of this specification, would be capable of selecting suitable concentrations for an active agent and would understand that other concentrations are also possible.

The second species may be present in second composition in any suitable amount. In certain embodiments, the second species may comprise more than one reactive group that can participate in a reaction to form the reaction product as described above (e.g., the second species may comprise a polyelectrolyte and the polyelectrolyte may comprise more than one monomer that is capable of participating in a chemical reaction to form the reaction product). In some embodiments, the reactive groups of the second species may be present in the second composition at a concentration of greater than or equal to 0.001 mM, greater than or equal to 0.002 mM, greater than or equal to 0.005 mM, greater than or equal to 0.01 mM, greater than or equal to 0.02 mM, greater than or equal to 0.05 mM, greater than or equal to 0.1 mM, greater than or equal to 0.2 mM, greater than or equal to 0.5 mM, greater than or equal to 1 mM, greater than or equal to 2 mM, greater than or equal to 5 mM, greater than or equal to 10 mM, greater than or equal to 20 mM, greater than or equal to 50 mM, greater than or equal to 100 mM, greater than or equal to 200 mM, greater than or equal to 500 mM, greater than or equal to 1 M, greater than or equal to 2 M, greater than or equal to 5 M, or greater than or equal to 10 M. In some embodiments, the second species may be present in the second composition at a concentration of less than or equal to 20 M, less than or equal to 10 M, less than or equal to 5 NI, less than or equal to 2 NI, less than or equal to 1 M, less than or equal to 500 mM, less than or equal to 200 mM, less than or equal to 100 mM, less than or equal to 50 mM, less than or equal to 20 mM, less than or equal to 10 mM, less than or equal to 5 mM, less than or equal to 2 mM, less than or equal to 1 mM, less than or equal to 0.5 mM, less than or equal to 0.2 mM, less than or equal to 0.1 mM, less than or equal to 0.05 mM, less than or equal to 0.02 mM, less than or equal to 0.01 mM, less than or equal to 0.005 mM, or less than or equal to 0.002 mM. Combinations of the above-referenced ranges are also possible (e.g., greater than or equal to 0.001 mM and less than or equal to 20 M, greater than or equal to 0.5 mM and less than or equal to 500 mM, or greater than or equal to 2 mM and less than or equal to 50 mM). Other ranges are also possible. The concentration ranges described herein are not intended to be limiting and one of ordinary skill in the art, based upon the teachings of this specification, would be capable of selecting suitable concentrations for an active agent and would understand that other concentrations are also possible.

In some embodiments, one or more of the first composition (if present), the second composition (if present), and the third composition (if present), may comprise an active agent. The active agent may be any suitable species that confers a beneficial property onto the surface, such as pest resistance, coloration, flavoring, etc. Non-limiting examples of suitable active agents include pesticides, herbicides, fertilizers, agricultural chemicals, pigments, paints, flavorings, pharmaceutically active ingredients, cosmetics, and fire-retardant species. In some embodiments, the active agent may be a pesticide that comprises one or more of dichlorodiphenyltrichloroethane (DDT), hexachlorocyclohexane (HCH), and pentachlorophenol (PCP).

The active agent may make up any suitable amount of the third composition. In some embodiments, the third composition may be bulk active agent (e.g., pure active agent, or substantially pure active agent). In certain embodiments, the third composition may be a solution that comprises the active agent.

In some embodiments, a finite amount of time may elapse between the onset of the exposure of the surface to the first composition and the onset of the exposure of the surface the second composition (or between the onset of the exposure of the surface to the second composition and the onset of the exposure of the surface to the first composition). This time may be on the order of minutes or seconds. In some embodiments, greater than or equal to 0 seconds, greater than or equal to 15 seconds, greater than or equal to 30 seconds, greater than or equal to 1 minute, greater than or equal to 2 minutes, greater than or equal to 5 minutes, greater than or equal to 10 minutes, greater than or equal to 15 minutes, greater than or equal to 30 minutes, greater than or equal to 1 hour, greater than or equal to 2 hours, greater than or equal to 6 hours, or greater than or equal to 12 hours may elapse between the onset of the exposure of the surface to the first composition and the onset of the exposure of the surface to the second composition (or between the onset of the exposure of the surface to the second composition and the onset of the exposure of the surface to the first composition). In some embodiments, less than or equal to 1 day, less than or equal to 12 hours, less than or equal to 6 hours, less than or equal to 2 hours, less than or equal to 1 hour, less than or equal to 30 minutes, less than or equal to 15 minutes, less than or equal to 10 minutes, less than or equal to 5 minutes, less than or equal to 2 minutes, less than or equal to 1 minute, less than or equal to 30 seconds, or less than or equal to 15 seconds may elapse between the onset of the exposure of the surface to the first composition and the onset of the exposure of the surface to the second composition (or between the onset of the exposure of the surface to the second composition and the onset of the exposure of the surface to the first composition). Combinations of the above-referenced ranges are also possible (e.g., greater than or equal to 0 seconds and less than or equal to 1 day). Other combinations are also possible.

In certain embodiments, a finite amount of time may elapse between the end of the exposure of the surface to the first composition and the onset of the exposure of the second composition (or between the end of the exposure of the surface to the second composition and the onset of the exposure of the surface to the first composition). This time may be on the order of minutes or seconds. In some embodiments, greater than or equal to 0 seconds, greater than or equal to 15 seconds, greater than or equal to 30 seconds, greater than or equal to 1 minute, greater than or equal to 2 minutes, greater than or equal to 5 minutes, or greater than or equal to 10 minutes, greater than or equal to 15 minutes, greater than or equal to 30 minutes, greater than or equal to 1 hour, greater than or equal to 2 hours, greater than or equal to 6 hours, or greater than or equal to 12 hours may elapse between the end of the exposure of the surface to the first composition and the onset of the exposure of the surface to the second composition (or between the end of the exposure of the surface to the second composition and the exposure of the surface to the first composition). In some embodiments, less than or equal to 1 day, less than or equal to 12 hours, less than or equal to 6 hours, less than or equal to 2 hours, less than or equal to 1 hour, less than or equal to 30 minutes, less than or equal to 15 minutes, less than or equal to 10 minutes, less than or equal to 5 minutes, less than or equal to 2 minutes, less than or equal to 1 minute, less than or equal to 30 seconds, or less than or equal to 15 seconds may elapse between the end of the exposure of the surface to the first composition and the onset of the exposure of the surface to the second composition (or between the end of the exposure of the surface to the second composition and the onset of the exposure of the surface to the first composition). Combinations of the above-referenced ranges are also possible (e.g., greater than or equal to 0 seconds and less than or equal to 15 minutes). Other combinations are also possible. In some embodiments, the steps of exposing the surface to the first composition and the surface to the second composition at least partially overlap temporally. In some embodiments, the steps of exposing the surface to the first composition and the surface to the second composition do not overlap temporally.

U.S. Provisional Patent Application Ser. No. 62/243,736, filed Oct. 20, 2015 and entitled "Spray Retention Using Pre-Mixed Polyelectrolyte Solutions," is incorporated herein by reference in its entirety for all purposes.

Example 1

This example presents a study of the in-situ precipitation of polyelectrolytes during droplet impact and its application in enhancing the retention efficiency of sprays. Large amounts of agricultural sprays are wasted worldwide, due to the poor retention on hydrophobic plants. As the harmful effects of pesticides (in particular) are increasingly recognized, there is an increasing pressure to reduce their use and make their spraying more efficient. Current solutions, mainly based on surfactants, all have limitations. Here, a novel idea based on the modification of the surface of the plant is presented. By precipitating opposite polyelectrolytes in-situ, sparse pinning sites are created that pin the contact lines of impacting droplets from a spray and prevent them from bouncing off. First, the impact behavior of two droplets comprising oppositely charged polyelectrolytes on a hydrophobic surface was analyzed. Then, the precipitation process of two polyelectrolytes was studied. A model was developed that predicts the outcome of a double drop impact. Finally, the results obtained above were extended to macroscopic applications by performing simultaneous spraying. Simultaneously spraying dilute opposite polyelectrolytes on a superhydrophobic surface was found to lead to an increase in the liquid retention and the coverage of the surface. The behavior was shown to hold for different polyelectrolytes and surfaces, making this method suitable for a range of applications.

Due to the adverse effects of pesticides, it may be desirable reduce their use and/or to reduce sources of deposition inefficiencies in sprays. One inefficiency is bouncing or rolling of impacting droplets from the spray due to the hydrophobicity of certain plants. Such hydrophobic plants are common, and they may have this property because of the presence of waxes and hairs on the surface of their leaves. For these plants, much of the sprayed liquid ends up in the soil and does not benefit the plant. It thus may be advantageous to increase the efficiency of the pesticide spraying process by increasing the tendency of the pesticide droplets to stick to the plant and to increase the coverage of the surface of the leaves. Several parameters influence the outcome of droplet impacts on surfaces such as the liquid's surface tension and viscosity and the size of the droplets.

Another important problem in pesticide spraying is drift of pesticide droplets due to the wind. These droplets may have sizes on the order of 100 microns and, thus, can be easily carried over large distances by the wind. Unlike the retention problem, wind drift is aggravated by a decrease in droplet size. Both of these phenomena must be considered when approaching the problem of pesticide retention.

A third problem is rapid evaporation of pesticide droplets, which may occur when their size is small. This evaporation may occur in the air and may occur upon deposition, and may limit the amount of pesticide actually absorbed by the plant.

Methods and articles for increasing pesticide retention in developing countries, such as India, face additional adoption challenges. Many Indian farmers are marginal farmers, with fields of less than a hectare. Many of these farmers are not aware of the health hazards of pesticides and/or are not willing to invest large amounts of money in better spraying equipment. Their priority is usually to get new machinery, good quality seeds, fertilizers and pesticides when necessary. Due to the insensitivity of many pesticide users to health concerns, a significant reduction in costs would aid the adoption of new spraying compositions or techniques. In some cases, pesticides may represent a substantial part in the overall cultivation cost: for example, pesticides may account for 40-50%, 25% and 38% of cost of cultivation for cotton, paddy and cole crops, respectively. Some farmers are aware of the problem of poor retention of pesticides and use either commercially available surfactant solutions or more rustic solutions, such as adding honey or "lassi" to pesticides to make them stick better. Some farmers do not consider pesticide retention to be one of their priorities.

When a liquid droplet is deposited on a smooth surface, it may take different shapes. The behavior is dictated by a balance of gravity and the different interfacial tensions. Every interface between two phases comes with an energy cost: qualitatively, molecules at the interface have fewer neighbors than those in the bulk and, thus, are in a less favorable energy state. Increasing the interfacial area is then energetically unfavorable, and the energy per unit area that has to be spent to increase the area is the interfacial tension $\gamma$. This energy per unit area may also be seen as a force per unit length pulling perpendicularly to any given contact line.

For small enough liquid droplets, the influence of gravity, which scales as the third power of the radius, becomes negligible compared to surface tension forces, which scale as the radius. In this case, droplets tend to adopt a spherical shape to minimize their volume for a given volume.

Figure 3:
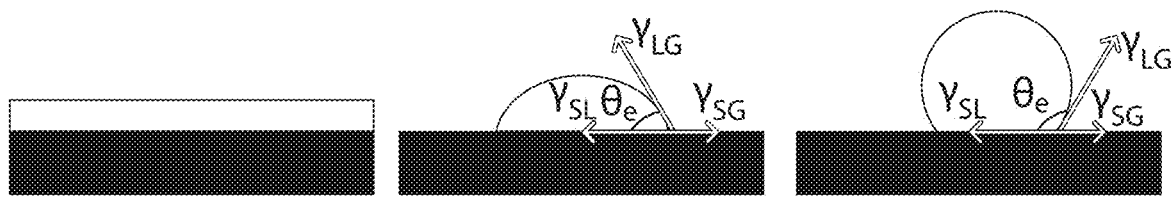
FIG. 3 shows a schematic depiction of three fluids on surfaces, according to certain embodiments.

When a droplet is deposited on a solid surface, three interfacial tensions compete: the liquid/air, liquid/solid and solid/air interfacial tensions. As shown in FIG. 3, three different outcomes may arise depending on the magnitudes of these tensions. When the liquid spreads on the surface, it decreases the solid/gas area, while increasing the solid/liquid and liquid/gas areas. If the spreading parameter is defined as: $S=\gamma_{SG}-\gamma_{SL}-\gamma_{LG}$, complete wetting of the solid surface by the liquid occurs for $S>0$. If $S<0$, the droplet forms a nearly spherical cap, and a simple force balance on the contact line gives the Young-Dupré equation for the contact angle:

$$\cos(\theta_e) = \frac{\gamma_{SG} - \gamma_{SL}}{\gamma_{LG}}.$$

If the liquid is water, surfaces with $\theta_e<90°$ may be called hydrophilic and surfaces with $\theta_e>90°$ may be called hydrophobic. Superhydrophobic surfaces may be surfaces with $\theta_e>150$. Theoretically, for $\gamma_{SG}-\gamma_{SL}-\gamma LG<0$, the Young-Dupré equation does not have a solution, and there should be complete dewetting. However, this behavior is rarely or never observed in practice.

Most real surfaces have some heterogeneities and roughness at the micro or nanoscale, and the previous model developed for smooth surfaces may not fully describe their behavior in the presence of water. Because of the heterogeneities, the contact angle may be able to take on multiple values. The minimum contact angle may be called the receding angle $\theta_r$, while the maximum may be called the advancing angle $\theta_a$. The difference $\theta_a-\theta_r$ may be called the contact angle hysteresis.

Figure 4A:
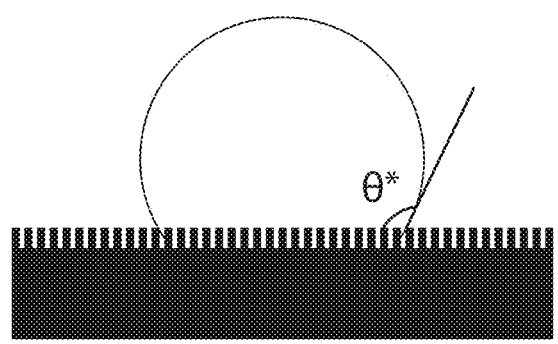
FIG. 4A shows a schematic illustration of a fluid on a surface, according to one set of embodiments.

The roughness of a surface may lead to an apparent contact angle different from the Young's angle. One case of wetting is showed in FIG. 4A and described by the Wenzel model. In this case, the water may penetrate inside the protrusions on the surface, which may make the solid/liquid and solid/air contact areas higher than in the smooth case. A simple derivation leads to the Wenzel relation $\cos(\theta^*)=r\cdot\cos(\theta_e)$, where the roughness r is the ratio between the real and the apparent areas. In this case, the roughness may enhance the intrinsic wetting behavior of a surface. A hydrophilic surface may become more hydrophilic and a non-hydrophilic surface may become less hydrophilic. Although not captured by this equation, a Wenzel state may also correspond to a high contact angle hysteresis. A droplet may be pinned inside the topographical features of the surface, which may make it difficult to move.

Figure 4B:
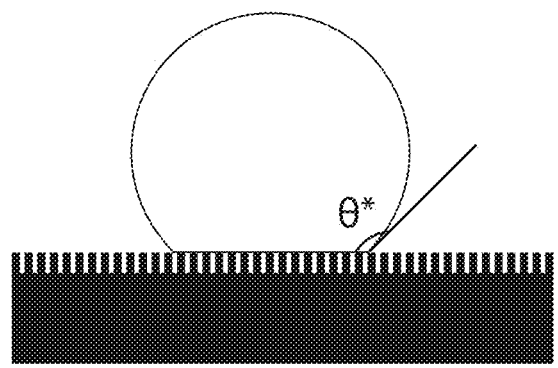
FIG. 4B shows a schematic illustration of a fluid on a surface, in accordance with some embodiments.

A second case consists in the droplet sitting on the top of the topographical features of the surface, with air pockets trapped underneath it, as shown in FIG. 4B. An energy minimization gives the Cassie-Baxter equation for the apparent contact angle:

$$\cos(\theta^*)=-1+f(\cos(\theta_e)+1)$$

where f is the fraction of the solid phase under the droplet.

The Cassie-Baxter state may be stable when the Young contact angle is larger than a critical angle $\theta_c$ given by $$\cos(\theta_c) = \frac{f-1}{r-f}.$$

This state is also often observed for angles lower than the critical angle; it can be a metastable state. A Cassie state may have a low contact angle hysteresis because the area of contact with the solid, which may be responsible for the pinning, may be significantly reduced. It may also promote fast shedding and low adhesion of liquid droplets.

When a droplet is in a metastable Cassie state, it may undergo an irreversible transition towards the stable Wenzel state when appropriate conditions are met. In particular, when the pressure in the droplet is sufficiently increased, the liquid may penetrate the surface features. For example, when a droplet impacts a surface with a velocity V, it has an additional dynamic pressure term that scales as $\rho V^2$ (Bernoulli pressure). If the velocity is high enough, the impacting droplet may get irreversibly pinned in a Wenzel state upon impact, even if it would have been in a Cassie state if it had been gently deposited. When this transition happens, the impact behavior may be significantly altered.

Figure 5:
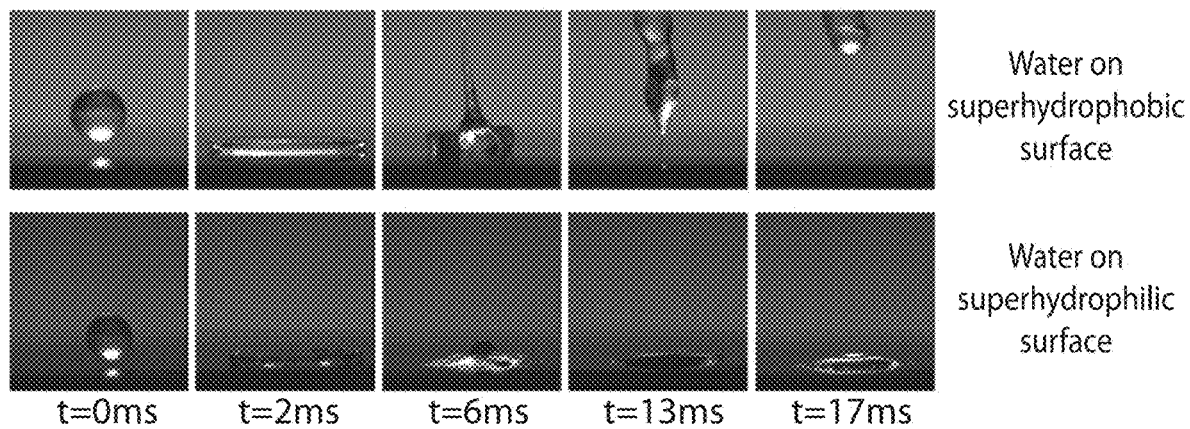
FIG. 5 shows, according to certain embodiments, snapshots from high speed videos of the deposition and rebound of droplets from a surface.

Drop impacts on solid surfaces can lead to different outcomes depending on the properties of the solid, the fluid and the impact. For example, the outcomes may include deposition, prompt splash, corona splash, receding break-up, partial rebound and complete rebound. Snapshots of high-speed videos of the deposition and complete rebound cases are shown in FIG. 5 for a hydrophilic and a superhydrophobic surface. Deposition occurs when the liquid spreads on the surface then stops. Splash is when the droplet is atomized into tiny droplets directly upon impact. Receding break-up is the fragmentation of the droplet in the receding phase following spreading as a whole drop. Rebound occurs at the end of the receding phase when the whole droplet or part of it is expelled from the surface due to a remaining excess energy. When retention of the liquid is sought, a deposition outcome, where the droplet spreads on the surface and remains on the surface, may be preferred. Conversely, complete rebound may be undesirable and result in minimal or no liquid retention.

To describe normal impacts of droplets on horizontal surfaces, one can consider the impact of a droplet of diameter D and velocity $V_0$ of a fluid of density $\rho$, viscosity $\mu$ and surface tension $\sigma$. The solid may be characterized by its roughness and by the contact angles (equilibrium, advancing and receding) it makes with the liquid. If d is the radius of the spreading film upon impact, a spread factor of $d^*=d/D$ can be defined.

By observing the evolution of the spread factor over time, it is possible to identify, four phases in the impact process. The first is the kinematic phase. The spread factor increases as $$t^{\frac{1}{2}}$$

and the behavior is the same for all impact outcomes. This phase is quick, lasting about one tenth of the spreading phase. The subsequent phase is spreading. This phase may be driven by the kinetic energy of the drop unless the impact velocity is very small, in which case intermolecular forces may drive the spreading. At the end of the spreading phase, the spread factor reaches a local maximum. In the following phase (the relaxation phase), the droplet may begin to recede. Generally, the more a surface is hydrophobic, the more a droplet is prone to recede, all other things remaining equal. At the end of the receding stage, the surface energy and remaining kinetic energy from the spreading phase may not be completely dissipated. In this case, a vertical jet may form. The jet can remain attached to the surface and eject one or several drops due to the Rayleigh-Plateau instability (partial rebound), or it can detach as an intact droplet (complete rebound). If there is not sufficient energy for the drop to rebound, the droplet may remain on the surface at the end of the relaxation phase (the equilibrium phase).

Dimensionless numbers that may be used to characterize drop impacts include the Reynolds number $$Re = \frac{\rho V_0 D}{\mu},$$

the Weber number $$We = \frac{\rho V_0^2 D}{\sigma}$$

and the receding contact angle. These numbers are the ratios between forces that come into play in the process: inertia, viscosity, capillarity and contact line pinning. However, these numbers are not sufficient to characterize the physics of drop impacts. Other features that affect drop impacts may also be present, such as surface defects, surface roughness, and internal instabilities in the drop and their onset. Moreover, the spreading of the liquid lamella may involve multiple velocities and length scales. These velocities and length scales may be different from initial velocities and length scales and may vary rapidly with time; this may modify the balance of forces and affect which model can best describe the droplet at any particular time. In general, increasing the Weber number by increasing the impact velocity, increasing the droplet size and/or decreasing the surface tension may promote more bouncing and less deposition when the surface is hydrophobic. However, if the velocity is sufficiently large, a Cassie to Wenzel transition may occur, and only a partial rebound may be observed, with a fraction of the droplet being deposited. Increasing the viscosity of the liquid may cause more energy to be dissipated during the impact and may decrease the chances of bouncing. However, viscous forces are usually small compared to inertia and surface tension, and the influence of viscosity may be limited. The receding contact angle may also affect droplet behavior; in general, a larger receding contact angle increases the probability that the drop will rebound.

The tendency of a droplet to bounce may also be affected by surface hydrophobicity. Such behavior may not be observed on hydrophilic surfaces under some conditions, while on superhydrophobic surfaces bouncing may be observed even for very low Weber numbers.

Drop impacts on inclined surfaces may lead to partial or complete rebounds.

The size of the sprayed droplets may affect droplet retention. For a fixed nozzle, this size may depend on the viscosity and surface tension of the sprayed liquid. For sprayed liquids, the dominant oscillation wavelength may be $$\lambda = \frac{4\pi\sigma}{\rho_a U_r},$$

and the droplet size may be proportional to this wavelength. The droplet size may also be proportional to the surface tension.

This experiment is directed to arresting impacting droplets by changing the surface properties of the droplets so that the droplets are more prone to being deposited upon impact. This can be achieved by depositing hydrophilic particles on the surface that can act as pinning sites and locally reduce the receding contact angle. A further goal is to develop a simple way to deposit these particles that can be done during the spraying process.

One way to do this is to add hydrophilic particles to the sprayed liquid, hypothesizing that they would attach to the surface during the impact and pin the droplet. Hydrophilic silica particles with a size on the order of 10 microns were added to the liquid to be sprayed and the impact of a droplet of that liquid on a superhydrophobic surface was observed with a high-speed camera. Snapshots of the impact are shown in FIG. 6. The impact behavior is not changed with the addition of these particles, and a complete rebound is observed. The silica particles, which are hydrophilic, may prefer to stay in the bulk of the liquid than to deposit on the surface, and therefore, may not pin the droplet.

Another approach is to deposit sparse hydrophilic defects. These defects can act as pinning sites for the contact line of impinging droplets and prevent them from bouncing. The defects may be created through in-situ precipitation of a chemical compound during the spraying process. To accomplish this, small quantities of oppositely charged polyelectrolyte molecules are added to the spraying solutions; these polyelectrolytes may interact and precipitate from the solution. Each type of polyelectrolyte may be added to a separate solution and the two solutions may then be sprayed simultaneously, as shown schematically in FIG. 7A. When droplets of water or one polyelectrolyte solution in the absence of the other impact a superhydrophobic surface, they bounce off, as can be seen in the cartoon of FIG. 7B. However, in a simultaneous spraying process, a precipitation reaction may occur when the two droplets comprising the oppositely charged polyelectrolytes come into contact. This may result in the deposition of a hydrophilic residue on the surface which is capable of pinning the droplets and/or suppressing bouncing.

It is possible for only a few precipitate compounds to form on the surface. Many of the polyelectrolyte molecules may remain dissolved in the solution due to the short reaction time. However, even when a small number of defects are formed, the number of defects generated may be sufficient to arrest the droplet. As shown in FIG. 7C, when the contact line encounters one of the deposited defects during the receding phase, it may become pinned. This process may dissipate some energy and/or may slow the retraction phase, eventually causing droplets to stick to the surface.

Polyelectrolytes are macromolecules which comprise units that may be ionizable, comprise ionic groups, or comprise both species. They may be water soluble, and their charged groups may dissociate in solution. Positively charged polyelectrolytes are called polycations and negatively charged ones are called polyanions. Polyelectrolytes may combine some of the properties of polymers and salts: their solutions may be viscous and they may be conductive. There are many biological polyelectrolytes such as polysaccharides and DNA.

Polyelectrolytes can be strong or weak, depending on whether they fully or partially dissociate in solution. Weak polyelectrolytes are not fully charged in solution and their charged can be tuned by changing the pH. To quantify the electric interactions of polyelectrolytes, the zeta potential is commonly used. The zeta potential is the electric potential in the interfacial double layer surrounding the polyelectrolyte, at the location of the stationary layer of fluid attached to the molecule.

When two solutions of oppositely charged polyelectrolytes are mixed, and when the absolute value of their zeta potentials are sufficiently high, the oppositely charged polyelectrolytes may attract each other and bind together, forming a bulk precipitate in the solution.

Two polyelectrolytes were employed in this experiment: linear Polyethyleneimine (LPEI) (see FIG. 8A; positively charged; may comprise $NH_2^+$ groups in solution) and Polyacrylic Acid (PAA) (see FIG. 8B; negatively charged; may comprise $COO^-$ groups in solution). The pH was selected such that both zeta potentials were sufficiently high in order for there to be a substantial interaction between the two polyelectrolytes. At this pH (around 4.5), mixing solutions of these two polyelectrolytes resulted in an insoluble precipitate spontaneously forming in the solution. It comprised an amorphous whitish residue floating in the solution, and it made the liquid more viscous. Such a liquid may be less suitable for spraying than other liquids, as viscous solutions may require higher energy inputs in order to be atomized.

Instead, this example demonstrates the formation of hydrophilic defects directly in-situ through the precipitation of polyelectrolytes on the surface during the impact process. Two sprays, each comprising one of the oppositely charged polyelectrolytes, are sprayed simultaneously. When the droplets of each spray come into contact on the surface, they form precipitates between surface features and/or on top of the surface. In some cases, the polyelectrolyte solutions may be dilute and thus have similar physical properties (like viscosity and surface tension) to pure water.

Figure 8A:
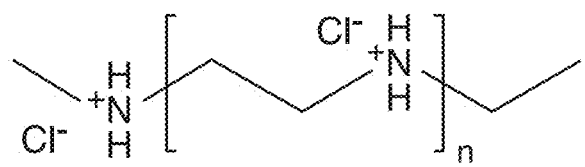
FIG. 8A shows, in accordance with some embodiments, the chemical formula for polyethylene imine)
Figure 8B:
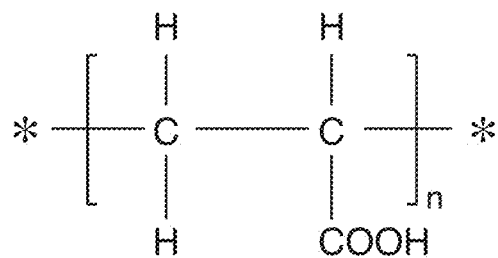
FIG. 8B shows, according to certain embodiments, the chemical formula for poly(acrylic acid)
Figure 8C:
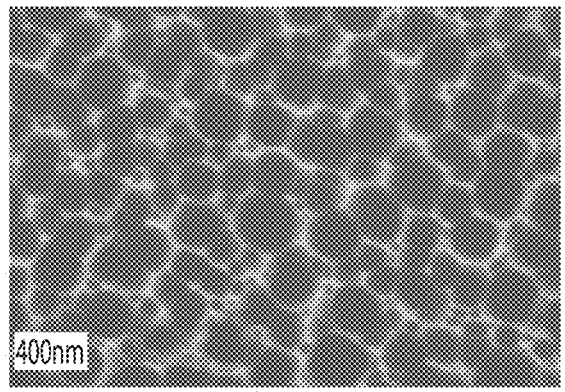
FIG. 8C shows, in accordance with some embodiments, a scanning electron microscope image of a surface.
Figure 8D:
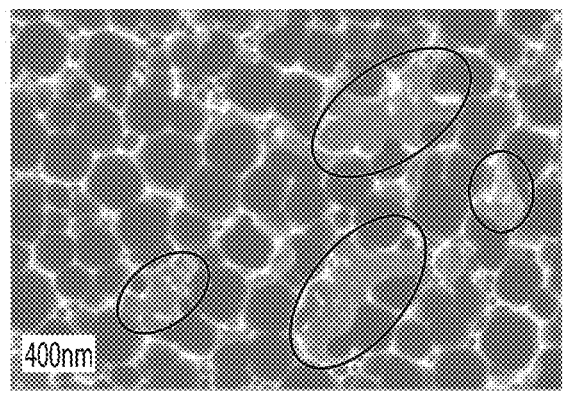
FIG. 8D shows, according to certain embodiments, a scanning electron microscope image of a surface comprising polyelectrolyte precipitates.

A surface with a nanograss texture, composed of random features with an average size and spacing of around 200 nm, and coated with a hydrophobic modifier was employed as the superhydrophobic surface. The surface had a contact angle of 165° with a hysteresis of less than 5°. FIG. 8C shows a scanning electron microscope image of the surface where the nanotexture is visible. After spraying the two polyelectrolyte solutions, the surface was imaged again (FIG. 8D); sparse defects of polyelectrolyte precipitates could be observed on the surface. These defects could serve as pinning sites for the receding contact lines of droplets.

Figure 9A:
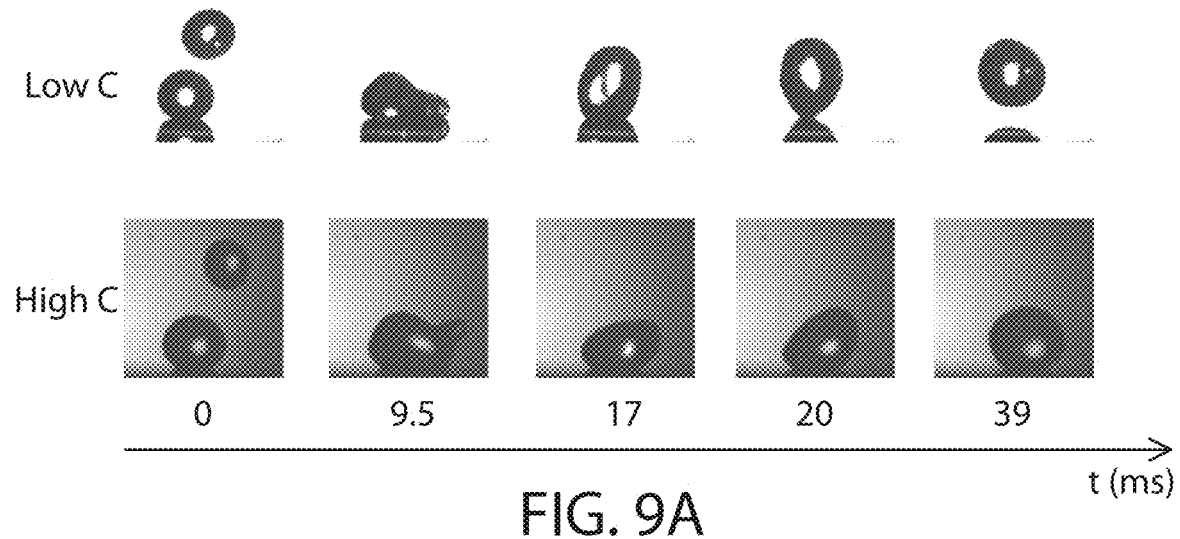
FIG. 9A shows snapshots of a two-drop impact process, according to certain embodiments.

To determine the local behavior of two droplets comprising oppositely charged polyelectrolytes simultaneously impacting the surface, experiments involving the impact of a droplet on another still droplet on a superhydrophobic surface were performed for droplets with different radii, velocities, and polyelectrolyte concentrations (For simplicity, the concentration of the polyelectrolyte was always the same for both droplets in the experiment). Snapshots of the two-drop impact process, taken with a high-speed camera at 10,000 frames per second, are shown in FIG. 9A, for low and high values of the polyelectrolyte concentration.

The behavior observed is similar to that of single drop impacts: the droplets coalesce, undergo an expansion phase, reach a maximal lateral radius, and then start retracting. For pure water or low polyelectrolyte concentration, the receding phase continues until the droplet bounces off. For higher polyelectrolyte concentration, the receding phase is inhibited and the droplet remains pinned on the surface due to the defects formed during the impact. As seen in the figure, the process lasts around 20 ms, which is comparable to the contact time of single droplets of similar radius.

Figure 9B:
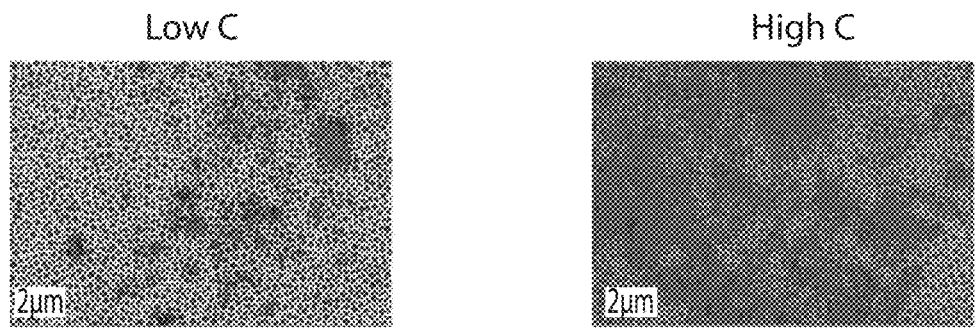
FIG. 9B shows images of polyelectrolyte precipitates on a surface, according to certain embodiments.

FIG. 9B shows the defects formed by sprays of solutions with different concentrations. Defects density, and thus the ability to arrest impacting droplets, increases with concentration, as is intuitive.

To determine the concentration that will allow droplets to stick, it may be helpful to analyze the forces that act during the receding phase of a droplet impact. Three such forces are inertia, capillarity and viscosity. In the analysis performed below, viscosity can be neglected, as the capillary number, which compares the magnitude of viscous and capillary forces, is of the order of $10^{-3}$; inertia and capillarity are considered below. The droplet impacts the surface with a kinetic energy, which is then converted into surface energy in the expansion phase. In the receding phase, the surface energy is converted back into kinetic energy; at the end of the receding phase, the droplet may bounce if it has enough kinetic energy. One way that the droplet may lose energy is if it experiences pinning forces on the surface. In this model, it is assumed that the droplet will bounce if the work of pinning during the receding phase is lower than the initial kinetic energy, and will stick otherwise if the reverse is true.

The kinetic energy may be given by the following equation:

$$E_k \sim \rho R^3 V^2.$$

The work of pinning may be given by the following equation:

$$W \sim \sigma R^2 (\Delta\theta_{nat} + \Delta\theta_{defects}).$$

Where R is the radius of the droplet, V is its initial velocity, $\rho$ is the density, $\sigma$ is the surface tension and $\Delta\theta$ is the contact angle hysteresis.

For a superhydrophobic surface, the natural contact angle hysteresis may be negligible. The added hysteresis due to the defects may be proportional to the number of defects on the contact line, as in the following equation:

$$\Delta\theta_{defects} = \alpha N_{pinning\ sites}.$$

The outcome of a spraying process may thus depend on the number of defects that are formed during the process.

Figure 10A:
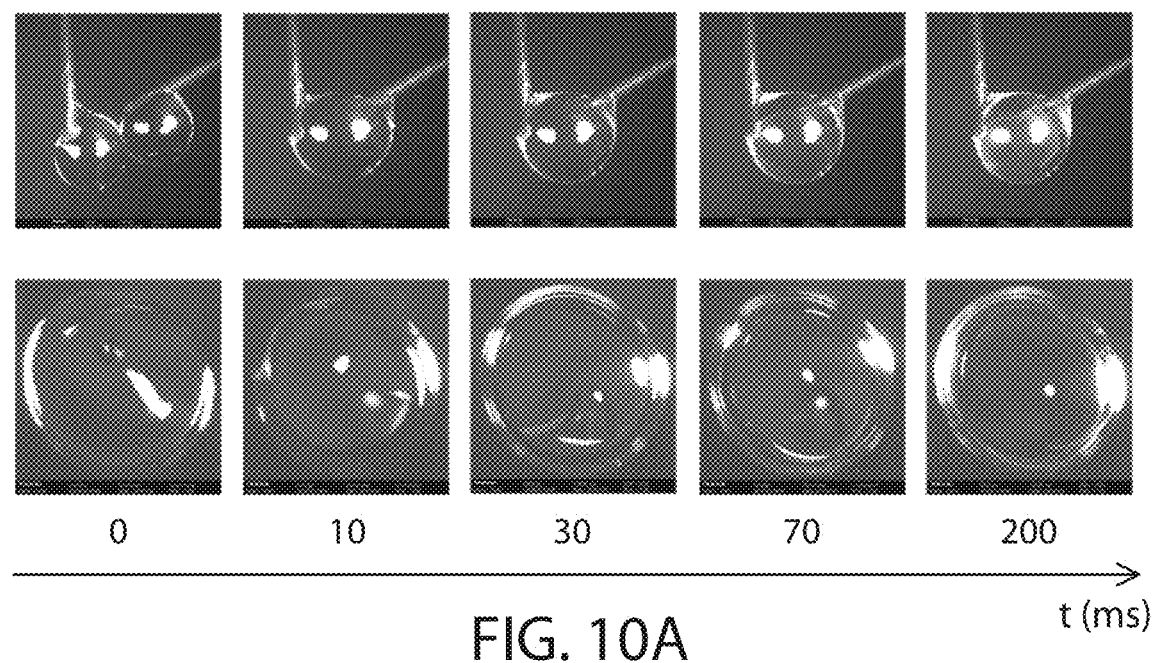
FIG. 10I shows snapshots of precipitate formation in coalescing droplets, according to one set of embodiments.
FIG. 10B shows the precipitation speed as a function of polyelectrolyte concentration, in accordance with some embodiments.
FIG. 10C shows the dependence of reaction speed on droplet radius, in accordance with certain embodiments.
FIG. 10D shows, according to certain embodiments, the precipitation speed as a function of polyelectrolyte concentration.
FIG. 10E shows, in accordance with certain embodiments, the dependence of reaction speed on droplet radius.

In this section, the formation of the polyelectrolyte precipitate when two droplets coalesce is analyzed. Coalescence experiments were performed between two droplets comprising oppositely charged polyelectrolytes. During the coalescence process, imaging was performed with a high-speed camera. Two sets of experiments were conducted, one with droplets in the air, the other on droplets on a hydrophobic octadecyltrichlorosilane (OTS)-coated glass surface. FIG. 10A shows snapshots of the precipitate formation in coalescing droplets in air and on the surface. A whitish residue appears inside the droplet and starts growing. The same experiments were repeated for different droplet sizes and concentrations. $\tau_{exp}$, the amount of time in between the initial coalescence and the first observation of a precipitate, was measured. This parameter can give a measure of the speed of the precipitation reaction $V_{precip}$:

$$V_{precip} = \frac{dN}{dt} \propto \frac{1}{\tau_{exp}},$$

where N is the number of defects formed.

Although $\tau_{exp}$ may vary with one or more imaging conditions (for example, light, angle, lens, frame rate), relative values of $\tau_{exp}$ obtained under substantially similar imaging conditions can be used to compare precipitation speeds when the concentration and droplet size are varied. Each experiment was repeated several times, and consistent values of $\tau_{exp}$ were obtained.

Figure 10B:
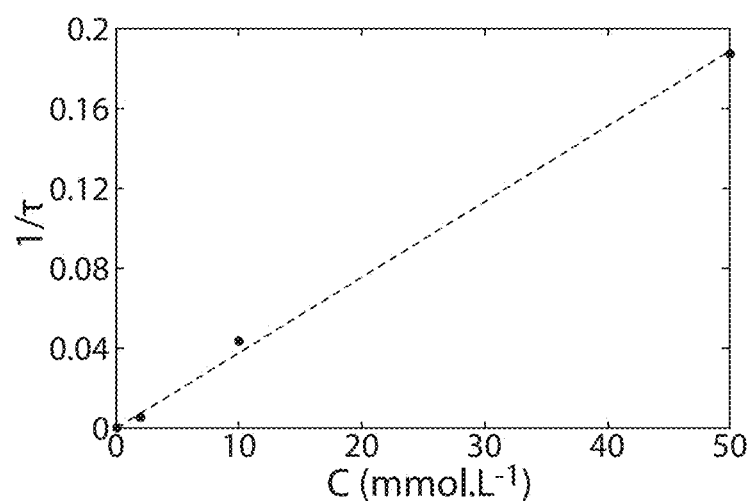
Figure 10C:
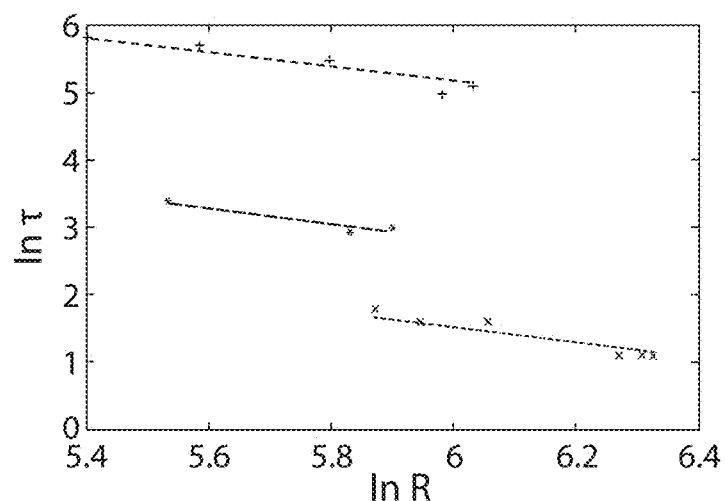
Figure 10D:
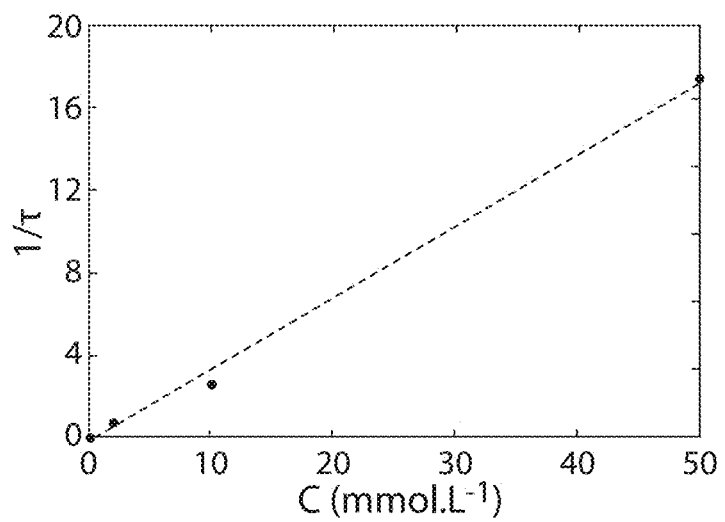
Figure 10E:
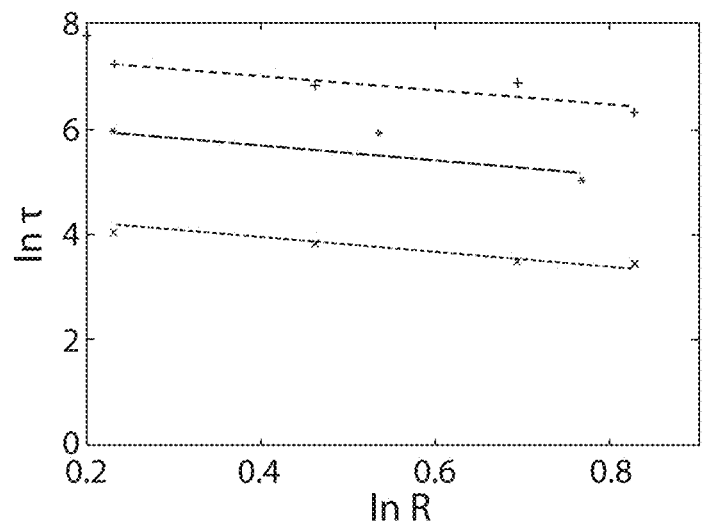

The results are presented in FIGS. 10B-10E. The plots in FIG. 10B and FIG. 10D show that the precipitation speed is proportional to the concentration of the polyelectrolytes, both in air and on the glass surface. The plots in FIG. 10C and FIG. 10E show that $\ln(\tau_{exp})$ varies linearly with R with a slope of (−3/2) in both cases. This implies that the reaction speed varies as the droplet radius to a power of 3/2.

Thus, the experimental scaling law for the precipitation speed may be formulated as:

$$V_{precip} \propto CR^{\frac{3}{2}}.$$

In view of the above results, it is hypothesized that, at short times the rate of precipitate formation may be limited by the rate of mixing of the two liquids. When the two droplets coalesce, they may need some time to become completely mixed, as shown schematically in FIG. 11. During the initial stages of mixing, only a fraction of the polyelectrolyte molecules may come into contact and be able to interact. The mixing may be driven by inertia and capillary forces and thus may happen over a time of the order of the inertial-capillary timescale $$\tau_i = \left(\frac{\rho R^3}{\sigma}\right)^{1/2}.$$

Figure 11A:
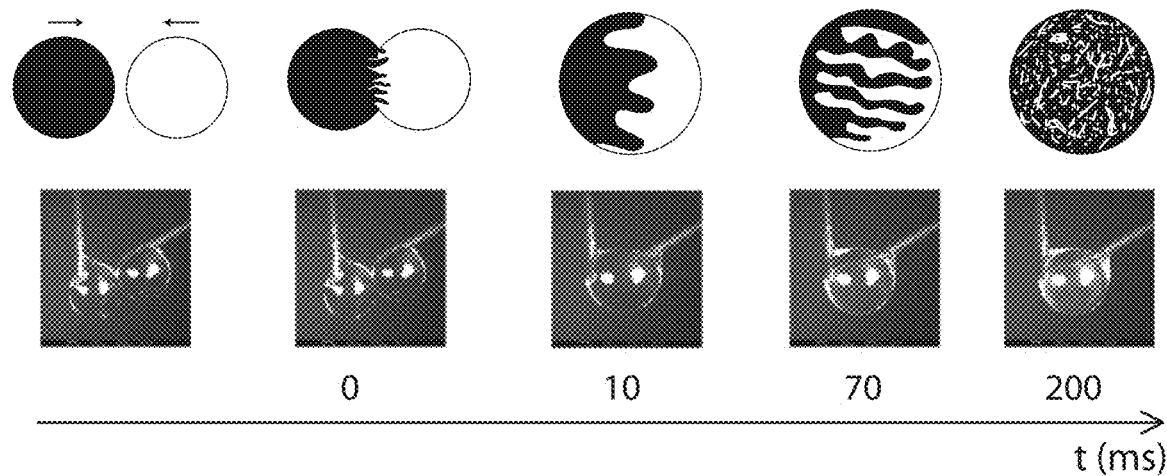
FIG. 11A shows a schematic illustration of two droplets coalescing, according to some embodiments.
Figure 11B:
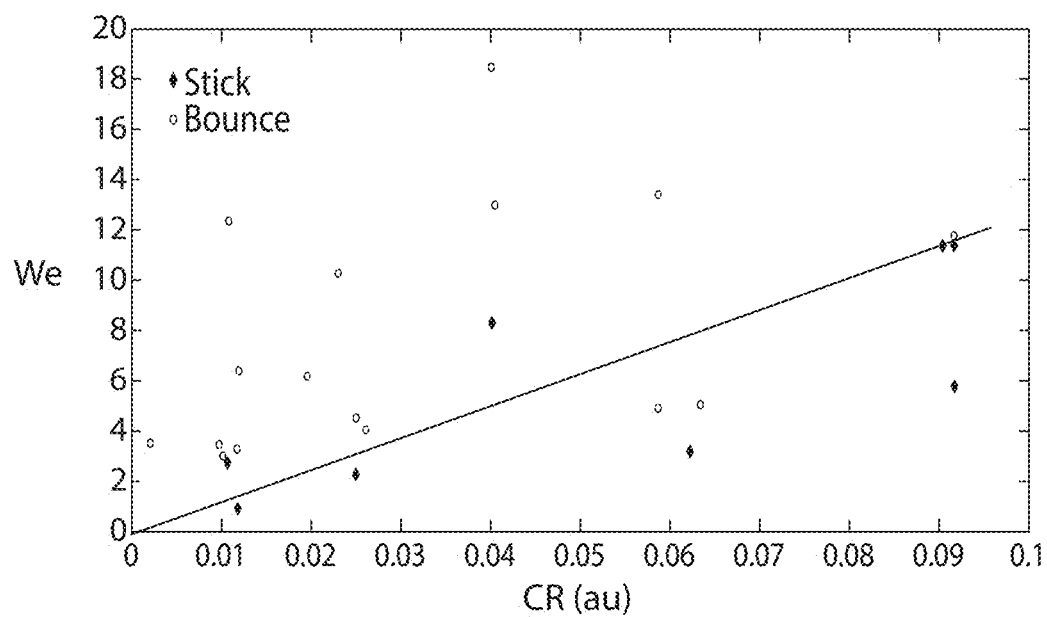
FIG. 11B shows a plot of We as a function of CR, according to certain embodiments.

In the case of FIG. 11A and FIG. 11B, this timescale is around 100 ms, which is of the same order as the observed precipitation time.

The precipitation speed may be proportional to the number of "precipitation sites", or the number of molecules of one polyelectrolyte that can interact with the other polyelectrolyte. This number may be proportional to the concentration and the volume of the droplet. The precipitation speed may also be inversely proportional to the timescale for droplet mixing, which will allow opposite polyelectrolytes to come together and precipitate. The precipitation speed may be expressed by the following equation:

$$V_{precip} = \frac{dN}{dt} \propto CR^3 \frac{1}{\tau_i}.$$

After substituting for $\tau_i$, the following scaling law can be derived:

$$V_{precip} \propto CR^{\frac{3}{2}}.$$

The equations above can also be applied to the energy balance model developed earlier to determine the bouncing/sticking limit.

The number of pinning sites on the contact line is found to be $$N_{pinning\ sites} \propto V_{precip} \tau_{contact} \frac{1}{R^2}.$$

$R^2$ appears in the denominator of the above equation because it describes the number of defects on the contact line, and not the number of defects in the entire volume.

$\tau_{contact}$ is the contact time. As stated above, the mechanism of a two-drop impact is similar to the mechanism of single drop impacts. In particular, it may be affected by inertia and capillarity, and it is assumed that the contact time follows the same scaling law previously shown for single droplets $$\tau_{contact} = \left(\frac{\rho R^3}{\sigma}\right)^{\frac{1}{2}}.$$

The work of pinning can then be expressed as:

$W \sim \sigma R^2 \Delta\theta_{defects}$, or $W \sim \sigma R^2 \beta CR$ where $\beta$ is a proportionality constant that can be determined experimentally.

The droplet may stick when the following equation is true:

$$\rho R^3 V^2 = \sigma R^2 \beta CR.$$

This may also be equivalent to the condition that $We \sim \beta CR$, where We is the Weber number $$\left(We = \frac{\rho R V^2}{\sigma}\right),$$

which is the dimensionless ratio of a fluid's inertia to its surface tension.

FIG. 12 is a plot of the Weber number as a function of CR (in arbitrary units). The solid line has a slope $\beta$, and represents the transition between the bouncing and sticking regimes: any point above the line is predicted to bounce because it has sufficient kinetic energy to do so, while points below the line are predicted to experience large pinning forces that completely dissipate the initial kinetic energy. The experimental results detailed above generally follow this rule, as many of them exhibit the predicted behavior as shown in FIG. 11.

It is thus possible to understand the bouncing and sticking behavior of a set of two droplets by performing initial experiments to determine $\beta$, and then developing predictions for whether additional droplets will bounce or stick. On a larger scale, for sprays, it is possible to use similar criteria to determine if the sprayed liquid will be retained on a hydrophobic surface, or if the sprayed liquid will mostly bounce away.

It is possible to apply the concepts developed above to the simultaneous spraying of oppositely charged polyelectrolytes. As shown above, two droplets that impact the surface together may form a precipitate on the surface that will pin the contact line and, if the concentration is high enough, may prevent the rebound of the droplet. When two polyelectrolytes of opposite charge are simultaneously sprayed, a large number of droplets comprising one of the polyelectrolytes may contact droplets of comprising the polyelectrolyte of opposite charge on the surface and form the precipitate. This may allow the sprayed liquid to stick on the surface and may improves the retention of sprays.

The retention of sprayed liquids was measured for different surfaces and liquids. Sprayers were used to deliver fixed amounts of liquid to the surface in the form of jets of fine droplets, at constant jet velocity and cone angle. Two metrics were used to quantify the retention. First, the mass of the liquid retained by the sample was measured after every spray by weighing the sample. The second metric was the coverage of sample, i.e., the area covered by the liquid divided by the total area of the substrate. The first characterizes how much liquid can stick to the surface, while the second quantifies the uniformity of the coverage.

FIG. 12A shows images of the surfaces as different liquids are sprayed. A fluorescent dye was added to all the sprayed liquids to enhance visualization. As expected, for a very little water stuck to the superhydrophobic surface, as this surface cannot be wetted. When polyelectrolytes were simultaneously sprayed on the superhydrophobic surface, much more of the liquid remained on the surface. FIG. 12B shows the coverage of the surface in these two cases as determined by image treatment of the previous photographs. For water, coverage did not exceed 7% after 3 mL was sprayed onto the superhydrophobic surface. When oppositely charged polyelectrolytes were simultaneously sprayed, the coverage was 70% after 1 mL was sprayed and reached 80% when 3 mL of liquid was sprayed.

Figure 12A:
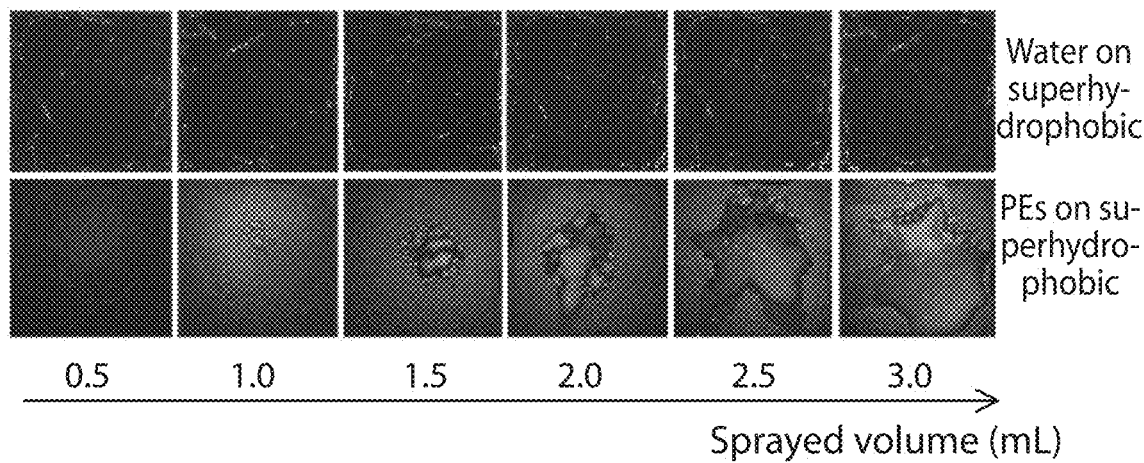
FIG. 12A shows, in accordance with some embodiments images of surfaces onto which liquids were sprayed.
Figure 12B:
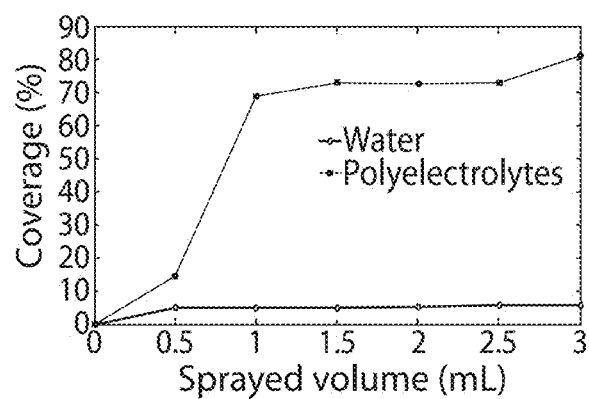
FIG. 12B shows, according to certain embodiments, surface coverage as a function of sprayed volume.
Figure 12C:
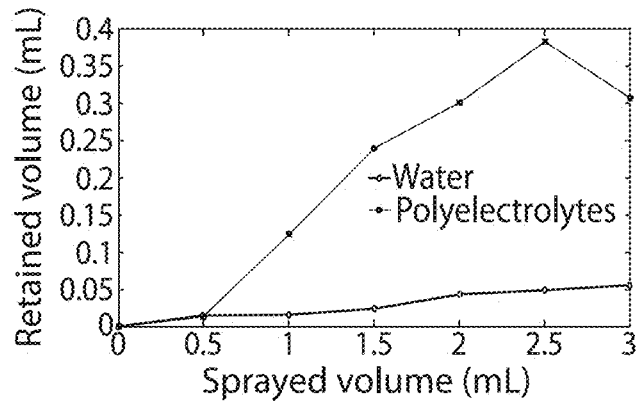
FIG. 12C shows, according to certain embodiments, retained volume as a function of sprayed volume.

The retained volume exhibited similar trends (see FIG. 12C). Spraying water alone resulted in little fluid retention, while spraying solutions comprising oppositely charged polyelectrolytes resulted in significant fluid retention (over a tenfold increase in comparison to water alone). The retained mass obtained after spraying the polyelectrolyte solutions is also similar to the retained mass of water on a superhydrophilic surface (measured in separate experiments). After a linear increase in retained mass during the initial stages of spraying, the retained mass eventually reaches a limit because the sample cannot hold more liquid. At this point, additional spraying may cause the removal of previously accumulated liquid. This phenomenon may explain the decrease observed in the last data point.

The previously derived model can also be used in combination with the experimental parameters of the spray (droplet size and velocity) to estimate the polyelectrolyte concentration at which the transition from bouncing to sticking occurs. For this experiment, that concentration is 10 mM, and, indeed, large enhancements in collection were observed for concentrations of 20 mM, while little collection was obtained at 2 mM.

Figure 13:
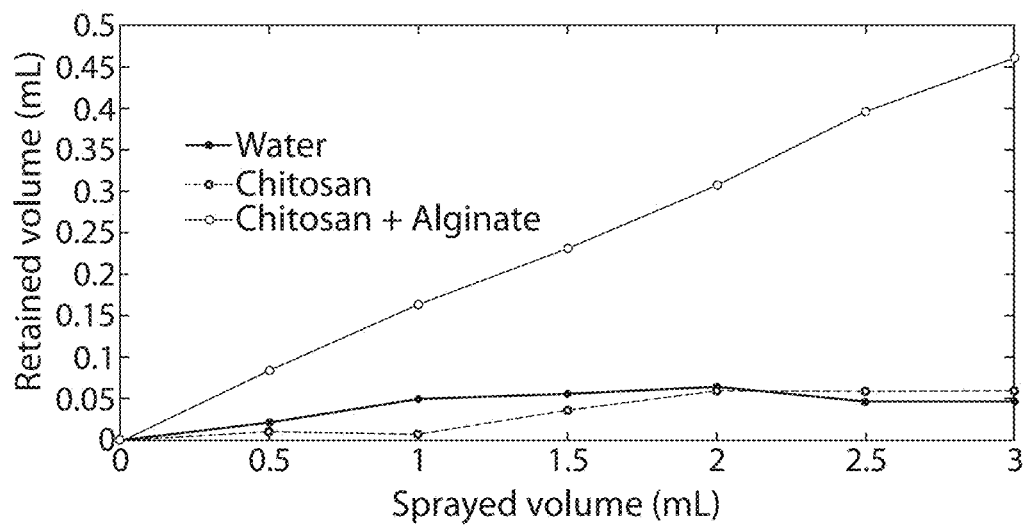
FIG. 13 shows retained volume as a function of sprayed volume, according to certain embodiments.

To confirm the generality of the phenomenon and the role of opposite polyelectrolyte precipitation in the process, similar experiments were also performed with different polyelectrolytes. The superhydrophobic surface was the same as described above. The polyelectrolyte solutions comprised either chitosan at 10 mM or alginate at 10 mM. Chitosan and alginate are biocompatible polyelectrolytes that may be particularly suitable for agricultural applications. Three experiments were carried out: (1) spraying only water; (2) spraying only chitosan, and (3) simultaneously spraying chitosan (a positively charged polyelectrolyte) and alginate (a negatively charged polyelectrolyte). FIG. 13 shows the retained volume as a function of the sprayed volume for each of the three cases. It is apparent that spraying only the Chitosan solution on the superhydrophobic surface leads to a small retention, approximately equal to that of water. As observed above, when oppositely charged polyelectrolytes were sprayed, a much larger retention was obtained. As spraying was performed, the retention increased linearly in the early stages, leading to a retained mass ten times larger than that obtained from spraying either water or chitosan.

Figure 14A:
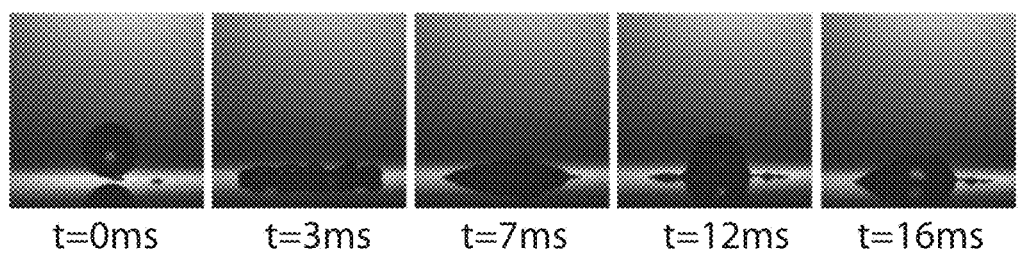
FIG. 14A shows snapshots of the impact of water on a superhydrophobic surface comprising polyelectrolyte reaction products, according to certain embodiments.

Once precipitates have formed on the surface, the surface may become prone to droplet deposition even if the impinging droplets do not contain polyelectrolytes. If single water droplets impact the surface, the droplets may be subject to pinning during the receding phase of the impact in a similar manner as that observed for double drop impacts. If there are enough defects, rebound may not be possible and the droplet may instead be deposited. Snapshots of the impact of a water droplet on a superhydrophobic surface on which defects had been deposited by the simultaneous spraying of chitosan- and alginate-comprising solutions are shown in FIG. 14a.

Figure 14B:
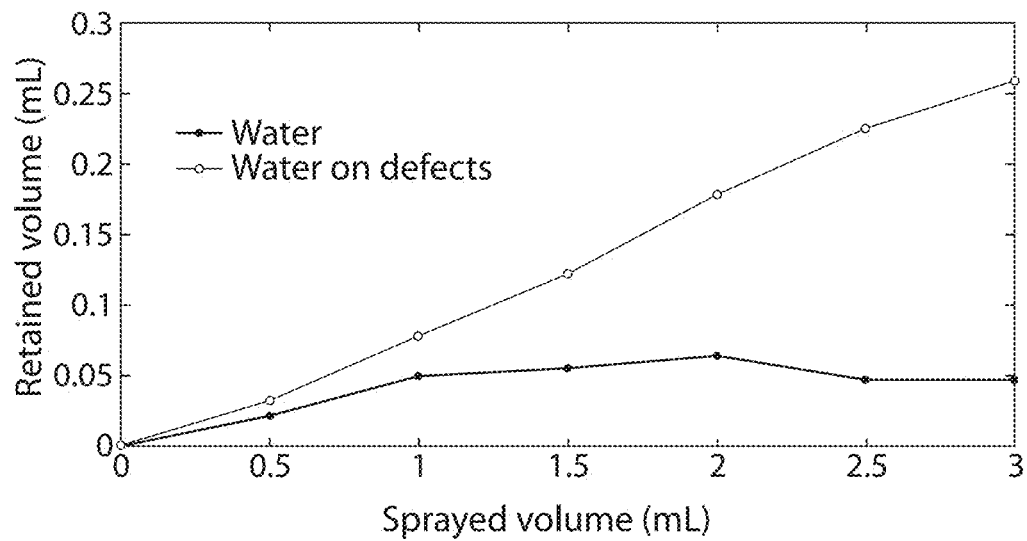
FIG. 14B shows retained volume as a function of sprayed volume, according to one set of embodiments.

The retention of water after defects were formed was tested. The superhydrophobic surface used was that described above, and the polyelectrolyte solutions were chitosan (10 mM) and alginate (10 mM). Two experiments were carried: (1) spraying only water on the superhydrophobic surface and (2) spraying water on a surface on which simultaneous polyelectrolyte spraying had been previously performed. FIG. 14B shows the retained volume as a function of the sprayed volume for these two cases. Spraying only water on the superhydrophobic surface which had not been subject to polyelectrolyte spraying led to little fluid retention. Spaying pure water after forming a precursor layer by polyelectrolyte spraying led to a linear increase in the retained mass, with a slope six times larger than that for water directly on the superhydrophobic surface. This may be due to pinning sites that were deposited by spraying the opposite polyelectrolytes prior to spraying the water.

Figure 15:
FIG. 15 shows a photograph of a lotus leaf after simultaneously spraying with polyelectrolytes, in accordance with some embodiments.

In addition to experiments on the model superhydrophobic surface (OTS coated nanograss), experiments were also performed on plant leaves to verify that similar processes could be useful for this application. As expected, similar results were obtained. FIG. 15 shows a picture of a lotus leaf after simultaneously spraying polyelectrolytes onto it. Lotus leaves are among nature's most superhydrophobic surfaces, and it can be seen here that simultaneously spraying oppositely charged polyelectrolytes onto it results in complete wetting of the sprayed region. Without wishing to be bound by theory, it is believed that other plants or surfaces may be more prone to spray retention.

In this experiment, a new mechanism to enhance spray deposition on hydrophobic surfaces through in-situ precipitation of polyelectrolytes was demonstrated. It was shown that defects formed on the surface can pin impinging droplets, and advantages of creating these defects in-situ were discussed. The mechanism of precipitate formation in coalescing droplets was then elucidated and the effect of precipitate formation on drop impact behavior was determined. This led to the development of a criterion characterizing the transition between bouncing and sticking droplets or sprays. This method allows the surface modification and deposition of the liquid of interest in one single step. This technique can work with different types of polyelectrolytes, as long as their zeta potential is high enough to interact. It was also shown that adding chitosan and alginate to the sprayed solutions largely enhanced the spray retention. These polyelectrolytes are polysaccharides that are non-toxic, biocompatible and biodegradable, which makes them candidates for plant treatment.

It is known that low retention of pesticides on hydrophobic plants is a major problem in agriculture. By adding small amounts of polyelectrolytes to the sprays, the quantity of pesticides used could be significantly reduced, while the coverage is increased, offering full protection to the plant and limiting the toxic effects of pesticides. Water spraying is also commonly used in various regions to prevent frost formation, and full coverage of the plant is also beneficial for this application. This solution can thus help save large amounts of water. This method can also be used for other agricultural sprays, paints, and any other process that involves sprays or droplet deposition.

A simple and easily implementable solution has been obtained that could be used for various types of sprayers and liquids. This technique could be used in both the developing and developed world, which makes it an example of reverse innovation (where a product that is developed for the needs of the developing world turns out to be a viable solution in more economically developed settings).

Plasma etching with $O_2$ and $SF_6$ was performed on silicon substrates to make a silicon nanograss texture. This material is a superhydrophilic surface with a contact angle around 0°. To make it more hydrophobic, the surface was then coated with a hydrophobic modifier (octadecyltrichlorosilane). The advancing and receding contact angles of DI water on the nanograss silicon surface treated with the hydrophobic modifier were measured with a goniometer (Model 500, ramé-hart) at 25° C. to be 165°±2° and 160°±3°, respectively. Four polyelectrolyte molecules were used. All of the polyelectrolytes were obtained from Sigma-Aldrich and were used as received. The properties of the used solutions are in Table 1.

TABLE 1

| Polyelectrolyte | Molar weight (kg/mol) | Concentration (mM) | pH | Zeta potential (mV) |
|---|---|---|---|---|
| Linear polyethyleneimine (LPEI) | 20 | 2, 10, 20, 50 | 4.3-4.7 | 43 |
| Polyacrylic acid (PAA) | 20 | 2, 10, 20, 50 | 4.3-4.7 | −45 |
| Chitosan | 60 | 10 | 4.4 | 52.3 |
| Alginate | 60 | 10 | 3.1 | −33.7 |

The pH was adjusted using HCl for each solution except for the chitosan solution; the pH of the chitosan solution was adjusted by adding acetic acid.

An airbrush was vertically fixed 21 cm above the horizontal sample. The pressure of the air supply to the airbrush was maintained constant throughout the whole set of experiments so as to keep the same jet velocity and cone angle. The liquid was delivered to the airbrush by inputs of 500 microliters using a syringe. The samples (2"×2") were chosen to be bigger than the spray cone (more than 98% of the sprayed liquid hit the sample).

A small quantity of fluorescent dye (Fluorescein sodium salt) was added to the sprayed solutions. Imaging under UV light was performed after each spray, and image processing using ImageJ was performed to determine the fraction of the surface covered by the liquid.

Example 2

Retention of agricultural sprays on plant surfaces is an important challenge. Bouncing of sprayed pesticide droplets from leaves is a source of soil and groundwater pollution and pesticide overuse. This example describes a method to increase droplet deposition through in-situ formation of hydrophilic surface defects that can arrest droplets during impact. Defects are created by simultaneously spraying oppositely charged polyelectrolytes that induce surface precipitation when two droplets come into contact. Using high-speed imaging, w the coupled dynamics of drop impact and surface precipitate formation are observed. A physical model is developed to estimate the energy dissipation by the defects and predict the transition from bouncing to sticking. Macroscopic enhancements in spray retention and surface coverage are shown for natural and synthetic non-wetting surfaces.

Sprays are used in a wide range of applications, including agriculture, paints, coatings, cosmetics and medicine. In agriculture, sprays are the most common means to deliver pesticides, some nutrients, and other chemicals to plants. Some of these chemicals, especially pesticides, are toxic, and so there is an increasing demand to reduce their use. Therefore, eliminating or substantially reducing the sources of deposition inefficiencies in sprays may be beneficial. One inefficiency arises from the low retention of sprayed liquids on plant surfaces due to their hydrophobic/superhydrophobic properties—droplets from sprays impacting plant surfaces can bounce or roll off plant surfaces. Such plants are common, and they may get their non-wetting properties from the presence of waxy features on their surface. As a result, much of the liquid from agricultural sprays ends up in the soil, which may pollute it and contaminate groundwater. Similarly, low retention of sprayed water may lead to significant water consumption in frost protection of plants.

Figure 7A:
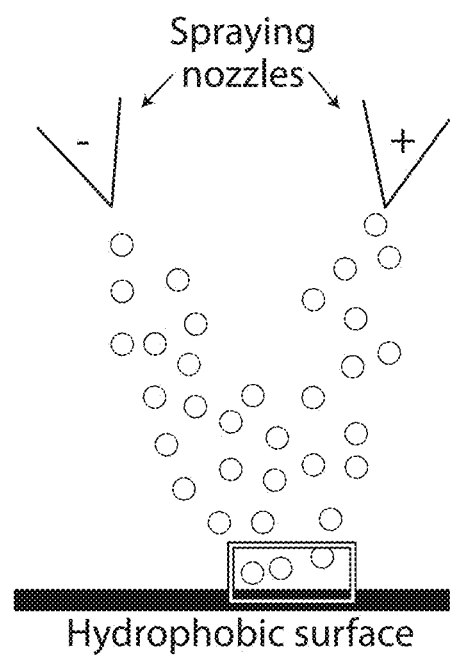
FIG. 7A shows a schematic depiction of simultaneous spraying of two solutions comprising oppositely charged polyelectrolytes onto a surface, according to certain embodiments.
Figure 7B:
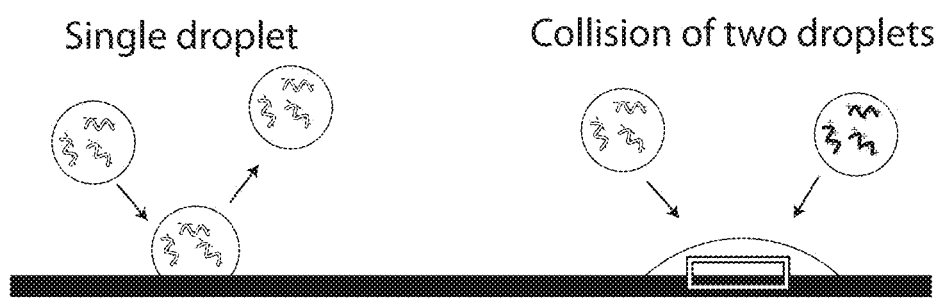
FIG. 7B shows a schematic depiction of droplets bouncing off of a surface, in accordance with some embodiments.
Figure 7C:
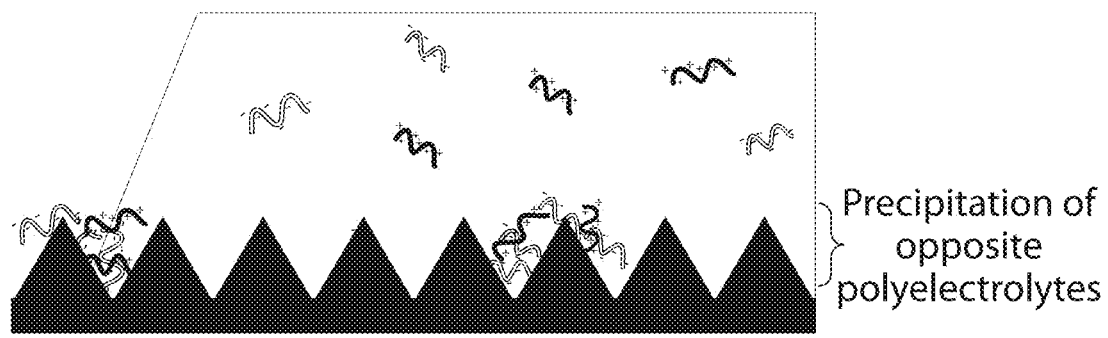
FIG. 7C shows, according to some embodiments, a schematic depiction of droplet pinning.

This experiment describes an approach to enhance drop retention by altering the target surface properties in-situ during the spray process by forming sparse hydrophilic defects onto the substrate. These defects can act to pin the contact line of impinging droplets and can suppress bouncing. These pinning defects are created by adding small quantities of oppositely charged polyelectrolytes to separate solutions and spraying them simultaneously using two nozzles, as shown schematically in FIG. 7A. When droplets containing oppositely charged polyelectrolytes come into contact, a precipitation reaction occurs which results in the formation of hydrophilic surface defects that pin the drop to the surface and enhance retention FIG. 7B. In this example, after demonstrating the concept with spray experiments, the possible interactions between droplets of the oppositely charged polyelectrolyte solutions are studied by individual drop-on-drop experiments. The deposited precipitate on the surface is observed by microscopy. A criterion is then derived for predicting the transition between bouncing and sticking for two impacting droplets and a characteristic non-dimensional number for this problem is defined. Finally, these individual droplet results are extended to sprays and it is observed that simultaneous spraying of polyelectrolyte solutions on synthetic and natural superhydrophobic surfaces may lead to a substantial increase in the deposition and retention of the liquid.

Figure 16:
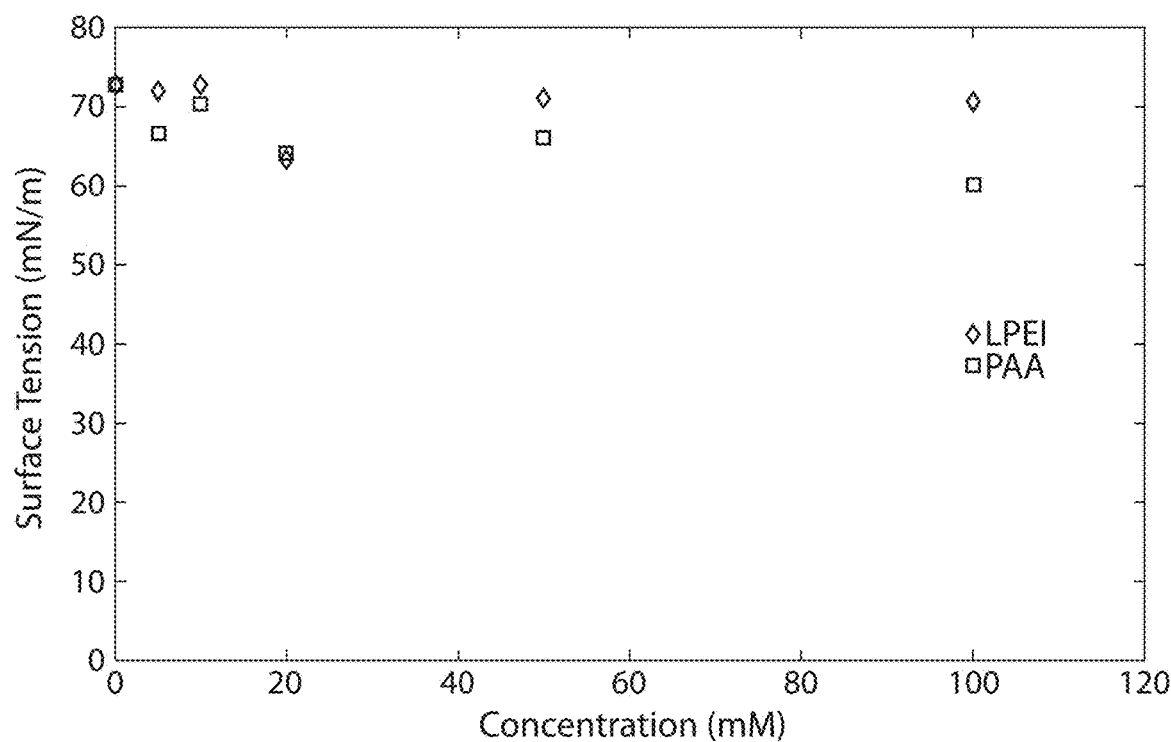
FIG. 16 shows, according to certain embodiments, the surface tension of polyeiectrolyte solutions.

To study the effect of precipitation on drop impacts, two polyelectrolyte molecules were used. Linear Polyethyleneimine (LPEI) was the positively charged polyelectrolyte, which comprises $NH_2^+$ groups in solution. Polyacrylic Acid (PAA) was the negatively charged polyelectrolyte, which comprises $COO^-$ groups in solution. The molecular weight of both polyelectrolytes was ~20,000 g/mol. These polyelectrolytes were dissolved in water at different concentrations. In each solution, the polyelectrolytes are very dilute and the solutions have physicochemical properties that are close to pure water. In particular, surface tension of all the solutions used were measured to be within 13% of that of water (see FIG. 16). The electrical interactions between ions in solution depend on their zeta potential. The zeta potential of polyelectrolytes may depend on the pH of the solution, and, for this experiment, a pH~4.5 was used so that the potential of both polyelectrolytes were sufficiently high and so that there was a substantial interaction between the polyelectrolytes At this pH, mixing solutions of these two polyelectrolytes resulted in spontaneous formation of insoluble precipitates in the solution. The precipitates were observed as whitish residues, and they were formed both in the bulk of the solution and on the surface on which the liquid was deposited. It was observed that the surface precipitates were hydrophilic and could strongly pin impinging droplets during impact.

Figure 17A:
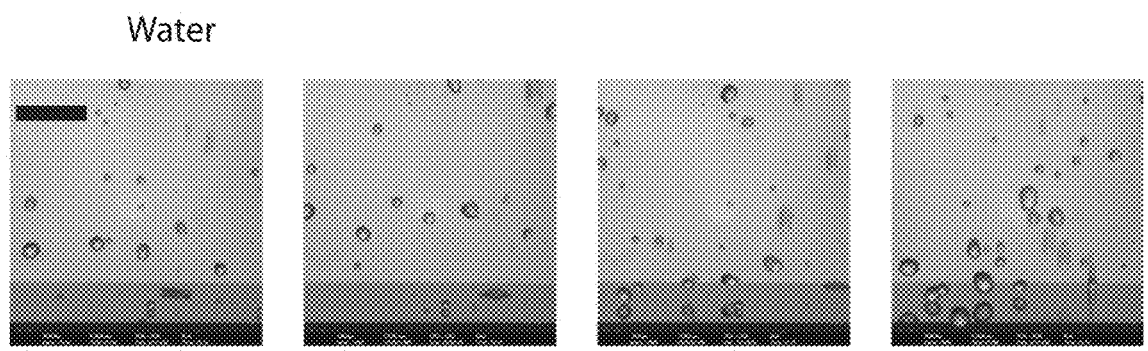
FIG. 17A shows, in accordance with certain embodiments, images of simultaneous spraying of water droplets.
Figure 17B:
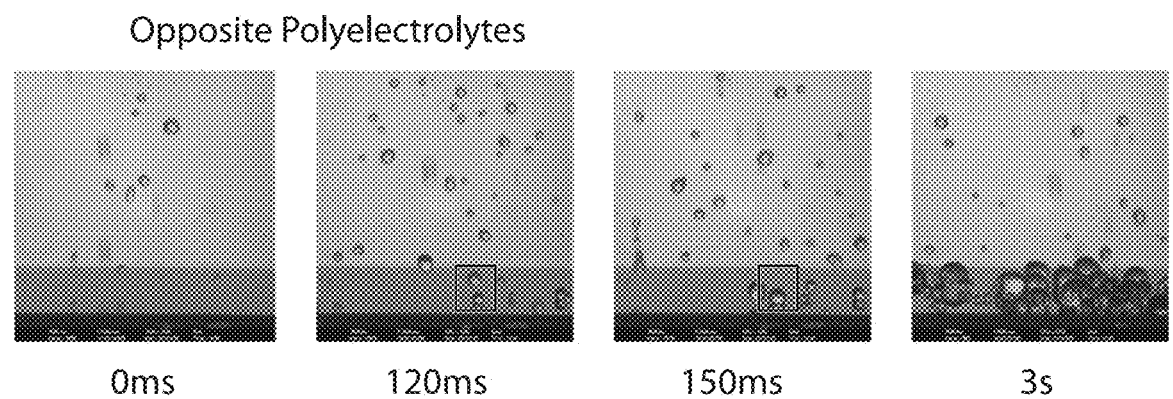
FIG. 17B shows images of simultaneous spraying of droplets comprising polyelectrolytes, according to some embodiments.

A silicon nanograss surface comprising random features with characteristic size and spacing of around 200 nm was coated with a hydrophobic modifier. This surface was used as a model superhydrophobic surface in this experiment. A contact angle of 165° and a contact angle hysteresis smaller than 5° were measured for this surface. Simultaneous spraying of water droplets with and without polyelectrolytes was performed on these surfaces and the interaction was captured using a high-speed camera (FIG. 17A and FIG. 17B). When pure water droplets were sprayed, they bounced off the surface and the surface remained clear as shown in FIG.

Figure 18:
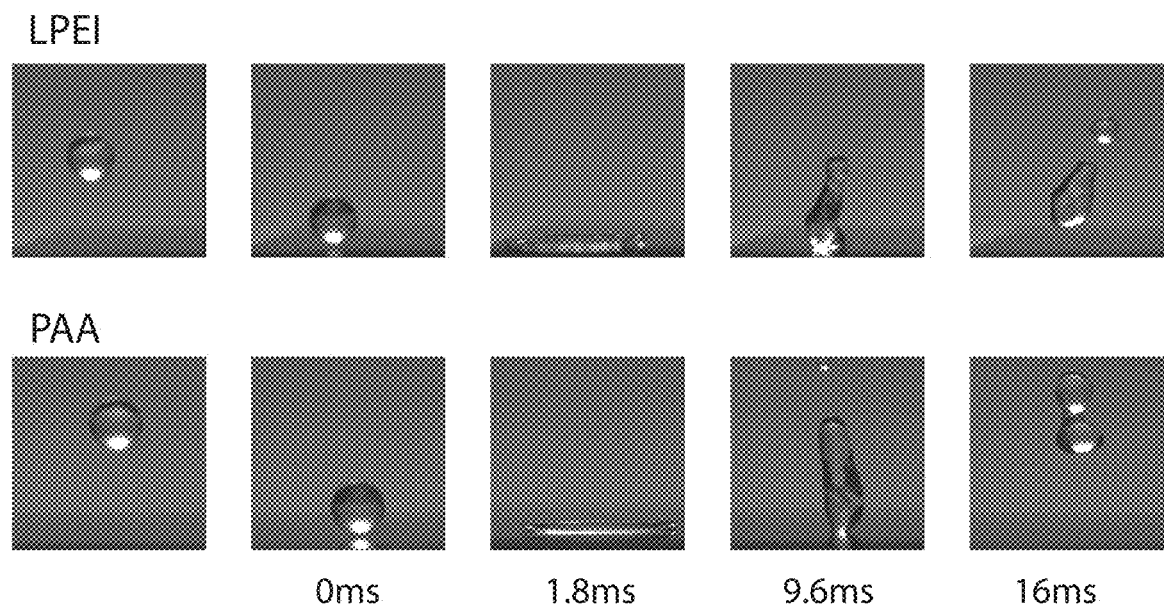
FIG. 18 shows droplets bouncing off a surface, according to certain embodiments.

17A. Some small droplets stuck to the surface, but they bounced off as soon as they were impacted by another impinging droplet. By contrast, spraying water droplets comprising oppositely charged polyelectrolytes increased liquid retention as shown in FIG. 17B. Close inspection of the spray revealed that not all droplets impacting the surface were retained by the surface. When single droplets impacted the surface, they bounced off similarly to pure water droplets. Further experiments with impacts of single droplets of either polyelectrolyte showed that they bounced off (FIG. 18), and spraying only one of the polyelectrolyte solutions resulted in minimal or no retention. Therefore, the retention in simultaneous spraying can come from the interaction between at least two droplets. Indeed, when multiple droplets collided on the surface, the coalesced drop that formed was arrested. The drop was then anchored at the surface and did not detach even when additional droplets impinged on it. The anchored drop continued to grow due to the coalescence of subsequent impacting droplets. As time progressed, the surface became covered with many anchored drops that continued to grow and, after ~3 seconds of spraying, much of the surface was covered with liquid. One frequent case for two-droplet interactions occurred when small single droplets remained on the surface upon impact and are were subsequently impacted by another impinging drop.

Figure 19:
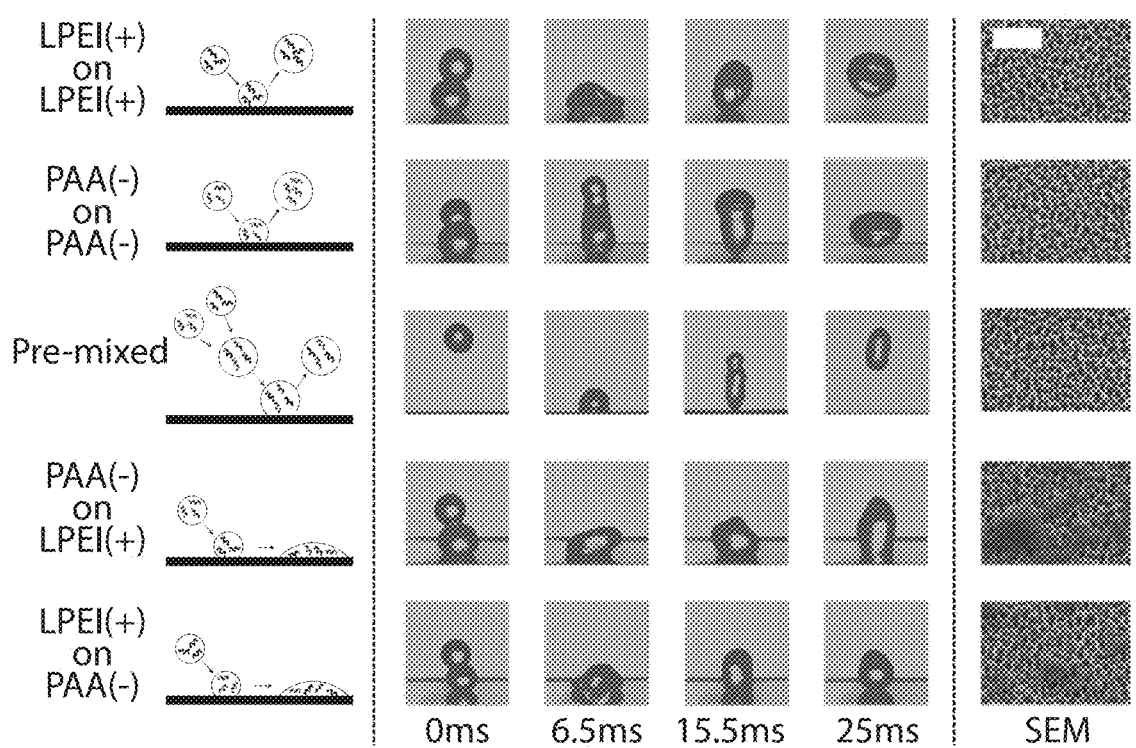
FIG. 19 shows, in accordance with some embodiments, two droplet interactions.

In FIG. 19, five possible cases of two-droplet interactions are presented: a droplet comprising a positively charged polyelectrolyte (e.g., LPEI) impinging on another droplet comprising a positively charged polyelectrolyte; a droplet comprising a negatively charged polyelectrolyte (e.g., PAA) impinging on another droplet comprising a negatively charged polyelectrolyte; a droplet comprising a positively charged polyelectrolyte and a droplet comprising a negatively charged polyelectrolyte colliding and coalescing in midair and then impinging on the surface; a droplet comprising a positively charged droplet impinging on a droplet comprising a negatively charged polyelectrolyte; and a droplet comprising a negatively charged polyelectrolyte impinging on a droplet comprising a positively charged polyelectrolyte. For each of these cases, a drop-on-drop impact experiment was filmed with a high-speed camera at 10,000 frames per second and the impact location of the dried surface was imaged using a Scanning Electron Microscope (SEM).

Figure 6:
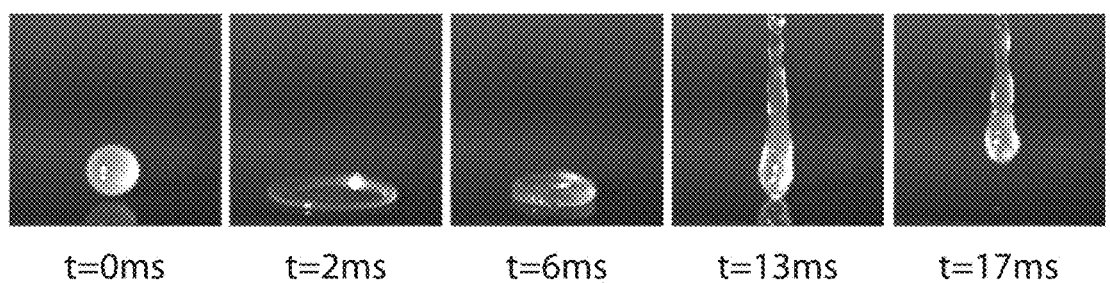
FIG. 6 shows, in accordance with certain embodiments, snapshots of droplet impacts on a surface.
Figure 20A:
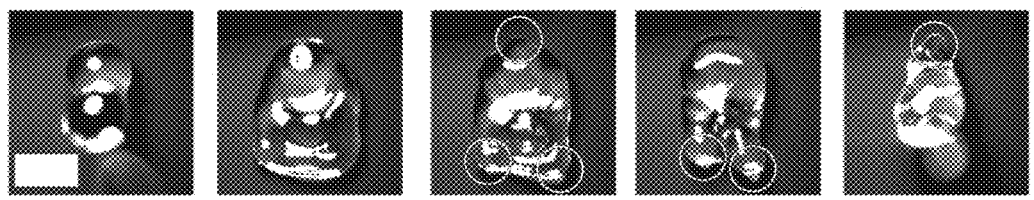
FIG. 20A shows, according to certain embodiments, shows photographs of drop on drop impacts.
Figure 20A:
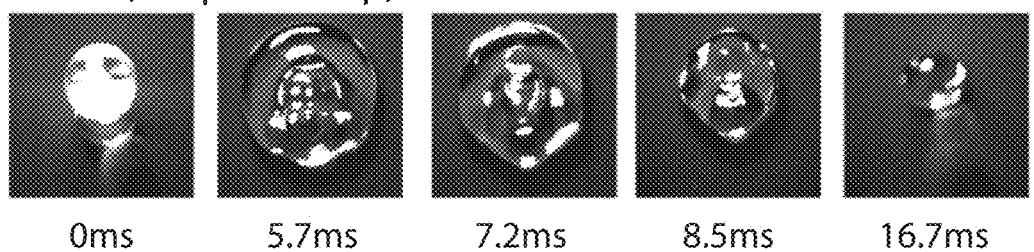
Figure 20B:
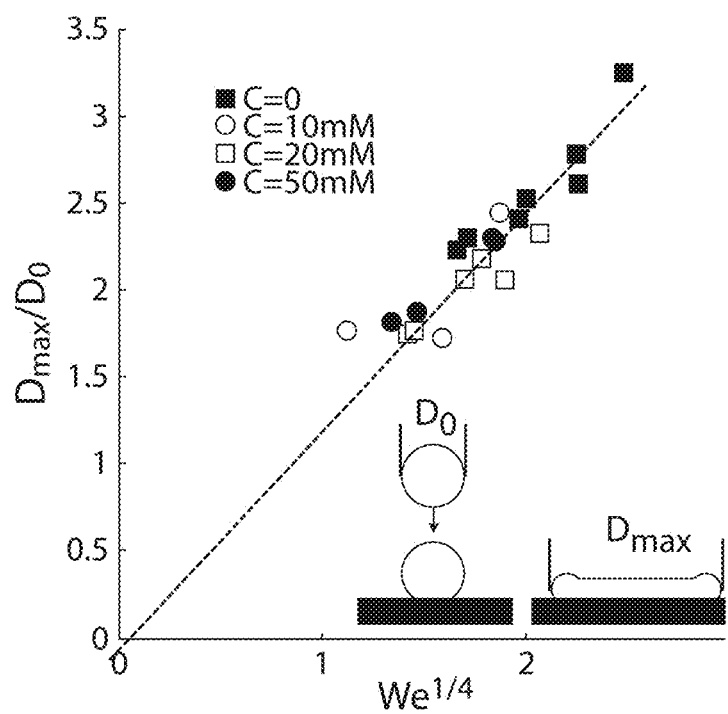
FIG. 20B shows the normalized maximum diameter for various droplets, according to certain embodiments.
Figure 20C:
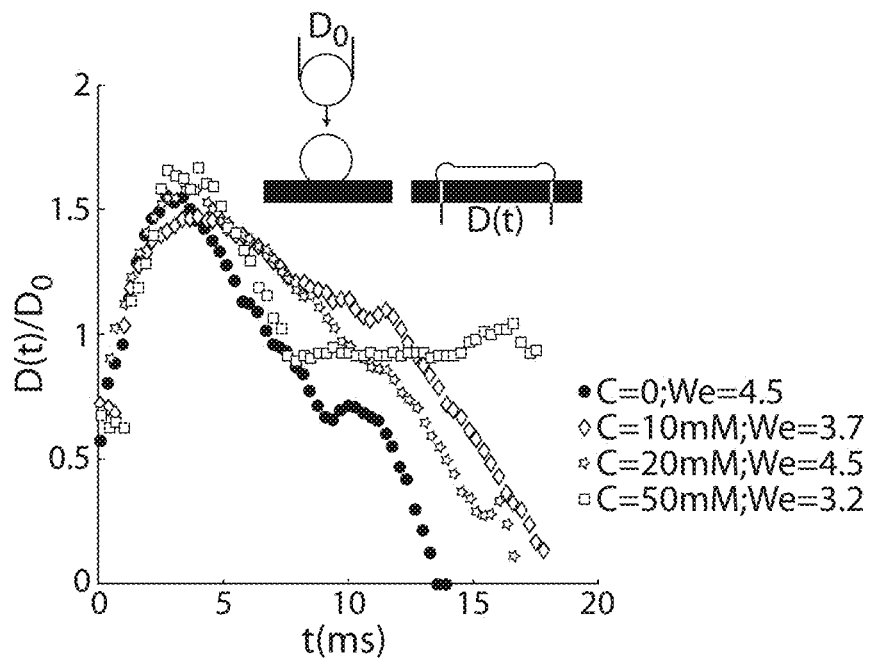
FIG. 20C shows the time evolution of the normalized contact length for different polyelectrolyte concentrations, in accordance with some embodiments.
Figure 20D:
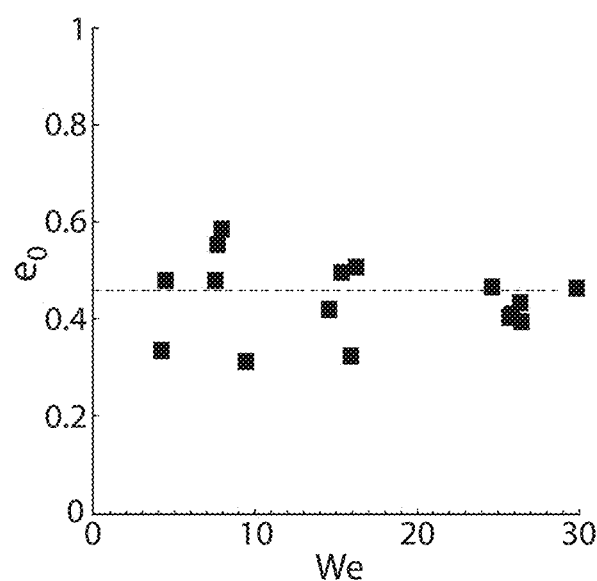
FIG. 20D shows the restitution coefficient of pure water droplets as a function of the Weber number, according to some embodiments.
Figure 21:
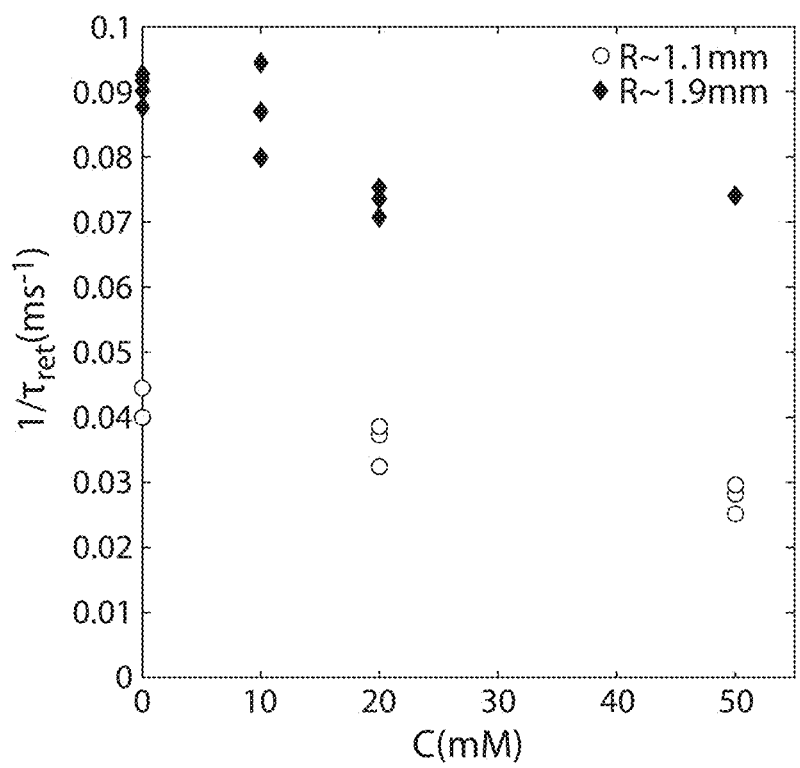
FIG. 21 shows the retraction rate for drop-on-drop impacts, in accordance with certain embodiments.

The results in FIG. 19 show that the impacts involving two droplets which comprise the same polyelectrolyte result in bouncing in a sequence of spreading and retraction phases that is similar to the impact of a single droplet. The measured contact time is also close to that of a single droplet (within 15%), and no deposits can be seen in the SEM images. Forming the precipitates beforehand by premixing positive and negative polyelectrolytes before impact also does not cause droplets to stick to the surface. None of the bulk precipitates remain on the surface in this case. Thus, spraying a solution containing pre-formed precipitates may not increase the liquid retention. The same bouncing behavior is observed when other hydrophilic particles are added to the droplet. As shown in FIG. 6, droplets comprising 3 micron silica particles bounce off superhydrophobic surfaces without leaving any particle residue. However, drop-on-drop impacts of droplets comprising oppositely charged polyelectrolytes can lead to droplets sticking to the surface. The droplets can be arrested by the pinning sites that may form due to the in-situ precipitation of oppositely charged polyelectrolytes on the surface.

Sufficiently small droplets of one solution may stick to the surface when pinning forces due to the natural hysteresis of the surface overcome inertial forces. Upon impact with another incoming droplet, the coalesced drop may stick if the two droplets contain oppositely charged polyelectrolytes and can react to form additional surface pinning sites that arrest the coalesced drop.

When two droplets comprising oppositely charged polyelectrolytes coalesce, there are oppositely charged macromolecules in solution. When these molecules are in close proximity such that the electrical charges are not completely screened, they may be attracted to each other and may subsequently attract other molecules to form precipitates, as shown in FIG. 7C. Molecules that are close to the surface may be attracted to the surface, and may serve as a nucleation site for a surface precipitate. These precipitates can act as defects and may pin the contact line of a retracting droplet. This pinning dissipates energy and can prevent the droplet from bouncing. As shown in the top view images in FIG. 20A, the retraction front in the case of water droplets can be predominantly axisymmetric due to minimal pinning. However, for positive on negative polyelectrolyte drop impact the retracting front can be composed of multiple sharp corners and filaments, which may indicate contact line pinning.

To further characterize drop-on-drop impacts, the normalized maximum diameter, defined as the diameter of the coalesced droplet when it reaches its maximal expansion divided by the initial diameter of one droplet $D_0$, was measured. FIG. 20B shows the normalized maximum diameter for various drop sizes, impact velocities, and polyelectrolyte concentrations. For the experimental conditions investigated here ($4<We<40$), $D_{max}/D_0$ scaled with $We^{1/4}$. The results are identical for the cases with and without polyelectrolytes. FIG. 20C shows the time evolution of the normalized contact length $D(t)/D_0$ for different polyelectrolyte concentrations. It was observed that, similar to the normalized maximum diameter, the expansion time, defined as the time till the coalesced droplet reaches its maximum expansion, was not affected by the addition of polyelectrolytes because the contact line does not encounter any surface defects in the expansion phase.

The droplet behaves differently in the retraction phase. FIG. 20C shows that increasing the polyelectrolyte concentration increased the contact time, which became infinity for high concentrations, as the droplet stuck to the surface. The retraction rate is shown in FIG. 21 for drop-on-drop impacts with various drop sizes, impact velocities and polyelectrolyte concentrations. It was observed that the retraction rate did not depend on the impact velocity, and decreased with polyelectrolyte concentration.

The decrease in retraction rate may arise from the pinning of the contact line on the defects formed by polyelectrolyte precipitation. The contact line may get pinned and depinned several times during the retraction phase, and each of these events may dissipate some energy and slows the retraction. The final outcome of the impact may depend on how much energy is dissipated by pinning and depinning. It is observed that for low concentrations of polyelectrolytes, bouncing may still occur, while for higher concentrations droplets may be arrested. Defect density, and thus the ability to arrest impacting droplets, may increase with concentration. To determine minimum concentration for which the number of generated defects arrests the impacting droplets on the surface, the energy balance during impact is considered.

Viscous effects are weak here as the Ohnesorge number $$\left(Oh = \frac{\mu}{\sqrt{\rho\sigma R}}\right)$$

is ~$10^{-3}$ and so is much less than 1. An impacting droplet striking a non-wetting surface can rebound if enough of its initial kinetic energy, which may be converted into surface energy during the expansion phase, is recovered during the retracting phase. Since viscous dissipation is negligible, a significant mechanism for the droplet to lose energy is through the pinning forces on the surface. However, part of the initial kinetic energy may also be converted into internal vibration energy due to droplet oscillations. One estimate for the fraction of the initial kinetic energy that gets converted into vibration energy as $(1-e_0^2)E_k$ where $e_0$ is the restitution coefficient for the base case of drop-on-drop impacts of pure water droplets where there is negligible pinning. The restitution coefficient can be calculated by applying the following equation:

$$e_0 = \left(\frac{m_b v_b^2}{m_i v_i^2}\right)^{0.5},$$

where $m_i, m_b$ are the masses of the droplet and $v_i, v_b$ are the velocities of the center of mass before and after impact (here $m_b/m_i=2$). As shown in FIG. 20D, the restitution coefficient of pure water droplets does not strongly depend on the Weber number of the impacting droplet; it is on the order of 0.4 for the impact experiments. Assuming that the internal vibration of the droplets is not significantly affected by polyelectrolytes, this measured restitution coefficient for water droplets can be used to estimate the vibration energy of droplets that comprise polyelectrolytes. Hence, droplets that comprise polyelectrolytes may stick to the surface if the work of pinning during the retraction phase exceeds the remaining kinetic energy $e_0^2 E_k$.

In quantitative terms, the initial kinetic energy of the droplet can be expressed as $E_k \sim \rho R^3 V^2$, and the work of pinning on one single defect can be expressed as $W \sim \sigma l^2$, where R is the radius of the droplet, V is its impact velocity, $\rho$ is the density, $\sigma$ is the surface tension and l is the defect size. The total work of pinning during the receding phase can then be expressed as $W \sim \sigma l^2 N_{defects}$, where $N_{defects}$ is the total number of defects under the droplet during the impact. An average surface concentration of defects $C_s$ can then be defined, and the following relationship obtained: $W \sim \sigma l^2 R^2 C_s$. The ratio of kinetic energy and the work of pinning provides a characteristic non-dimensional number for this problem, the pinning number $$Pi = \frac{e_0^2 \rho R^3 V^2}{\sigma l^2 N_{defects}} = \frac{e_0^2 \rho R V^2}{\sigma l^2 C_s},$$

which may govern the transition between bouncing and sticking.

The surface concentration of defects can vary from zero to a value corresponding to the case where all the polyelectrolytes in both droplets react and form surface precipitates.

Based on this information, the following hypothesis is made: the number of surface defects is a fraction of the total number of defects that can be created by all the polyelectrolytes in the droplet, or $$N_{defects} = \varphi C R^3 \frac{N_{avogadro}}{N_{monomers/defect}},$$

where C is defined as the volumetric molar concentration of monomers and $\varphi$ is the fraction of polyelectrolytes that precipitate during the impact. This fraction can be estimated, for short contact times, as the ratio of the contact time to the precipitation time. The pinning number is then $$Pi = \frac{e_0^2 \rho V^2}{\sigma l^2 \varphi C \frac{N_{avogadro}}{N_{monomers/defect}}}$$

To estimate Pi, SEM images were used to estimate the average defect size l, which was around 500 nm. To estimate the number of monomers per defect, the radius of a semi-flexible polymer chain was related to the number of its monomers using the standard Flory theory, which gives $l \sim aN^\nu$, where l is the defect size and a is the monomer size (typically ~1 nm). In the case of polyelectrolytes, $\nu = 3/5$, and this leads to a number N on the order 10,000 monomers per defect.

To determine the ratio $\varphi$, the precipitation time was compared to the contact time. As diffusion effects may be negligible during contact time ($\tau_{diffusion} \gg \tau_{contact}$), and so precipitation may be strongly affected by the mixing of the droplets. When the two droplets coalesce, they need some time to completely mix, as shown schematically in FIG. 11A. During the mixing phase, only a fraction of the polyelectrolyte molecules may come into contact with each other and may be able to interact. The mixing may be driven by inertial and capillary forces and the mixing time may scale as $$\tau_{mix} \sim \left(\frac{\rho R^3}{\sigma}\right)^{\frac{1}{2}}.$$

The precipitation rate may then scale as $$r_{precip} = \frac{dN}{dt} \sim CR^3 \frac{1}{\tau_{mix}} \propto CR^{\frac{3}{2}}.$$

The precipitation rate of two coalescing droplets comprising oppositely charged polyelectrolytes was measured, and was found to scale as $$r_{precip} \propto CR^{\frac{3}{2}}$$

as predicted. The contact time may have the same scaling law as the mixing time $$\tau_{contact} \propto \left(\frac{\rho R^3}{\sigma}\right)^{\frac{1}{2}},$$

but with a different pre-factor. Thus, it is expected that φ will be independent of the drop parameters and depend on the ratio of the pre-factors. The experimentally measured pre-factor may be larger for the mixing time than for the contact time by about an order of magnitude, so $$\varphi = \frac{\tau_{contact}}{\tau_{mix}} \sim 0.1.$$

Figure 22:
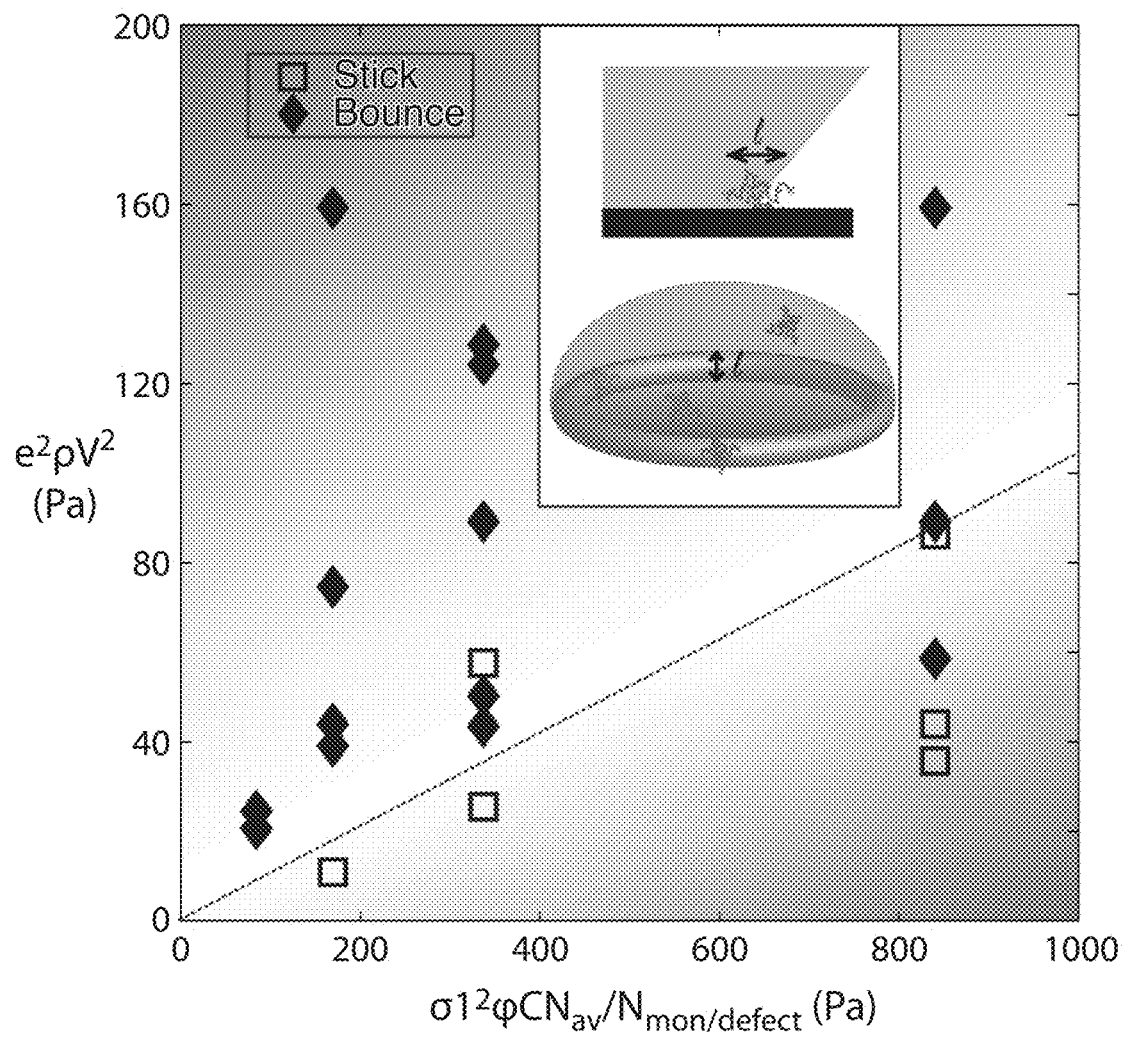
FIG. 22 shows pinning numbers for which droplets may bounce and pinning numbers for which droplets may be pinned, according to certain embodiments.

Several drop-on-drop impact experiments were performed with varying concentration, radius and velocity. In FIG. 22, it can be seen that droplets with higher kinetic energies (or higher Pi) may bounce, but droplets with lower kinetic energies (or lower Pi) may stick. The transition may occur at a pinning number of around 0.1.

Finally, the retention of sprayed liquids was measured for different surfaces and liquids. Sprayers were used to deliver fixed amounts of liquid to the surface in the form of jets of fine droplets at constant jet velocity and cone angle. Two metrics were used to quantify the retention. First, the mass of the liquid retained by the sample was measured by weighing the sample after every spray. Second, the surface coverage (i.e., the area covered by the liquid divided by the total area of the substrate) was measured. The first metric characterized how much liquid stuck to the surface, while the second metric quantified the uniformity of the coverage.

Figure 23:
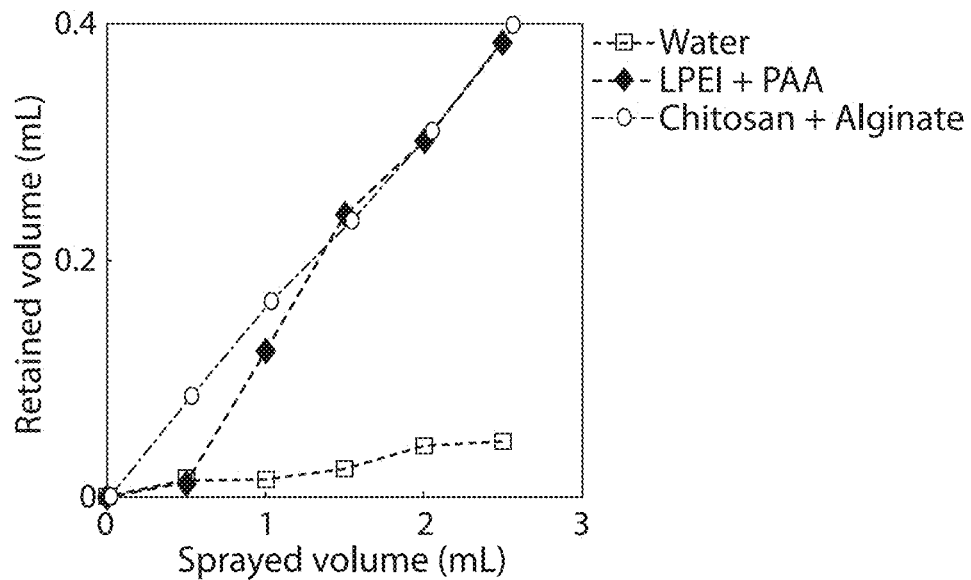
FIG. 23 shows retained volume as a function of sprayed volume, in accordance with some embodiments.
Figure 24:
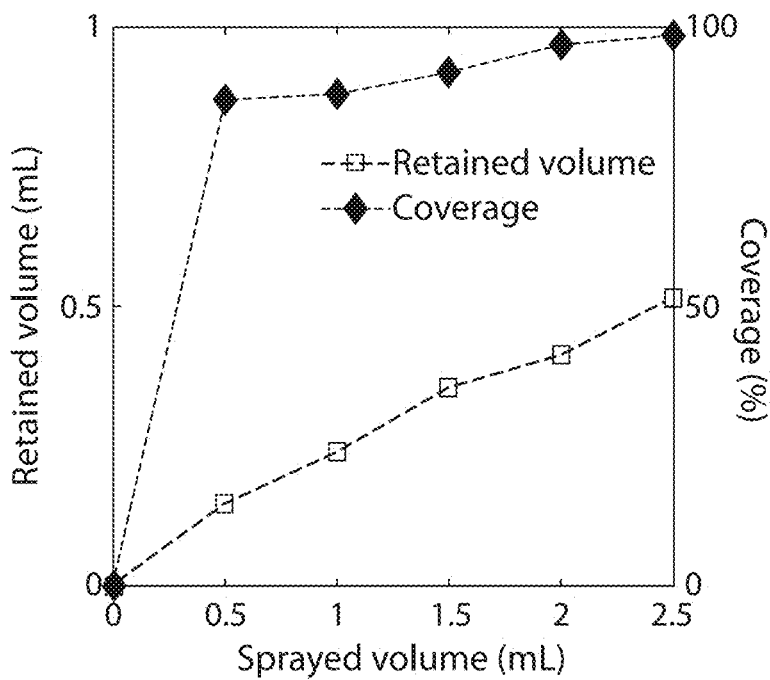
FIG. 24 shows retained volume as a function of sprayed volume, according to some embodiments.

FIG. 12A shows images of the surfaces (2×2 inches), as different liquids are sprayed. A fluorescent dye was added to all the sprayed liquids for better visualization. Very little water was retained on the superhydrophobic surface and the coverage did not exceed 7% after 3 mL were sprayed, as shown in FIG. 12B. However, when solutions comprising oppositely charged polyelectrolytes (concentration 20 mM) were simultaneously sprayed on the superhydrophobic surface, much more of the liquid remained on the surface; the coverage was 70% after 1 mL and reached 80% when 3 mL of liquid was sprayed. The retained volume exhibited similar trends, as shown in FIG. 23. When polyelectrolytes were sprayed, the retained volume continuously increased except for cases where the retained volume saturated. There was a tenfold increase in retention as compared to water. The retained volume was close to the retained volume of water on a superhydrophilic surface (see FIG. 24).

Spray experiments with a polyelectrolyte concentration of mM resulted in zero retention while experiments with 20 mM showed large enhancements in retention. These results are consistent with the model described above, which predicts a transition from bouncing to sticking at a concentration of ~10 mM for the experimental conditions used here.

Figure 25:
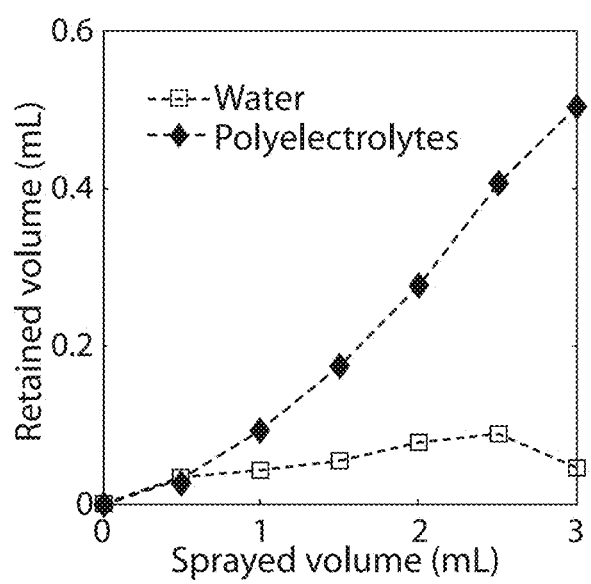
FIG. 25 shows retained volume as a function of sprayed volume, in accordance with certain embodiments.
Figure 26:
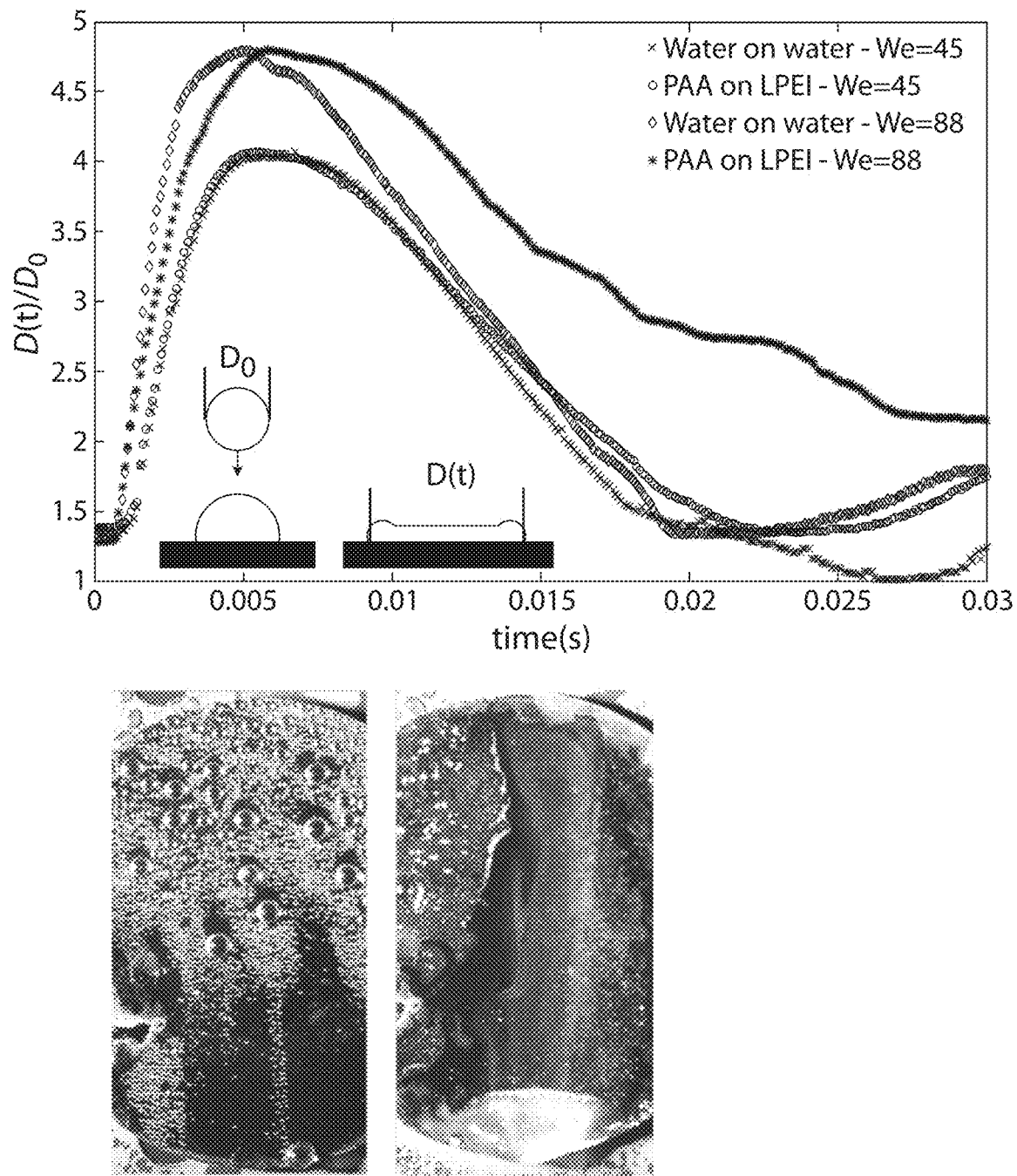
FIG. 26 shows data obtained from spraying compositions onto superhydrophobic surfaces, according to certain embodiments.

Similar retention properties were also observed for solutions comprising different polyelectrolytes than those described above. Retained volume from solutions comprising chitosan (positively charged) and alginate (negatively charged) was also substantial, as shown in FIG. 23. Chitosan and alginate are polysaccharides that are non-toxic, biocompatible and biodegradable, which makes them candidates for plant treatment. When solutions comprising chitosan and alginate were sprayed on superhydrophobic lotus leaves, increased retention was observed (see FIG. 25). The method described in this experiment may also function similarly on hydrophobic surfaces (see FIG. 26; top panel shows the normalized contact length as a function of time for drop-on-drop impacts; bottom left panel shows the surface after being sprayed water; bottom right panel shows the surface after being sprayed with oppositely charged polyelectrolytes), which makes it applicable to a large variety of plants and surfaces in practice.

This experiment demonstrated a new mechanism to enhance spray deposition on hydrophobic surfaces through in-situ precipitation of polyelectrolytes on the surface. It was shown that defects formed in-situ on the surface during the impact can pin the impinging droplets, and the advantages of creating these hydrophilic wetting defects in-situ were described. A simple model balancing kinetic and pinning energies was proposed that led to a criterion characterizing the transition between bouncing and sticking droplets or sprays. Methods disclosed in this example may allow surface modification and deposition of the liquid of interest in one single step and introduce a new control parameter in the design space for sprays, which is the polyelectrolyte concentration. It was shown that this method could work on different surfaces and with different types of polyelectrolytes, of which there are several that are natural and/or biodegradable. By adding small amounts of these polyelectrolytes to sprays, the quantity of pesticides used could be significantly reduced, while coverage is increased, offering increased protection to the plant and limiting the toxic effects of pesticides. This method could also be used for other agricultural sprays, paints, and any other process that involves sprays or droplet deposition.

Plasma etch with $O_2$ and $SF_6$ was performed on silicon substrates to make a silicon nanograss texture. The latter is a superhydrophilic surface with contact angles around 0°. To make it superhydrophobic, the surface was coated with a hydrophobic modifier (Octadecyltrichlorosilane). Advancing and receding contact angles of DI water on a nanograss silicon surface treated with the hydrophobic modifier were measured with a goniometer (Model 500, ramé-hart) at 25° C. to be 165°±2° and 160°±3°, respectively.

Four polyelectrolyte molecules were used. All the polyelectrolytes were obtained from Sigma-Aldrich and used as received. The properties of the used solutions are in Table 2.

TABLE 2

| Polyelectrolyte | Molar weight (kg mol$^{-1}$) | Concentration (mM) | pH | Zeta potential (mV) |
|---|---|---|---|---|
| Linear polyethyleneimine (LPEI) | 20 | 2, 5, 10, 20, 50 | 4.3-4.7 | 43 |
| Polyacrylic acid (PAA) | 20 | 2, 5, 10, 20, 50 | 4.3-4.7 | −45 |
| Chitosan | 60 | 10 | 4.4 | 52.3 |
| Alginate | 60 | 10 | 3.1 | −33.7 |

The pH was adjusted using HCl and NaOH for the LPEI, PAA, and alginate solutions. The pH of the chitosan solution was adjusted by adding acetic acid.

An airbrush was vertically fixed 21 cm above the horizontal sample. The pressure of the air supply to the airbrush was maintained constant throughout the whole set of experiments so as to keep the same jet velocity and cone angle. The liquid was delivered to the airbrush by inputs of 500 microliters using a syringe. The samples (2 inches×2 inches)

were larger than the spray cone (more than 98% of the sprayed liquid hit the sample).

A small quantity of fluorescent dye (Fluorescein sodium salt) was added to the sprayed solutions. Imaging under UV light was performed after each spray, and image processing using ImageJ was performed to determine the fraction of the surface covered by the liquid.

Example 3

This example shows the evolution of the advancing and receding contact angles for a surface as it is simultaneously sprayed with solutions comprising oppositely charged polyelectrolytes.

Figure 27:
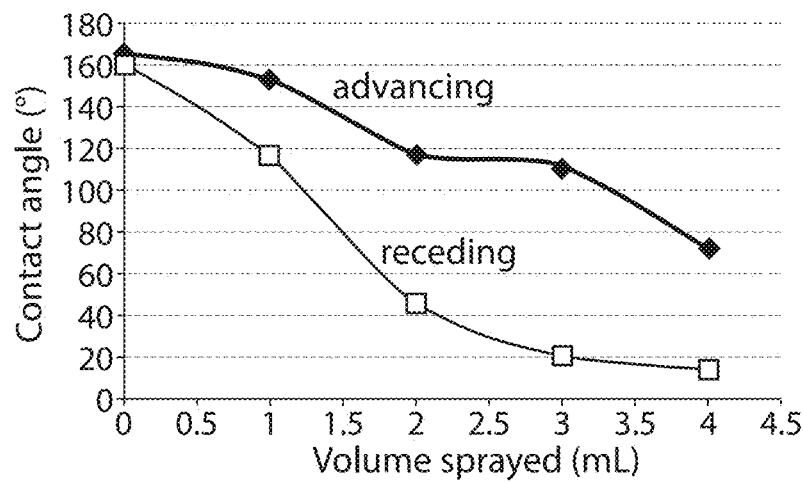
FIG. 27 shows the contact angle as a function of sprayed volume, in accordance with some embodiments.
Figure 28:
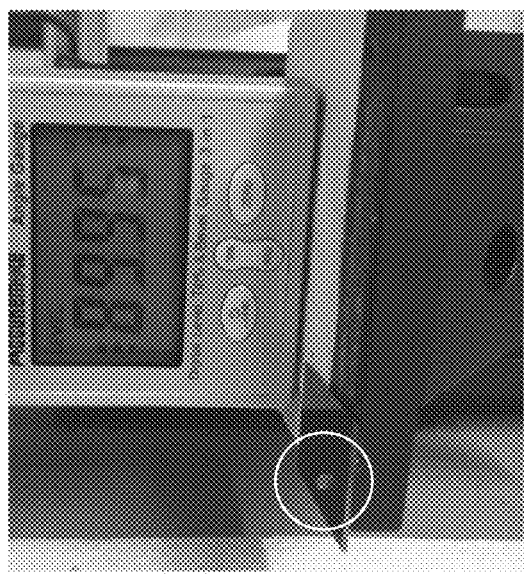
FIG. 28 shows a droplet with a roll-off angle of greater than 90°, according to some embodiments.

A superhydrophobic surface was simultaneously sprayed with a first solution comprising chitosan and a second solution comprising pectin. The advancing and receding contact angles of were measured after simultaneously spraying the surface with discrete amounts of the two solutions, as shown in FIG. 27.

Example 4

This example shows the dependence of the roll-off angle of a surface on the concentration of the reactive groups in each solution that it is sprayed with. Roll-off angles of an initially superhydrophobic surface were measured after spraying the two solutions comprising oppositely charged polyelectrolytes which formed droplets with an average diameter of ~2.6 mm. Table 3, below, shows the measured roll-off angles after solutions comprising different concentrations of the reactive groups (i.e., monomers) sprayed onto the superhydrophobic surface. Identical reactive group concentrations in both the first and the second solution were used in each experiment; the values below refer to the concentration of the first reactive group in the first solution and the second reactive group in the second solution prior to spraying.

TABLE 3

| Concentration (mM) | Roll-off angle (°) |
|---|---|
| 0 | 0 |
| 2 | 25 |
| 5 | 42 |
| 20 | >90 |

For the 20 mM solutions, droplets were pinned even after the surface was rotated such that the surface was oriented vertically (see FIG. 28).

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Any terms as used herein related to shape, orientation, alignment, and/or geometric relationship of or between, for example, one or more articles, structures, forces, fields, flows, directions/trajectories, and/or subcomponents thereof and/or combinations thereof and/or any other tangible or intangible elements not listed above amenable to characterization by such terms, unless otherwise defined or indicated, shall be understood to not require absolute conformance to a mathematical definition of such term, but, rather, shall be understood to indicate conformance to the mathematical definition of such term to the extent possible for the subject matter so characterized as would be understood by one skilled in the art most closely related to such subject matter. Examples of such terms related to shape, orientation, and/or geometric relationship include, but are not limited to terms descriptive of: shape—such as, round, square, circular/circle, rectangular/rectangle, triangular/triangle, cylindrical/cylinder, elliptical/ellipse, (n)polygonal/(n)polygon, etc.; angular orientation—such as perpendicular, orthogonal, parallel, vertical, horizontal, collinear, etc.; contour and/or trajectory—such as, plane/planar, coplanar, hemispherical, semi-hemispherical, line/linear, hyperbolic, parabolic, flat, curved, straight, arcuate, sinusoidal, tangent/tangential, etc.; direction such as, north, south, east, west, etc.; surface and/or bulk material properties and/or spatial/temporal resolution and/or distribution—such as, smooth, reflective, transparent, clear, opaque, rigid, impermeable, uniformly), inert, non-wettable, insoluble, steady, invariant, constant, homogeneous, etc.; as well as many others that would be apparent to those skilled in the relevant arts. As one example, a fabricated article that would described herein as being "square" would not require such article to have faces or sides that are perfectly planar or linear and that intersect at angles of exactly 90 degrees (indeed, such an article can only exist as a mathematical abstraction), but rather, the shape of such article should be interpreted as approximating a "square," as defined mathematically, to an extent typically achievable and achieved for the recited fabrication technique as would be understood by those skilled in the art or as specifically described. As another example, two or more fabricated articles that would described herein as being "aligned" would not require such articles to have faces or sides that are perfectly aligned (indeed, such an article can only exist as a mathematical abstraction), but rather, the arrangement of such articles should be interpreted as approximating "aligned," as defined mathematically, to an extent typically achievable and achieved for the recited fabrication technique as would be understood by those skilled in the art or as specifically described.

What is claimed is:

1. A method for modifying a hydrophobic plant surface, comprising:
   spraying a first composition comprising a first polyelectrolyte with a first zeta potential onto the hydrophobic plant surface; and
   spraying a second composition comprising a second polyelectrolyte with a second zeta potential onto the hydrophobic plant surface, wherein the first zeta potential and the second zeta potential have opposite signs,
   wherein the first composition and the second composition interact at the hydrophobic plant surface to form a reaction product comprising the first polyelectrolyte and the second polyelectrolyte on the hydrophobic plant surface.

2. A method as in claim 1, wherein the reaction product is capable of partially pinning a droplet.

3. A method as in claim 1, wherein the reaction product is capable of fully pinning a droplet.

4. A method as in claim 1, wherein a ratio of a roll-off angle after exposing the hydrophobic plant surface to the first composition and the second composition to the roll-off angle prior to exposing the hydrophobic plant surface to the first composition and the second composition is greater than 1.

5. A method as in claim 1, comprising exposing at least a portion of the hydrophobic plant surface to a third composition.

6. A method as in claim 5, wherein the third composition comprises an active agent selected from the group consisting of pesticides, herbicides, fertilizers, agricultural chemicals, pigments, paints, flavorings, pharmaceutically active ingredients, cosmetics, and fire-retardant species.

7. A method as in claim 1, wherein the first composition comprises an active agent selected from the group consisting of pesticides, herbicides, fertilizers, agricultural chemicals, pigments, paints, flavorings, pharmaceutically active ingredients, cosmetics, and fire-retardant species.

8. A method as in claim 1, wherein, prior to exposing the hydrophobic plant surface to either of the first composition and the second composition, a contact angle between water and the hydrophobic plant surface is greater than or equal to 90°.

9. A method as in claim 1, wherein forming the reaction product comprises forming a polyelectrolyte complex.

10. A method as in claim 1, wherein at least one of the first composition and the second composition comprises a biodegradable polyelectrolyte.

11. A method as in claim 1, wherein at least one of the first composition and the second composition comprises a non-toxic polyelectrolyte.

12. A method as in claim 1, wherein at least one of the first composition and the second composition comprises water.

13. A method as in claim 1, wherein at least one of the first composition and the second composition comprises a carrier fluid.

14. A method as in claim 1, wherein both of the first composition and the second composition comprise a carrier fluid.

15. A method as in claim 1, wherein the plant surface is a surface of a leaf, a surface of a root, a surface of a fruit, a surface of a vegetable, or a surface of a flower of the plant.

* * * * *